US012770882B2

(12) United States Patent
Ho et al.

(10) Patent No.: US 12,770,882 B2
(45) Date of Patent: Oct. 20, 2026

(54) BINDER COMPOSITION FOR SECONDARY BATTERY

(71) Applicant: GRST SINGAPORE PTE. LTD., SIngapore (SG)

(72) Inventors: Kam Piu Ho, Hong Kong (CN); Yingkai Jiang, Shenzhen (CN); Hongke Qiu, Guangdong (CN)

(73) Assignee: GRST SINGAPORE PTE. LTD., Singapore (SG)

(*) Notice: Subject to any disclaimer, the term of this patent is extended or adjusted under 35 U.S.C. 154(b) by 755 days.

(21) Appl. No.: 17/802,966

(22) PCT Filed: Sep. 25, 2020

(86) PCT No.: PCT/CN2020/117767
§ 371 (c)(1),
(2) Date: Aug. 29, 2022

(87) PCT Pub. No.: WO2021/253674
PCT Pub. Date: Dec. 23, 2021

(65) Prior Publication Data

US 2023/0114903 A1 Apr. 13, 2023

(30) Foreign Application Priority Data

Jun. 17, 2020 (WO) ................ PCT/CN2020/096672
Aug. 19, 2020 (WO) ................ PCT/CN2020/110065
Aug. 19, 2020 (WO) ................ PCT/CN2020/110105

(51) Int. Cl.
*H01M 4/62* (2006.01)

(52) U.S. Cl.
CPC .................................. *H01M 4/622* (2013.01)

(58) Field of Classification Search
None
See application file for complete search history.

(56) References Cited

U.S. PATENT DOCUMENTS

2009/0181309 A1 7/2009 Kwon et al.
2010/0112441 A1* 5/2010 Fukumine ......... C08F 220/1804 429/217

(Continued)

FOREIGN PATENT DOCUMENTS

CN 106797032 A 5/2017
CN 108292755 A 7/2018

(Continued)

OTHER PUBLICATIONS

Translation of CN110885650A (Year: 2020).*
International Search Report of PCT Patent Application No. PCT/CN2020/117767 issued on Mar. 17, 2021.

*Primary Examiner* — Jonathan G Leong
*Assistant Examiner* — Taeyoung Son

(57) ABSTRACT

An aqueous binder composition for a secondary battery electrode is provided, comprising a copolymer and a dispersion medium, wherein the copolymer comprises a structural unit (a) derived from a carboxylic acid group-containing monomer, a structural unit (b) derived from an amide group-containing monomer, a structural unit (c) derived from a nitrile group-containing monomer, a structural unit (d) derived from a hydroxyl group-containing monomer, and at least one anionic reactive emulsifier, with an improved binding capability. In addition, battery cells comprising the cathode prepared using the binder composition disclosed herein exhibit exceptional electrochemical performance.

15 Claims, 1 Drawing Sheet

100

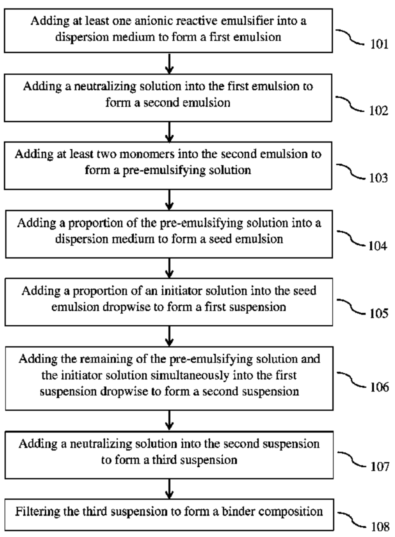

(56) References Cited

U.S. PATENT DOCUMENTS

| | | | | |
|---|---|---|---|---|
| 2017/0069913 | A1* | 3/2017 | Yano | H01M 10/0525 |
| 2019/0085109 | A1* | 3/2019 | Goto | C08F 220/46 |

FOREIGN PATENT DOCUMENTS

| | | | |
|---|---|---|---|
| CN | 110218285 | A | 9/2019 |
| CN | 110364735 | A | 10/2019 |
| CN | 110885650 | A | 3/2020 |
| CN | 110982008 | A | 4/2020 |
| CN | 111057184 | A | 4/2020 |
| EP | 2555293 | B1 | 3/2014 |

* cited by examiner

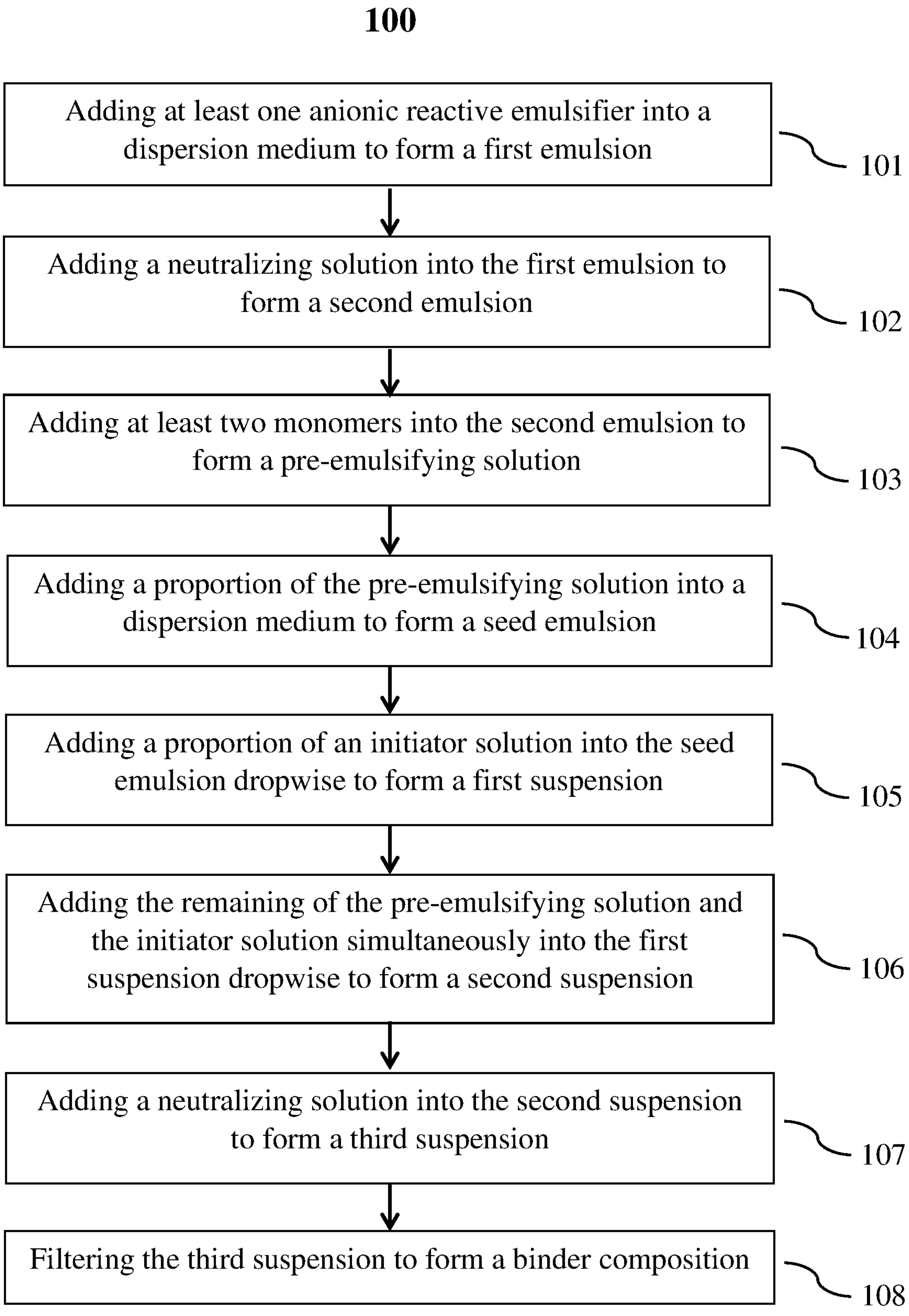
100
Adding at least one anionic reactive emulsifier into a dispersion medium to form a first emulsion
101
Adding a neutralizing solution into the first emulsion to form a second emulsion
102
Adding at least two monomers into the second emulsion to form a pre-emulsifying solution
103
Adding a proportion of the pre-emulsifying solution into a dispersion medium to form a seed emulsion
104
Adding a proportion of an initiator solution into the seed emulsion dropwise to form a first suspension
105
Adding the remaining of the pre-emulsifying solution and the initiator solution simultaneously into the first suspension dropwise to form a second suspension
106
Adding a neutralizing solution into the second suspension to form a third suspension
107
Filtering the third suspension to form a binder composition
108

BINDER COMPOSITION FOR SECONDARY BATTERY

CROSS-REFERENCE TO RELATED APPLICATIONS

This is a U.S. national stage application of the International Patent Application No. PCT/CN2020/117767, filed Sep. 25, 2020, which claims the benefit under 35 U.S.C. § 365(c) of International Patent Application No. PCT/CN2020/096672, filed Jun. 17, 2020, International Patent Application No. PCT/CN2020/110065, filed Aug. 19, 2020 and International Patent Application No. PCT/CN2020/110105, filed Aug. 19, 2020, the content of all of which are incorporated herein by reference in their entireties.

FIELD OF THE INVENTION

The present invention relates to the field of batteries. In particular, this invention relates to a binder composition for lithium-ion batteries.

BACKGROUND OF THE INVENTION

Over the past decades, lithium-ion batteries (LIBs) have come to be widely utilized in various applications, especially consumer electronics, because of their outstanding energy density, long cycle life and high discharging capability. Due to rapid market development of electric vehicles (EV) and grid energy storage, high-performance, low-cost LIBs are currently offering one of the most promising options for large-scale energy storage devices.

Generally, lithium-ion battery electrodes are manufactured by casting an organic-based slurry onto a metallic current collector. The slurry contains electrode active material, conductive carbon, and binder in an organic solvent. The binder provides a good electrochemical stability, holds together the electrode active materials and adheres them to the current collector in the fabrication of electrodes. Polyvinylidene fluoride (PVDF) is one of the most commonly used binders in the commercial lithium-ion battery industry. However, PVDF is insoluble in water and can only dissolve in some specific organic solvents such as N-methyl-2-pyrrolidone (NMP) which is flammable and toxic and hence requires specific handling.

An NMP recovery system must be in place during the drying process to recover NMP vapors. This will generate significant costs in the manufacturing process since it requires a large capital investment. The use of less expensive and more environmentally-friendly solvents, such as aqueous solvents, most commonly water, is preferred in the present invention since it can reduce the large capital cost of the recovery system.

In view of such a problem, attempts have been made to replace conventional PVDF with more environmentally-friendly water-soluble binder materials having comparable binding capability or to make use of the known advantages of PVDF as a binder for electrode slurries without using organic solvents that require specific recovery treatment during manufacture.

Known aqueous binders such as carboxymethyl cellulose (CMC) and styrene-butadiene rubber (SBR) exhibit only marginal adhesion capability and poor cycle life. SBR, in particular, requires a thickening agent in regulating the binder viscosity. Further, SBR exhibits high expandability and undesirable agglomeration characteristics resulting in inhomogeneous dispersion, high electrode resistance and poor performance. In addition to that, within the battery, cathodes are at high voltage. Most rubbers including SBR are only stable at the low voltage of the anode and will decompose at high voltage. Therefore, their applications, especially in cathodes, are somewhat limited.

EP Patent Application Publication No. 2555293 B1 discloses a water-based electrode slurry for a lithium ion-containing electrochemical cell. The slurry comprises a combination of PVDF and SBR and at least one of polyacrylic acid (PAA) and CMC in an aqueous solution and an electrochemically active material. The proposed invention attempts to combine PVDF with a water-based slurry which allows easier handling and less environmental pollution and reduced costs while keeping the known chemical and electrochemical advantages of PVDF as a binder i.e. electrochemical stability, lifetime stability, reduced binder content enables higher C-rates, etc. Despite the fact that organic solvent free slurries could be prepared based on the proposed invention, the slurry consists of fluorine-containing binder material nonetheless. PVDF is highly fluorinated and toxic when exposed to thermal decomposition, which pose risks to the health of people and the environment.

In view of the above, there is always a need for an aqueous binder composition for lithium-ion batteries that exhibits excellent adhesion capability and high electrochemical stability with such properties sustained in the making of a cathode slurry, and thus contribute to exceptional battery electrochemical performance.

SUMMARY OF THE INVENTION

The aforementioned needs are met by various aspects and embodiments disclosed herein. Provided herein is a binder composition for a secondary battery electrode comprising a copolymer and a dispersion medium, wherein the copolymer comprises a structural unit (a) derived from a carboxylic acid group-containing monomer, a structural unit (b) derived from an amide group-containing monomer, a structural unit (c) derived from a nitrile group-containing monomer, a structural unit (d) derived from a hydroxyl group-containing monomer, and at least one anionic reactive emulsifier, with an enhanced binding capability. In addition, battery cells comprising the cathode prepared using the binder composition disclosed herein exhibits exceptional electrochemical performance.

BRIEF DESCRIPTION OF THE DRAWINGS

FIG. 1 is a flow chart of an embodiment illustrating the steps for preparing a binder composition.

DETAILED DESCRIPTION OF THE INVENTION

Provided herein is a binder composition for a secondary battery electrode comprising a copolymer and a dispersion medium, wherein the copolymer comprises a structural unit (a) derived from a carboxylic acid group-containing monomer, a structural unit (b) derived from an amide group-containing monomer, a structural unit (c) derived from a nitrile group-containing monomer, a structural unit (d) derived from a hydroxyl group-containing monomer, and at least one anionic reactive emulsifier.

The term "electrode" refers to a "cathode" or an "anode."

The term "positive electrode" is used interchangeably with cathode. Likewise, the term "negative electrode" is used interchangeably with anode.

The term "binder", "binder material" or "binder composition" refers to a chemical compound, mixture of compounds, or polymer which form colloidal solutions or colloidal dispersions in a dispersion medium such as water, and is used to hold an electrode material and/or a conductive agent in place and adhere them onto a conductive metal part to form an electrode. In some embodiments, the electrode does not comprise any conductive agent.

The term "conductive agent" refers to a material which is chemically inactive and has good electrical conductivity. Therefore, the conductive agent is often mixed with an electrode active material at the time of forming an electrode to improve electrical conductivity of the electrode.

The term "polymer" refers to a polymeric compound prepared by polymerizing monomers, whether of the same or a different type. The generic term "polymer" embraces the terms "homopolymer" as well as "copolymer".

The term "homopolymer" refers to a polymer prepared by the polymerization of the same type of monomer.

The term "copolymer" refers to a polymer prepared by the polymerization of two or more different types of monomers.

The term "unsaturated" as used herein, refers to a moiety having one or more units of unsaturation.

The term "alkyl" or "alkyl group" refers to a univalent group having the general formula $C_nH_{2n+1}$ derived from removing a hydrogen atom from a saturated, unbranched or branched aliphatic hydrocarbon, where n is an integer, or an integer between 1 and 20, or between 1 and 8. Examples of alkyl groups include, but are not limited to, $(C_1-C_8)$alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents. Furthermore, the alkyl group can be branched or unbranched. In some embodiments, the alkyl group contains at least 2, 3, 4, 5, 6, 7, or 8 carbon atoms.

The term "cycloalkyl" or "cycloalkyl group" refers to a saturated or unsaturated cyclic non-aromatic hydrocarbon radical having a single ring or multiple condensed rings. Examples of cycloalkyl groups include, but are not limited to, $(C_3-C_7)$cycloalkyl groups, such as cyclopropyl, cyclobutyl, cyclopentyl, cyclohexyl, and cycloheptyl, and saturated cyclic and bicyclic terpenes and $(C_3-C_7)$cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic. In some embodiments, the cycloalkyl group contains at least 5, 6, 7, 8, 9, or 10 carbon atoms.

The term "alkoxy" refers to an alkyl group, as previously defined, attached to the principal carbon chain through an oxygen atom. Some non-limiting examples of the alkoxy group include methoxy, ethoxy, propoxy, butoxy, and the like. And the alkoxy defined above may be substituted or unsubstituted, wherein the substituent may be, but is not limited to, deuterium, hydroxy, amino, halo, cyano, alkoxy, alkyl, alkenyl, alkynyl, mercapto, nitro, and the like.

The term "alkenyl" refers to an unsaturated straight chain, branched chain, or cyclic hydrocarbon radical that contains one or more carbon-carbon double bonds. Examples of alkenyl groups include, but are not limited to, ethenyl, 1-propenyl, or 2-propenyl, which may optionally be substituted on one or more of the carbon atoms of the radical.

The term "aryl" or "aryl group" refers to an organic radical derived from a monocyclic or polycyclic aromatic hydrocarbon by removing a hydrogen atom. Non-limiting examples of the aryl group include phenyl, naphthyl, benzyl, or tolanyl group, sexiphenylene, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

The term "aliphatic" refers to a $C_1$ to $C_{30}$ alkyl group, a $C_2$ to $C_{30}$ alkenyl group, a $C_2$ to $C_{30}$ alkynyl group, a $C_1$ to $C_{30}$ alkylene group, a $C_2$ to $C_{30}$ alkenylene group, or a $C_2$ to $C_{30}$ alkynylene group. In some embodiments, the alkyl group contains at least 2, 3, 4, 5, 6, 7, or 8 carbon atoms.

The term "aromatic" refers to groups comprising aromatic hydrocarbon rings, optionally including heteroatoms or substituents. Examples of such groups include, but are not limited to, phenyl, tolyl, biphenyl, o-terphenyl, m-terphenyl, p-terphenyl, naphthyl, anthryl, phenanthryl, pyrenyl, triphenylenyl, and derivatives thereof.

The term "substituted" as used to describe a compound or chemical moiety refers to that at least one hydrogen atom of that compound or chemical moiety is replaced with a second chemical moiety. Examples of substituents include, but are not limited to, halogen; alkyl; heteroalkyl; alkenyl; alkynyl; aryl, heteroaryl, hydroxyl; alkoxyl; amino; nitro; thiol; thioether; imine; cyano; amido; phosphonato; phosphine; carboxyl; thiocarbonyl; sulfonyl; sulfonamide; acyl; formyl; acyloxy; alkoxycarbonyl; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; $—CO_2CH_3$; $—CONH_2$; $—OCH_2CONH_2$; $—NH_2$; $—SO_2NH_2$; $—OCHF_2$; $—CF_3$; $—OCF_3$; —NH(alkyl); $—N(alkyl)_2$; —NH(aryl); —N(alkyl)(aryl); $—N(aryl)_2$; —CHO; —CO(alkyl); —CO(aryl); $—CO_2(alkyl)$; and $—CO_2(aryl)$; and such moieties can also be optionally substituted by a fused-ring structure or bridge, for example $—OCH_2O—$. These substituents can optionally be further substituted with a substituent selected from such groups. All chemical groups disclosed herein can be substituted, unless it is specified otherwise.

The term "halogen" or "halo" refers to F, Cl, Br or I.

The term "monomeric unit" refers to the constitutional unit contributed by a single monomer to the structure of a polymer.

The term "structural unit" refers to the total monomeric units contributed by the same monomer type in a polymer.

The term "carboxylic salt group" refers to the carboxylate salt formed when a carboxylic acid reacts with a base. In some embodiments, the proton of the carboxylic acid is replaced with a metal cation. In some embodiments, the proton of the carboxylic acid is replaced with an ammonium ion.

The term "latex" refers to a colloidal dispersion of polymer particles in a liquid.

The term "emulsifier" refers to a surface-active agent that promotes the formation and stabilization of an emulsion.

The term "crosslinking" refers to a process of bonding a polymer chain to another by ionic bonds or covalent bonds.

The term "applying" refers to an act of laying or spreading a substance on a surface.

The term "current collector" refers to any conductive substrate, which is in contact with an electrode layer and is capable of conducting an electrical current flowing to electrodes during discharging or charging a secondary battery. Some non-limiting examples of the current collector include a single conductive metal layer or substrate and a single conductive metal layer or substrate with an overlying conductive coating layer, such as a carbon black-based coating layer. The conductive metal layer or substrate may be in the form of a foil or a porous body having a three-dimensional network structure, and may be a polymeric or metallic material or a metalized polymer. In some embodiments, the three-dimensional porous current collector is covered with a conformal carbon layer.

The term "electrode layer" refers to a layer, which is in contact with a current collector, that comprises an electrochemically active material. In some embodiments, the electrode layer is made by applying a coating on to the current collector. In some embodiments, the electrode layer is located on the surface of the current collector. In other embodiments, the three-dimensional porous current collector is coated conformally with an electrode layer.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "particle size D50" refers to a volume-based accumulative 50% size (D50), which is a particle size at a point of 50% on an accumulative curve (i.e., a diameter of a particle in the 50th percentile (median) of the volumes of particles) when the accumulative curve is drawn so that a particle size distribution is obtained on the volume basis and the whole volume is 100%. Further, with respect to the cathode active material of the present invention, the particle size D50 means a volume-averaged particle size of secondary particles which can be formed by mutual agglomeration of primary particles, and in a case where the particles are composed of the primary particles only, it means a volume-averaged particle size of the primary particles.

The term "polydispersity index" or "PDI" refers to a ratio of the weight average molecular weight ($M_w$) relative to the number average molecular weight ($M_n$). It is a measure of the distribution of the molecular weight within a given binder composition sample.

The term "solid content" refers to the amount of non-volatile material remaining after evaporation.

The term "mean roughness depth" or "$R_z$" refers to the arithmetic mean value of the single roughness depths of consecutive sampling lengths of a current collector.

The term "peeling strength" refers to the amount of force required to separate a current collector and an electrode active material coating that are bonded to each other. It is a measure of the binding strength between such two materials and is usually expressed in N/cm.

The term "adhesive strength" refers to the amount of force required to separate a current collector and a binder composition coating that are bonded to each other. It is a measure of the adhesion strength between such two materials and is usually expressed in N/cm.

The term "swelling" refers to a volumetric evolution of binder composition after soaking in the electrolyte or the uptake of electrolyte due to electrolyte-binder interactions.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 ampere-hour (Ah) is the equivalent of 3,600 coulombs of electrical charge. Similarly, the term "miniampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight, usually expressed in Ah/kg or mAh/g.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: , $R=R^L+k*(R^U-R^L)$, wherein k is a variable ranging from 0 percent to 100 percent. Moreover, any numerical range defined by two R numbers as defined in the above is also specifically disclosed.

Currently, cathodes are often prepared by dispersing a cathode active material, a binder material and a conductive agent in an organic solvent such as N-methyl-2-pyrrolidone (NMP) to form a cathode slurry, then coating the cathode slurry onto a current collector and drying it.

Very often the binders influence on cell performance is underestimated, as they are considered as electrochemically inactive materials. The aim of a binder is to adhere the active material particles and the conductive agent together to form a continuous electrical conduction path to the current collector. Along with the binding capability, a binder material should be capable of facilitating electron and ion transportation to reduce the impedance between the current collector and the electrode materials and have sufficient elasticity to prevent the electrode from swelling due to volume expansion and contraction during charging and discharging.

Polyvinylidene fluoride (PVDF) has been widely used as a binder material in the production of lithium-ion batteries. However, PVDF can only dissolve in specific organic solvents such as NMP which is flammable and toxic and hence require specific handling. An NMP recovery system must be in place during the drying process to recover NMP vapors. This will generate significant energy consumption and production costs in the manufacturing process. Accordingly, exploring a novel environmentally-friendly binder material to replace PVDF has become imperative in the development of lithium-ion battery binder materials.

Carboxymethyl cellulose (CMC) and styrene butadiene rubber (SBR) are some of the typical aqueous binders that have already been used in large-scale commercial applications. However, these binders have limited binding strengths and capabilities in preventing electrode swelling. Furthermore, within the battery, cathodes are at high voltage. Most rubbers including SBR are only stable at the low voltage of the anode and will decompose at high voltage. Therefore, their applications, especially in cathodes, are somewhat limited.

Accordingly, the present invention provides a method of preparing an aqueous binder composition comprising a copolymer and a dispersion medium, wherein the copolymer comprises a structural unit (a) derived from a carboxylic acid group-containing monomer, a structural unit (b) derived from an amide group-containing monomer, a structural unit (c) derived from a nitrile group-containing monomer, a structural unit (d) derived from a hydroxyl group-containing monomer, and at least one anionic reactive emulsifier. FIG. 1 is a flow chart of an embodiment illustrating the steps of method 100 for preparing a binder composition. It is found that presence of anionic reactive emulsifier in the binder composition described herein exhibits an enhanced adhesive capability and simultaneously has the unexpected effect of improving the capacity and electrochemical performance of cathodes formed therefrom.

In some embodiments, the binder composition described herein is produced via emulsion polymerization that involves the application of amphipathic emulsifier to disperse hydrophobic monomers, polymers or monomer-polymer complexes through an aqueous phase, with generation of free radicals with a water-soluble free radical initiator.

In some embodiments, the first emulsion is formed by adding at least one anionic reactive emulsifier in a dispersion medium in step 101.

A dispersion medium is used as a solvent for the emulsifiers, free radical initiators and other constituents. In the traditional process for preparing binder, organic compounds, such as NMP, are often used as the solvent. However, using organic solvents causes severe environmental issues. One of the advantages of the present invention is that it prepares a binder composition by an aqueous processing method in which water is used as the dispersion medium.

In some embodiments, the dispersion medium can further comprise a hydrophilic solvent selected from the group consisting of ethanol, isopropanol, n-propanol, tert-butanol, n-butanol, dimethylacetamide (DMAc), dimethylformamide (DMF), N-methylpyrrolidone (NMP), methyl ethyl ketone (MEK), ethyl acetate (EA), butyl acetate (BA) and combinations thereof. In some embodiments, the dispersion medium is free of water, ethanol, isopropanol, n-propanol, tert-butanol, n-butanol, dimethylacetamide (DMAc), dimethylformamide (DMF), N-methylpyrrolidone (NMP), methyl ethyl ketone (MEK), ethyl acetate (EA) or butyl acetate (BA).

Emulsifiers perform many important functions in producing fine particle dispersions in the preparation of the binder composition in the present invention. They serve to (i) reduce the interfacial surface tension between monomer and the aqueous phase so that, with agitation, the monomer is dispersed or emulsified in the water phase; (ii) stabilize the monomer droplets in an emulsion form, (iii) provide nucleation, reaction and growth sites for the polymer particles and (iv) stabilize the dispersion of the polymer during propagation and after polymerization.

Emulsifiers are surface-active agents. When the emulsifier concentration exceeds the critical micelle concentration (C.M.C.), aggregation of discrete emulsifier molecules occurs to form micelles, and thus the surface tension is decreased. These micelles are composed of emulsifier molecules in which the oil-soluble tails are directed inward towards the center, with the water-soluble heads on the periphery nearest the water atmosphere. As a result, monomer droplets in the mixture diffuse through the aqueous phase and enter in to the vicinity of the micelles. Micelles continue to swell as polymer is formed and more of the monomer diffuses in. Eventually, the micelle structure is destroyed and the emulsifier molecules remain on the polymer particles as unimolecular adsorbed layers. Monomer will then continue to diffuse into the polymer particles and polymerize until conversion is complete.

Emulsifiers owe their unique properties to the presence a long-chain non-polar (hydrophobic or oil-soluble) group and a polar (hydrophilic or water-soluble) head group. They are usually classified into four main types: anionic, cationic, non-ionic and amphoteric (zwitterionic), according to the electrical charge (or absence of charge) that the polar head group carries. In some embodiments, the anionic emulsifiers are extensively preferred. They stabilize latex particles via electrostatic repulsion mechanism.

Besides the above-mentioned emulsifier types, emulsifier can also be further categorized as non-reactive or reactive depending on its reactivity. Emulsion polymerization conducted using the conventional method generally employs non-reactive emulsifiers.

Some non-limiting examples of the anionic non-reactive emulsifier include higher fatty acid salts such as sodium oleate, sodium stearate, sodium palmitate and the like; alkyl aryl sulfonates such as sodium dodecyl benzene sulfonate and the like; alkyl sulphate salts such as sodium lauryl sulphate, sodium octyl sulphate, lithium dodecyl sulphate, ammonium lauryl sulphate and the like; polyoxyethylene alkyl ether sulphate salts such as sodium polyoxyethylene lauryl ether sulphate and the like; polyoxyethylene alkyl aryl ether sulphate salts such as sodium polyoxyethylene nonyl phenyl ether sulphate and the like; dialkyl sulfosuccinate salts such as sodium dioctyl sulfosuccinate and the like; polyoxyethylene alkyl sulfosuccinate salts such as sodium polyoxyethylene lauryl sulfosuccinate and the like; rosinate salts such as sodium rosinate, potassium rosinate and the like. In some embodiments, the anionic non-reactive emulsifier comprises a cation selected from the group consisting of sodium, potassium, ammonium, and combinations thereof.

In the process of polymerization, the non-reactive emulsifier molecules are physically adsorbed on the surface of the polymer particles. However, in the subsequent electrode layer-forming process, the non-reactive emulsifier molecules will desorb from the surface of the polymer particles along with the volatilization of water and migration in the wet layer. Enrichment zones formed or migration of non-reactive emulsifier molecules with moisture inside the cathode coating formed therefrom adversely affect the adhesion properties of the binder composition.

Other than having a molecular structure with emulsifying capability as non-reactive emulsifiers, reactive emulsifiers contain at least an ethylenic unsaturated double bond (radically polymerizable functional group) that is capable of reacting with the monomer. During polymerization, the reactive emulsifier molecules not only adsorb on the surface of the polymer particles to provide a colloid stabilizing effect, they are covalently anchored onto the surface of polymer particles. In the subsequent electrode layer-forming process, the reactive emulsifier molecules will not migrate or desorb from the polymer particles with the volatilization of water, effectively improving the surface adhesion of the binder composition.

Some non-limiting examples of radically polymerizable functional groups contained in the reactive emulsifiers include a vinyl group, a propenyl group, an allyl group, a styryl group, an allyl ether group, an iso-propenyl group, an acrylate group, a methacrylate group, an acrylamide group and the like.

In some embodiments, the emulsifier system used in the polymerization step may comprise an anionic reactive emulsifier alone or two or three anionic reactive emulsifiers in parallel.

In some embodiments, the anionic reactive emulsifier may comprise the composition of imparting at least one of the aforementioned radically polymerizable functional group(s) into the aforementioned anionic non-reactive emulsifier.

Some non-limiting examples of commercially available anionic reactive emulsifiers include alkyl ether-based one such as Aqualon KH-05, KH-10, KH-20, Adeka Reasoap SR-10N, SR-20N, Latemul PD-104, SR-10 and the like; sulfosuccinic acid ester-based one such as Latemul S-120, S-120A, S-180P, S-180A, Eleminol JS-20 and the like; alkyl phenyl ether-based one or alkyl phenyl ester-based one such as Aqualon H-2855A, H-3855B, H-3855C, H-3856, HS-05, HS-10, HS-20, HS-30, HS-1025, BC-05, BC-10, BC-20, Adeka Reasoap SDX-222, SDX-223, SDX-232, SDX-233, SDX-259, SE-10N, SE-20N and the like; (meth)acrylate sulfuric acid ester-based one such as Antox MS-60, MS-2N, MS-$NH_4$, Eleminol SE-1025 and the like and phosphate-based one such as H-3330PL, Adeka Reasoap PP-70 and the like.

In some embodiments, the anionic reactive emulsifier may be selected from the group consisting of sodium 2-acrylamido-2-methyl-1-propanesulfonate (AMPS-Na), sodium hydroxypropane sulfonate, sodium dodecyl allyl sulfosuccinate, sodium 1-allyloxy-2 hydroxypropyl sulfonate (COPs-1), sodium vinyl sulfonate (SVS), sodium vinyl alkyl sulfonate, sodium styrene sulfonate, allyloxy fatty alcohol polyoxyethylene ether ammonium sulfate, allyloxy alkyl phenol polyoxyethylene ether ammonium sulfate, polyoxyethylene allyloxy nonylphenoxypropyl ether ammonium sulfate, alkyl allyl sulfosuccinate, methacrylic acid polyoxyalkylene sulfate ester salt, ethylene glycol methacrylate sulfate ester salt, polyoxyethylene alkyl propenyl phenyl ether sulfate ammonium salt, α-sulfo-ω-(1-(nonylphenoxy) methyl-2-(2-propenyloxy) ethoxy)-poly (oxy-1,2-ethanediyl) ammonium salt, polyoxyethylene-1-(allyloxymethyl) alkyl ether sulfate ammonium salt, polyoxyalkylene alkenyl ether ammonium sulfate, and combinations thereof.

In some embodiments, the anionic reactive emulsifier may be selected from the group consisting of sodium allyloxy hydroxypropyl sulfonates, sodium methallyl sulfonates, sulfopropyl acrylate, vinyl sulfonate, vinyl phosphate, monosodium ethylsulfonate monododecyl maleate, allylsulfosuccinate derivatives and combinations thereof.

In some embodiments, examples of an anionic reactive emulsifier include those represented by the following general formula (1).

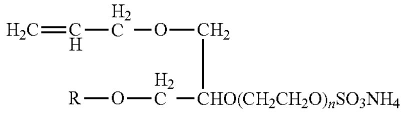

(1)

In formula (1), R represents an alkyl group, and n represents an integer of 10 to 40. In some embodiments, an anionic reactive emulsifier represented by formula (1) is SR-10. In some embodiments, anionic reactive emulsifier represented by formula (1) is allyloxy fatty alcohol polyoxyethylene ether ammonium sulfate.

In some embodiments, examples of an anionic reactive emulsifier include those represented by the following general formula (2).

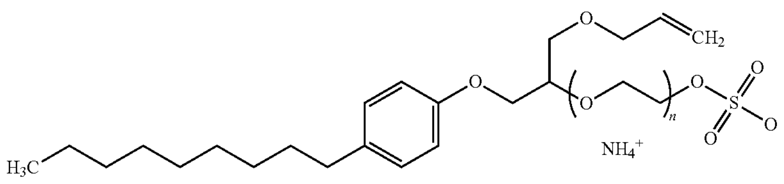

(2)

In formula (2), n represents an integer of 10 to 40. In some embodiments, an anionic reactive emulsifier represented by formula (2) is SE-10. In some embodiments, anionic reactive emulsifier represented by formula (2) is polyoxyethylene allyloxy nonylphenoxypropyl ether ammonium sulfate.

In some embodiments, the proportion of the anionic reactive emulsifier is from about 0.1% to about 5%, from about 0.2% to about 5%, from about 0.3% to about 5%, from about 0.4% to about 5%, from about 0.5% to about 5%, from about 0.5% to about 4.9%, from about 0.5% to about 4.8%, from about 0.5% to about 4.7%, from about 0.5% to about 4.6%, from about 0.5% to about 4.5%, from about 0.5% to about 4.4%, from about 0.5% to about 4.3%, from about 0.5% to about 4.2%, from about 0.5% to about 4.1%, from about 0.5% to about 4%, from about 0.5% to about 3.9%, from about 0.5% to about 3.8%, from about 0.5% to about 3.7%, from about 0.5% to about 3.6%, from about 0.5% to about 3.5%, from about 0.5% to about 3.4%, from about 0.5% to about 3.3%, from about 0.5% to about 3.2%, from about 0.5% to about 3.1%, from about 0.5% to about 3%, from about 0.5% to about 2.9%, from about 0.5% to about 2.8%, from about 0.5% to about 2.7%, from about 0.5% to about 2.6%, from about 0.5% to about 2.5%, from about 0.5% to about 2.4%, from about 0.5% to about 2.3%, from about 0.5% to about 2.2%, from about 0.5% to about 2.1%, from about 0.5% to about 2%, from about 0.5% to about 1.9%, from about 0.5% to about 1.8%, from about 0.5% to about 1.7%, from about 0.5% to about 1.6% or from about 0.5% to about 1.5% by weight, based on the total weight of monomers added in the preparation of the binder composition. When the proportion of the anionic reactive emulsifier based on the total weight of monomers added in the preparation of the binder composition is within the above range, the concentration of anionic reactive emulsifier is sufficient for micelles formation and polymerization stability is improved.

In some embodiments, the proportion of anionic reactive emulsifier is less than 5%, less than 4.8%, less than 4.6%, less than 4.4%, less than 4.2%, less than 4%, less than 3.8%, less than 3.6%, less than 3.4%, less than 3.2%, less than 3%, less than 2.8%, less than 2.6%, less than 2.4%, less than 2.2%, less than 2%, less than 1.8%, less than 1.6%, less than 1.4%, less than 1.2%, less than 1%, less than 0.8%, less than 0.6%, less than 0.4% or less than 0.2% by weight, based on the total weight of monomers added in the preparation of the binder composition. In some embodiments, the proportion of anionic reactive emulsifier is more than 0.1%, more than 0.2%, more than 0.4%, more than 0.6%, more than 0.8%, more than 1%, more than 1.2%, more than 1.4%, more than 1.6%, more than 1.8%, more than 2%, more than 2.2%, more than 2.4%, more than 2.6%, more than 2.8%, more than 3%, more than 3.2%, more than 3.4%, more than 3.6%, more than 3.8%, more than 4%, more than 4.2%, more than 4.4%, more than 4.6% or more than 4.8% by weight, based on the total weight of monomers added in the preparation of the binder composition.

In some embodiments, the anionic reactive emulsifier can be further categorized into polyoxyalkylene-based anionic reactive emulsifier and non-polyoxyalkylene-based anionic reactive emulsifier.

In some embodiments, the polyoxyalkylene-based anionic reactive emulsifier may be selected from the group consisting of allyloxy fatty alcohol polyoxyethylene ether ammonium sulfate, allyloxy alkyl phenol polyoxyethylene ether ammonium sulfate, polyoxyethylene allyloxy nonylphenoxypropyl ether ammonium sulfate, polyoxyethylene alkyl propenyl phenyl ether sulfate ammonium salt, polyoxyethylene-1-(allyloxymethyl) alkyl ether sulfate ammonium salt, methacrylic acid polyoxyalkylene sulfate ester salt, polyoxyalkylene alkenyl ether ammonium sulfate, and combinations thereof.

In some embodiments, the non-polyoxyalkylene-based anionic reactive emulsifier may be selected from the group consisting of sodium 2-acrylamido-2-methyl-1-propanesulfonate (AMPS-Na), sodium hydroxypropane sulfonate, sodium dodecyl allyl sulfosuccinate, sodium 1-allyloxy-2 hydroxypropyl sulfonate (COPs-1), sodium vinyl sulfonate (SVS), sodium vinyl alkyl sulfonate, sodium styrene sulfonate, alkyl allyl sulfosuccinate, ethylene glycol methacrylate sulfate ester salt, and combinations thereof.

In some embodiments, the proportion of the polyoxyalkylene-based anionic reactive emulsifier is from about 0.1% to about 5%, from about 0.1% to about 4.8%, from about 0.1% to about 4.6%, from about 0.1% to about 4.4%, from about 0.1% to about 4.2%, from about 0.1% to about 4%, from about 0.1% to about 3.8%, from about 0.1% to about 3.6%, from about 0.1% to about 3.4%, from about 0.1% to about 3.2%, from about 0.1% to about 3%, from about 0.1% to about 2.9%, from about 0.1% to about 2.8%, from about 0.1% to about 2.7%, from about 0.1% to about 2.6%, from about 0.1% to about 2.5%, from about 0.1% to about 2.4%, from about 0.1% to about 2.3%, from about 0.1% to about 2.2%, from about 0.1% to about 2.1%, from about 0.1% to about 2%, from about 0.1% to about 1.9%, from about 0.1% to about 1.8%, from about 0.1% to about 1.7%, from about 0.1% to about 1.6%, from about 0.1% to about 1.5%, from about 0.1% to about 1.4%, from about 0.1% to about 1.3%, from about 0.1% to about 1.2%, from about 0.1% to about 1.1%, from about 0.1% to about 1%, from about 0.2% to about 1.8%, from about 0.2% to about 1%, from about 0.3% to about 2% or from about 0.3% to about 1.8% by weight, based on the total weight of monomers added in the preparation of the binder composition.

In some embodiments, the proportion of the polyoxyalkylene-based anionic reactive emulsifier is less than 5%, less than 4.8%, less than 4.6%, less than 4.4%, less than 4.2%, less than 4%, less than 3.8%, less than 3.6%, less than 3.4%, less than 3.2%, less than 3%, less than 2.8%, less than 2.6%, less than 2.4%, less than 2.2%, less than 2%, less than 1.8%, less than 1.6%, less than 1.4%, less than 1.2%, less than 1%, less than 0.8%, less than 0.6% or less than 0.4% by weight, based on the total weight of monomers added in the preparation of the binder composition. In some embodiments, the proportion of the polyoxyalkylene-based anionic reactive emulsifier is more than 0.1%, more than 0.2%, more than 0.4%, more than 0.6%, more than 0.8%, more than 1%, more than 1.2%, more than 1.4%, more than 1.6%, more than 1.8%, more than 2%, more than 2.2%, more than 2.4%, more than 2.6%, more than 2.8%, more than 3%, more than 3.2%, more than 3.4%, more than 3.6%, more than 3.8%, more than 4%, more than 4.2%, more than 4.4% or more than 4.6% by weight, based on the total weight of monomers added in the preparation of the binder composition.

In some embodiments, the proportion of the non-polyoxyalkylene-based anionic reactive emulsifier is from about 0.8% to about 5%, from about 0.8% to about 4.9%, from about 0.8% to about 4.8%, from about 0.8% to about 4.7%, from about 0.8% to about 4.6%, from about 0.8% to about 4.5%, from about 0.8% to about 4.4%, from about 0.8% to about 4.3%, from about 0.8% to about 4.2%, from about 0.8% to about 4.1%, from about 0.8% to about 4%, from about 0.8% to about 3.9%, from about 0.8% to about 3.8%, from about 0.8% to about 3.7%, from about 0.8% to about 3.6%, from about 0.8% to about 3.5%, from about 0.8% to about 3.4%, from about 0.8% to about 3.3%, from about 0.8% to about 3.2%, from about 0.8% to about 3.1%, from about 0.8% to about 3%, from about 0.8% to about 2.8%, from about 0.8% to about 2.6%, from about 0.8% to about 2.4%, from about 0.8% to about 2.2%, from about 0.8% to about 2%, from about 0.8% to about 1.8%, from about 0.8% to about 1.6%, from about 0.9% to about 4.5%, from about 0.9% to about 3% or from about 0.9% to about 2.5% by weight, based on the total weight of monomers added in the preparation of the binder composition.

In some embodiments, the proportion of the non-polyoxyalkylene-based anionic reactive emulsifier is less than 5%, less than 4.8%, less than 4.6%, less than 4.4%, less than 4.2%, less than 4%, less than 3.8%, less than 3.6%, less than 3.4%, less than 3.2%, less than 3%, less than 2.8%, less than 2.6%, less than 2.4%, less than 2.2%, less than 2%, less than 1.8%, less than 1.6%, less than 1.4%, less than 1.2% or less than 1% by weight, based on the total weight of monomers added in the preparation of the binder composition. In some embodiments, the proportion of the non-polyoxyalkylene-based anionic reactive emulsifier is more than 0.8%, more than 1%, more than 1.2%, more than 1.4%, more than 1.6%, more than 1.8%, more than 2%, more than 2.2%, more than 2.4%, more than 2.6%, more than 2.8%, more than 3%, more than 3.2%, more than 3.4%, more than 3.6%, more than 3.8%, more than 4%, more than 4.2%, more than 4.4%, more than 4.6% or more than 4.8% by weight, based on the total weight of monomers added in the preparation of the binder composition.

In some embodiments, the first emulsion is stirred for a time period of from about 10 minutes to about 60 minutes, from about 15 minutes to about 60 minutes, from about 20 minutes to about 60 minutes, from about 20 minutes to about 55 minutes, from about 20 minutes to about 50 minutes, from about 20 minutes to about 45 minutes, from about 20 minutes to about 40 minutes, from about 20 minutes to about 35 minutes or from about 25 minutes to about 35 minutes. In some embodiments, the first emulsion is stirred for a time period of less than 60 minutes, less than 55 minutes, less than 50 minutes, less than 45 minutes, less than 40 minutes, less than 35 minutes, less than 30 minutes, less than 25 minutes, less than 20 minutes or less than 15 minutes. In some embodiments, the first emulsion is stirred for a time period of more than 10 minutes, more than 15 minutes, more than 20 minutes, more than 25 minutes, more than 30 minutes, more than 35 minutes, more than 40 minutes, more than 45 minutes, more than 50 minutes or more than 55 minutes.

In some embodiments, the first emulsion is stirred at a speed of from about 10 rpm to about 600 rpm, from about 50 rpm to about 600 rpm, from about 100 rpm to about 600 rpm, from about 150 rpm to about 600 rpm, from about 200 rpm to about 600 rpm, from about 250 rpm to about 600 rpm, from about 300 rpm to about 600 rpm, from about 300 rpm to about 550 rpm, from about 300 rpm to about 500 rpm, from about 320 rpm to about 480 rpm, from about 340 rpm to about 460 rpm or from about 360 rpm to about 440 rpm. In some embodiments, the first emulsion is stirred at a speed of less than 600 rpm, less than 550 rpm, less than 500 rpm, less than 450 rpm, less than 400 rpm, less than 350 rpm, less than 300 rpm, less than 250 rpm, less than 200 rpm, less than 150 rpm, less than 100 rpm or less than 50 rpm. In some embodiments, the first emulsion is stirred at a speed of more than 10 rpm, more than 50 rpm, more than 100 rpm, more than 150 rpm, more than 200 rpm, more than 250 rpm, more than 300 rpm, more than 350 rpm, more than 400 rpm, more than 450 rpm, more than 500 rpm or more than 550 rpm.

In other embodiments, when a combination of anionic reactive emulsifiers is used, the anionic reactive emulsifiers may be added sequentially in forming the first emulsion. Stirring or dispersion may be employed between the additions.

In some embodiments, a neutralizing solution is prepared by dissolving the neutralizing agent in water. In some embodiments, the second emulsion is formed by adding the neutralizing solution into the first emulsion in step 102. Addition of neutralizing solution aims to improve polymerization stability and provide a pH range in which initiator that is added at a later stage is capable of generating free radicals.

Establishing a desirable range of pH to work with is especially important in aqueous systems. Neutralizing agents are commonly used for pH adjustment. In some embodiments, the neutralizing agent include alkaline aqueous solutions. In some embodiments, the neutralizing agent may be selected from the group consisting of ammonia, sodium bicarbonate, sodium hydroxide, potassium hydroxide, lithium hydroxide, ammonium hydroxide, magnesium hydroxide, calcium hydroxide, triethylamine, dimethylethanolamine (DMEA), sodium carbonate, lithium carbonate, lithium bicarbonate and combinations thereof.

In some embodiments, the second emulsion is stirred for a time period of from about 5 minutes to about 45 minutes, from about 5 minutes to about 40 minutes, from about 5 minutes to about 35 minutes, from about 5 minutes to about 30 minutes, from about 5 minutes to about 25 minutes, from about 5 minutes to about 20 minutes or from about 10 minutes to about 20 minutes. In some embodiments, the second emulsion is stirred for a time period of less than 45 minutes, less than 40 minutes, less than 35 minutes, less than 30 minutes, less than 25 minutes, less than 20 minutes, less than 15 minutes or less than 10 minutes. In some embodiments, the second emulsion is stirred for a time period of more than 5 minutes, more than 10 minutes, more than 15 minutes, more than 20 minutes, more than 25 minutes, more than 30 minutes, more than 35 minutes or more than 40 minutes.

In some embodiments, the second emulsion is stirred at a speed of from about 10 rpm to about 600 rpm, from about 50 rpm to about 600 rpm, from about 100 rpm to about 600 rpm, from about 150 rpm to about 600 rpm, from about 200 rpm to about 600 rpm, from about 250 rpm to about 600 rpm, from about 300 rpm to about 600 rpm, from about 300 rpm to about 550 rpm, from about 300 rpm to about 500 rpm, from about 320 rpm to about 480 rpm, from about 340 rpm to about 460 rpm or from about 360 rpm to about 440 rpm. In some embodiments, the second emulsion is stirred at a speed of less than 600 rpm, less than 550 rpm, less than 500 rpm, less than 450 rpm, less than 400 rpm, less than 350 rpm, less than 300 rpm, less than 250 rpm, less than 200 rpm, less than 150 rpm, less than 100 rpm or less than 50 rpm. In some embodiments, the second emulsion is stirred at a speed of more than 10 rpm, more than 50 rpm, more than 100 rpm, more than 150 rpm, more than 200 rpm, more than 250 rpm, more than 300 rpm, more than 350 rpm, more than 400 rpm, more than 450 rpm, more than 500 rpm or more than 550 rpm.

In some embodiments, the pre-emulsifying solution is formed by adding at least two monomers into the second emulsion in step 103.

In some embodiments, the monomer is selected from the group consisting of a nitrile group-containing monomer, a carboxylic acid group-containing monomer, an amide group-containing monomer, a hydroxyl group-containing monomer and combinations thereof.

Structural unit (a) is derived from a carboxylic acid group-containing monomer. Any monomer that has at least one carboxylic acid group may be used as carboxylic acid group-containing monomer without any specific limitations. In some embodiments, the carboxylic acid group-containing monomer is acrylic acid, methacrylic acid, crotonic acid, 2-butyl crotonic acid, cinnamic acid, maleic acid, maleic anhydride, fumaric acid, itaconic acid, itaconic anhydride, tetraconic acid or a combination thereof. In certain embodiments, the carboxylic acid group-containing monomer is 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid or a combination thereof. In some embodiments, the carboxylic acid group-containing monomer is methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate or a combination thereof. In some embodiments, the carboxylic acid group-containing monomer is maleic anhydride, methyl maleic anhydride, dimethyl maleic anhydride, acrylic anhydride, methacrylic anhydride, methacrolein, methacryloyl chloride, methacryloyl fluoride, methacryloyl bromide, or a combination thereof.

In some embodiments, the proportion of the carboxylic acid group-containing monomer is from about 5% to about 15%, from about 5% to about 14%, from about 5% to about 13%, from about 5% to about 12%, from about 5% to about 11%, from about 5% to about 10%, from about 5% to about 9%, from about 5% to about 8%, from about 6% to about 15%, from about 7% to about 15%, from about 8% to about 15%, from about 9% to about 15%, from about 10% to about 15%, from about 11% to about 15%, from about 12% to about 15%, from about 6% to about 14%, from about 7% to about 13% or from about 8% to about 12% by weight, based on the total weight of monomers added in the preparation of the binder composition.

In some embodiments, the proportion of the carboxylic acid group-containing monomer is less than 15%, less than 14%, less than 13%, less than 12%, less than 11%, less than 10%, less than 9%, less than 8%, less than 7% or less than 6% by weight, based on the total weight of monomers added in the preparation of the binder composition. In some embodiments, the proportion of the carboxylic acid group-containing monomer is more than 5%, more than 6%, more than 7%, more than 8%, more than 9%, more than 10%, more than 11%, more than 12%, more than 13% or more than 14% by weight, based on the total weight of monomers added in the preparation of the binder composition.

Structural unit (b) is derived from an amide group-containing monomer. Any monomer that has at least one amide group may be used as amide group-containing monomer without any specific limitations. In some embodiments, the amide group-containing monomer is acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl)methacrylamide, N-(ethoxymethyl) methacrylamide, N-(propoxymethyl)methacrylamide, N-(butoxymethyl)methacrylamide, N,N-dimethyl methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide or a combination thereof.

In some embodiments, the proportion of the amide group-containing monomer is from about 25% to about 40%, from about 26% to about 40%, from about 27% to about 40%, from about 28% to about 40%, from about 29% to about 40%, from about 30% to about 40%, from about 31% to about 40%, from about 32% to about 40%, from about 32% to about 39%, from about 32% to about 38%, from about 32% to about 37%, from about 32% to about 36%, from about 28% to about 34%, from about 35% to about 40% or from about 25% to about 30% by weight, based on the total weight of monomers added in the preparation of the binder composition.

In some embodiments, the proportion of the amide-group-containing monomer is less than 40%, less than 39%, less than 38%, less than 37%, less than 36%, less than 35%, less than 34%, less than 33%, less than 32%, less than 31%, less than 30%, less than 29%, less than 28%, less than 27% or less than 26% by weight, based on the total weight of monomers added in the preparation of the binder composition. In some embodiments, the proportion of the amide group-containing monomer is more than 25%, more than 26%, more than 27%, more than 28%, more than 29%, more than 30%, more than 31%, more than 32%, more than 33%, more than 34%, more than 35%, more than 36%, more than 37%, more than 38% or more than 39% by weight, based on the total weight of monomers added in the preparation of the binder composition.

Structural unit (c) is derived from a nitrile group-containing monomer. Any monomer that has at least one nitrile group may be used as nitrile group-containing monomer without any specific limitations. In some embodiments, the nitrile group-containing monomer include α,β-ethylenically unsaturated nitrile monomers. In some embodiments, the nitrile group-containing monomer is acrylonitrile, α-halogenoacrylonitrile, α-alkylacrylonitrile or a combination thereof. In some embodiments, the nitrile group-containing monomer is α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)acrylonitrile, α-(chlorophenyl)acrylonitrile, α-(cyanophenyl)acrylonitrile, vinylidene cyanide, or a combination thereof.

In certain embodiments, the proportion of the nitrile group-containing monomer is from about 45% to about 60%, from about 45% to about 59%, from about 45% to about 58%, from about 45% to about 57%, from about 45% to about 56%, from about 45% to about 55%, from about 45% to about 54%, from about 45% to about 53%, from about 45% to about 52%, from about 45% to about 51%, from about 45% to about 50%, from about 46% to about 60%, from about 47% to about 60%, from about 48% to about 60%, from about 49% to about 60%, from about 50% to about 60%, from about 51% to about 60%, from about 52% to about 58%, from about 53% to about 57% or from about 54% to about 56% by weight, based on the total weight of monomers added in the preparation of the binder composition.

In some embodiments, the proportion of the nitrile group-containing monomer is more than 45%, more than 46%, more than 47%, more than 48%, more than 49%, more than 50%, more than 51%, more than 52%, more than 53%, more than 54%, more than 55%, more than 56%, more than 57% or more than 58% by weight, based on the total weight of monomers added in the preparation of the binder composition. In some embodiments, the proportion of the nitrile group-containing monomer is less than 60%, less than 59%, less than 58%, less than 57%, less than 56%, less than 55%, less than 54%, less than 53%, less than 52%, less than 51%, less than 50%, less than 49%, less than 48% or less than 47% by weight, based on the total weight of monomers added in the preparation of the binder composition.

Structural unit (d) is derived from a hydroxyl group-containing monomer. Any monomer that has at least one hydroxyl group may be used as a hydroxyl group-containing monomer without any specific limitations. In some embodiments, the hydroxyl group-containing monomer is $C_1$ to $C_{20}$ alkyl group or a $C_5$ to $C_{20}$ cycloalkyl group-containing methacrylate or acrylate with at least one hydroxyl group attached to it. In some embodiments, the hydroxyl group-containing monomer is 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, 2-hydroxybutyl acrylate, 4-hydroxybutyl acrylate, 2-hydroxybutyl methacrylate, 4-hydroxybutyl methacrylate, 5-hydroxypentyl acrylate, 5-hydroxypentyl methacrylate, 6-hydroxyhexyl acrylate, 6-hydroxyhexyl methacrylate, 1,4-cyclohexanedimethanol monoacrylate, 3-chloro-2-hydroxypropyl acrylate, 3-chloro-2-hydroxypropyl methacrylate, diethylene glycol monomethacrylate, diethylene glycol monoacrylate or a combination thereof.

In some embodiments, the proportion of the hydroxyl group-containing monomer is from about 5% to about 15%, from about 5% to about 14%, from about 5% to about 13%, from about 5% to about 12%, from about 5% to about 11%, from about 5% to about 10%, from about 5% to about 9%, from about 5% to about 8%, from about 6% to about 15%, from about 7% to about 15%, from about 8% to about 15%, from about 9% to about 15%, from about 10% to about 15%, from about 11% to about 15%, from about 12% to about 15%, from about 6% to about 14%, from about 7% to about 13% or from about 8% to about 12% by weight, based on the total weight of monomers added in the preparation of the binder composition.

In some embodiments, the proportion of the hydroxyl group-containing monomer is less than 15%, less than 14%, less than 13%, less than 12%, less than 11%, less than 10%, less than 9%, less than 8%, less than 7% or less than 6% by weight, based on the total weight of monomers added in the preparation of the binder composition. In some embodiments, the proportion of the hydroxyl group-containing monomer is more than 5%, more than 6%, more than 7%, more than 8%, more than 9%, more than 10%, more than 11%, more than 12%, more than 13% or more than 14% by weight, based on the total weight of monomers added in the preparation of the binder composition.

In some embodiments, the weight ratio of the anionic reactive emulsifier to the nitrile group-containing monomer added in the preparation of the binder composition is from about 0.5% to about 10%, from about 0.5% to about 9.5%, from about 0.5% to about 9%, from about 0.5% to about 8.5%, from about 0.5% to about 8%, from about 0.5% to about 7.5%, from about 0.5% to about 7%, from about 0.5% to about 6.8%, from about 0.5% to about 6.6%, from about 0.5% to about 6.4%, from about 0.5% to about 6.2%, from about 0.5% to about 6%, from about 0.5% to about 5.8%, from about 0.5% to about 5.6%, from about 0.5% to about 5.4%, from about 0.5% to about 5.2%, from about 0.5% to about 5%, from about 0.5% to about 4.8%, from about 0.5% to about 4.6%, from about 0.5% to about 4.4%, from about 0.5% to about 4.2% or from about 0.5% to about 4%.

In some embodiments, the weight ratio of the anionic reactive emulsifier to the nitrile group-containing monomer added in the preparation of the binder composition is less than 10%, less than 9.5%, less than 9%, less than 8.5%, less than 8%, less than 7.5%, less than 7%, less than 6.5%, less than 6%, less than 5.5%, less than 5%, less than 4.5%, less than 4%, less than 3.5%, less than 3%, less than 2.5%, less than 2%, less than 1.5%, less than 1% or less than 0.8%. In some embodiments, the weight ratio of the anionic reactive emulsifier to the nitrile group-containing monomer added in the preparation of the binder composition is more than 0.5%, more than 1%, more than 1.5%, more than 2%, more than 2.5%, more than 3%, more than 3.5%, more than 4%, more than 4.5%, more than 5%, more than 5.5%, more than 6%, more than 6.5%, more than 7%, more than 7.5%, more than 8%, more than 8.5%, more than 9% or more than 9.5%.

In some embodiments, a carboxylic acid group-containing monomer and a hydroxyl group-containing monomer or combinations thereof can be added into the second emulsion to form a third emulsion. Thereafter, a pre-emulsifying solution is formed by adding a nitrile group-containing monomer, an amide group-containing monomer or combinations thereof into the third emulsion. This is advantageous as it allows better dispersion of materials in the pre-emulsifying solution.

In certain embodiments, a carboxylic acid group-containing monomer, a hydroxyl group-containing monomer, a nitrile group-containing monomer, an amide group-containing monomer or combinations thereof may be added into the second emulsion to form a pre-emulsifying solution. In other embodiments, a carboxylic acid group-containing monomer, a hydroxyl group-containing monomer, a nitrile group-containing monomer, an amide group-containing monomer or combinations thereof are added sequentially into the second emulsion to form a pre-emulsifying solution. Stirring or dispersion may be employed between the additions.

In some embodiments, the third emulsion is stirred for a time period of from about 5 minutes to about 45 minutes, from about 5 minutes to about 40 minutes, from about 5 minutes to about 35 minutes, from about 5 minutes to about 30 minutes, from about 5 minutes to about 25 minutes, from about 5 minutes to about 20 minutes or from about 10 minutes to about 20 minutes. In some embodiments, the third emulsion is stirred for a time period of less than 45 minutes, less than 40 minutes, less than 35 minutes, less than 30 minutes, less than 25 minutes, less than 20 minutes, less than 15 minutes or less than 10 minutes. In some embodiments, the third emulsion is stirred for a time period of more than 5 minutes, more than 10 minutes, more than 15 minutes, more than 20 minutes, more than 25 minutes, more than 30 minutes, more than 35 minutes or more than 40 minutes.

In some embodiments, each of the third emulsion and the pre-emulsifying solution is independently stirred at a speed of from about 800 rpm to about 1500 rpm, from about 800 rpm to about 1450 rpm, from about 800 rpm to about 1400 rpm, from about 800 rpm to about 1350 rpm, from about 800 rpm to about 1300 rpm, from about 800 rpm to about 1250 rpm, from about 800 rpm to about 1200 rpm, from about 780 rpm to about 1180 rpm, from about 760 rpm to about 1160 rpm or from about 740 rpm to about 1140 rpm. In some embodiments, each of the third emulsion and the pre-emulsifying solution is independently stirred at a speed of less than 1500 rpm, less than 1450 rpm, less than 1400 rpm, less than 1350 rpm, less than 1300 rpm, less than 1250 rpm, less than 1200 rpm, less than 1150 rpm, less than 1100 rpm, less than 1050 rpm, less than 1000 rpm, less than 950 rpm, less than 900 rpm or less than 850 rpm. In some embodiments, each of the third emulsion and the pre-emulsifying solution is independently stirred at a speed of more than 800 rpm, more than 850 rpm, more than 900 rpm, more than 950 rpm, more than 1000 rpm, more than 1050 rpm, more than 1100 rpm, more than 1150 rpm, more than 1200 rpm, more than 1250 rpm, more than 1300 rpm, more than 1350 rpm, more than 1400 rpm or more than 1450 rpm.

In some embodiments, the pre-emulsifying solution is stirred for a time period of from about 10 minutes to about 60 minutes, from about 15 minutes to about 60 minutes, from about 20 minutes to about 60 minutes, from about 25 minutes to about 60 minutes, from about 30 minutes to about 60 minutes, from about 30 minutes to about 55 minutes or from about 30 minutes to about 50 minutes. In some embodiments, the pre-emulsifying solution is stirred for a time period of less than 60 minutes, less than 55 minutes, less than 50 minutes, less than 45 minutes, less than 40 minutes, less than 35 minutes, less than 30 minutes, less than 25 minutes, less than 20 minutes or less than 15 minutes. In some embodiments, the pre-emulsifying emulsion is stirred for a time period of more than 10 minutes, more than 15 minutes, more than 20 minutes, more than 25 minutes, more than 30 minutes, more than 35 minutes, more than 40 minutes, more than 45 minutes, more than 50 minutes or more than 55 minutes.

In some embodiments, the copolymer is obtained via polymerization of a composition. In some embodiments, the composition comprises a carboxylic salt group-containing monomer, a carboxylic acid group-containing monomer, a nitrile group-containing monomer, an amide group-containing monomer, a hydroxyl group-containing monomer and at least one anionic reactive emulsifier. In some embodiments, formation of a carboxylic salt group-containing monomer is resulted from the neutralization of a carboxylic acid group-containing monomer by the neutralizing agent added in step 102.

In some embodiments, the carboxylic salt group-containing monomer is acrylic acid salt, methacrylic acid salt, crotonic acid salt, 2-butyl crotonic acid salt, cinnamic acid salt, maleic acid salt, maleic anhydride salt, fumaric acid salt, itaconic acid salt, itaconic anhydride salt, tetraconic acid salt or a combination thereof. In certain embodiments, the carboxylic salt group-containing monomer is 2-ethylacrylic acid salt, isocrotonic acid salt, cis-2-pentenoic acid salt, trans-2-pentenoic acid salt, angelic acid salt, tiglic acid salt, 3,3-dimethyl acrylic acid salt, 3-propyl acrylic acid salt, trans-2-methyl-3-ethyl acrylic acid salt, cis-2-methyl-3-ethyl acrylic acid salt, 3-isopropyl acrylic acid salt, trans-3-methyl-3-ethyl acrylic acid salt, cis-3-methyl-3-ethyl acrylic acid salt, 2-isopropyl acrylic acid salt, trimethyl acrylic acid salt, 2-methyl-3,3-diethyl acrylic acid salt, 3-butyl acrylic acid salt, 2-butyl acrylic acid salt, 2-pentyl acrylic acid salt, 2-methyl-2-hexenoic acid salt, trans-3-methyl-2-hexenoic acid salt, 3-methyl-3-propyl acrylic acid salt, 2-ethyl-3-propyl acrylic acid salt, 2,3-diethyl acrylic acid salt, 3,3-diethyl acrylic acid salt, 3-methyl-3-hexyl acrylic acid salt, 3-methyl-3-tert-butyl acrylic acid salt, 2-methyl-3-pentyl acrylic acid salt, 3-methyl-3-pentyl acrylic acid salt, 4-methyl-2-hexenoic acid salt, 4-ethyl-2-hexenoic acid salt, 3-methyl-2-ethyl-2-hexenoic acid salt, 3-tert-butyl acrylic acid salt, 2,3-dimethyl-3-ethyl acrylic acid salt, 3,3-dimethyl-2-ethyl acrylic acid salt, 3-methyl-3-isopropyl acrylic acid salt, 2-methyl-3-isopropyl acrylic acid salt, trans-2-octenoic acid salt, cis-2-octenoic acid salt, trans-2-decenoic acid salt, α-acetoxyacrylic acid salt, β-trans-aryloxyacrylic acid salt, α-chloro-β-E-methoxyacrylic acid salt or a combination thereof. In some embodiments, the carboxylic salt group-containing monomer is methyl maleic acid salt, dimethyl maleic acid salt, phenyl maleic acid salt, bromo maleic acid salt, chloromaleic acid salt, dichloromaleic acid salt, fluoromaleic acid salt, difluoro maleic acid salt or a combination thereof.

In some embodiments, the carboxylic salt group-containing monomer is an alkali metal carboxylic salt group-containing monomer. Examples of an alkali metal forming the alkali metal carboxylic salt include lithium, sodium and potassium. In some embodiments, the carboxylic salt group-containing monomer is an ammonium carboxylic salt group-containing monomer.

In some embodiments, the molar ratio of the carboxylic acid group-containing monomer to the carboxylic salt group-containing monomer in the composition is from about 0 to about 2.5, from about 0 to about 2.4, from about 0.1 to about 2.4, from about 0.2 to about 2.4, from about 0.3 to about 2.4, from about 0.4 to about 2.4, from about 0.5 to about 2.4, from about 0.6 to about 2.4, from about 0.6 to about 2.3, from about 0.6 to about 2.2, from about 0.6 to about 2.1, from about 0.6 to about 2, from about 0.6 to about 1.9, from about 0.6 to about 1.8, from about 0.6 to about 1.7, from about 0.6 to about 1.6, from about 0.6 to about 1.5, from about 0.6 to about 1.4, from about 0.6 to about 1.3, from about 0.5 to about 2.2, from about 0.5 to about 1.3, from about 0.3 to about 1.3 or from about 0.3 to about 2.2.

In some embodiments, the molar ratio of the carboxylic acid group-containing monomer to the carboxylic salt group-containing monomer in the composition is less than 2.5, less than 2.4, less than 2.3, less than 2.2, less than 2.1, less than 2, less than 1.9, less than 1.8, less than 1.7, less than 1.6, less than 1.5, less than 1.4, less than 1.3, less than 1.2, less than 1.1, less than 1, less than 0.9, less than 0.8, less than 0.7, less than 0.6, less than 0.5, less than 0.4, less than 0.3 or less than 0.2. In some embodiments, the molar ratio of the carboxylic acid group-containing monomer to the carboxylic salt group-containing monomer in the composition is more than 0, more than 0.1, more than 0.2, more than 0.3, more than 0.4, more than 0.5, more than 0.6, more than 0.7, more than 0.8, more than 0.9, more than 1, more than 1.1, more than 1.2, more than 1.3, more than 1.4, more than 1.5, more than 1.6, more than 1.7, more than 1.8, more than 1.9, more than 2, more than 2.1, more than 2.2, more than 2.3 or more than 2.4.

In some embodiments, the proportion of the carboxylic acid group-containing monomer is from about 0% to about 9%, from about 0% to about 8.8%, from about 0% to about 8.6%, from about 0% to about 8.4%, from about 0% to about 8.2%, from about 0% to about 8%, from about 0% to about 7.8%, from about 0% to about 7.6%, from about 0% to about 7.4%, from about 0% to about 7.2%, from about 0% to about 7%, from about 0% to about 6.8%, from about 0% to about 6.6%, from about 0% to about 6.4%, from about 0% to about 6.2%, from about 0% to about 6%, from about 0% to about 5.8%, from about 0% to about 5.6%, from about 0% to about 5.4%, from about 0% to about 5.2%, from about 0% to about 5%, from about 0% to about 4.8%, from about 0% to about 4.6%, from about 0% to about 4.4%, from about 0% to about 4.2%, from about 0% to about 4%, from about 0.2% to about 4% or from about 0.4% to about 5% by mole, based on the total number of moles of monomers in the composition.

In some embodiments, the proportion of the carboxylic acid group-containing monomer is less than 9%, less than 8.5%, less than 8%, less than 7.5%, less than 7%, less than 6.5%, less than 6%, less than 5.5%, less than 5%, less than 4.5%, less than 4%, less than 3.5%, less than 3%, less than 2.5%, less than 2%, less than 1.5%, less than 1% or less than 0.5% by mole, based on the total number of moles of monomers in the composition. In some embodiments, the proportion of the carboxylic acid group-containing monomer is more than 0%, more than 0.5%, more than 1%, more than 1.5%, more than 2%, more than 2.5%, more than 3%, more than 3.5%, more than 4%, more than 4.5%, more than 5%, more than 5.5%, more than 6%, more than 6.5%, more than 7%, more than 7.5%, more than 8% or more than 8.5% by mole, based on the total number of moles of monomers in the composition.

In some embodiments, the proportion of the carboxylic salt group-containing monomer is from about 1% to about 6%, from about 1% to about 5.8%, from about 1% to about 5.6%, from about 1% to about 5.4%, from about 1% to about 5.2%, from about 1% to about 5%, from about 1.2% to about 5%, from about 1.4% to about 5%, from about 1.6% to about 5%, from about 1.8% to about 5%, from about 2% to about 5%, from about 2% to about 4.9%, from about 2% to about 4.8%, from about 2% to about 4.7%, from about 2% to about 4.6%, from about 2% to about 4.5%, from about 2% to about 4.4%, from about 2% to about 4.3%, from about 2% to about 4.2%, from about 2% to about 4.1%, from about 2% to about 4%, from about 2.1% to about 4%, from about 2.2% to about 4%, from about 2.3% to about 4%, from about 2.4% to about 4%, from about 2.5% to about 4%, from about 2.6% to about 4%, from about 2.7% to about 4%, from about 2.8% to about 4%, from about 2.9% to about 4%, from about 3% to about 4%, from about 3% to about 3.9%, from about 3% to about 3.8%, from about 3% to about 3.7%, from about 3% to about 3.6% or from about 3% to about 3.5% by mole, based on the total number of moles of monomers in the composition.

In some embodiments, the proportion of the carboxylic salt group-containing monomer is less than 6%, less than 5.8%, less than 5.6%, less than 5.4%, less than 5.2%, less than 5%, less than 4.8%, less than 4.6%, less than 4.4%, less than 4.2%, less than 4%, less than 3.8%, less than 3.6%, less than 3.4%, less than 3.2%, less than 3%, less than 2.8%, less than 2.6%, less than 2.4%, less than 2.2%, less than 2%, less than 1.8%, less than 1.6% or less than 1.4% by mole, based on the total number of moles of monomers in the composition. In some embodiments, the proportion of the carboxylic salt group-containing monomer is more than 1%, more than 1.2%, more than 1.4%, more than 1.6%, more than 1.8%, more than 2%, more than 2.2%, more than 2.4%, more than 2.6%, more than 2.8%, more than 3%, more than 3.2%, more than 3.4%, more than 3.6%, more than 3.8%, more than 4%, more than 4.2%, more than 4.4%, more than 4.6%, more than 4.8%, more than 5%, more than 5.2%, more than 5.4%, more than 5.6% or more than 5.8% by mole, based on the total number of moles of monomers in the composition.

In some embodiments, the proportion of the amide group-containing monomer is from about 20% to about 37%, from about 20% to about 36.5%, from about 20% to about 36%, from about 20% to about 35.5%, from about 20% to about 35%, from about 20.5% to about 35%, from about 21% to about 35%, from about 21.5% to about 35%, from about 22% to about 35%, from about 22.5% to about 35%, from about 23% to about 35%, from about 23.5% to about 35%, from about 24% to about 35%, from about 24.5% to about 35%, from about 25% to about 35%, from about 25% to about 34.5%, from about 25% to about 34%, from about 25% to about 33.5%, from about 25% to about 33%, from about 25.5% to about 33%, from about 26% to about 33%, from about 26.5% to about 33%, from about 27% to about 33%, from about 25% to about 33% or from about 25% to about 36% by mole, based on the total number of moles of monomers in the composition.

In some embodiments, the proportion of the amide group-containing monomer is less than 37%, less than 36%, less than 35%, less than 34%, less than 33%, less than 32%, less than 31%, less than 30%, less than 29%, less than 28%, less than 27%, less than 26%, less than 25%, less than 24%, less than 23% or less than 22% by mole, based on the total number of moles of monomers in the composition. In some embodiments, the proportion of the amide group-containing monomer is more than 20%, more than 21%, more than 22%, more than 23%, more than 24%, more than 25%, more than 26%, more than 27%, more than 28%, more than 29%, more than 30%, more than 31%, more than 32%, more than 33%, more than 34%, more than 35% or more than 36% by mole, based on the total number of moles of monomers in the composition.

In some embodiments, the proportion of the nitrile group-containing monomer is from about 52% to about 70%, from about 52.5% to about 70%, from about 53% to about 70%, from about 53.5% to about 70%, from about 54% to about 70%, from about 54.5% to about 70%, from about 55% to about 70%, from about 55% to about 69%, from about 55% to about 68%, from about 55% to about 67%, from about 55% to about 66%, from about 55% to about 65%, from about 55.5% to about 65%, from about 56% to about 65%, from about 56.5% to about 65%, from about 57% to about 65%, from about 57.5% to about 65%, from about 58% to about 65%, from about 58% to about 64% or from about 58% to about 70% by mole, based on the total number of moles of monomers in the composition.

In some embodiments, the proportion of the nitrile group-containing monomer is less than 70%, less than 69%, less than 68%, less than 67%, less than 66%, less than 65%, less than 64%, less than 63%, less than 62%, less than 61%, less than 60%, less than 59%, less than 58%, less than 57%, less than 56%, less than 55%, less than 54% or less than 53% by mole, based on the total number of moles of monomers in the composition. In some embodiments, the proportion of the nitrile group-containing monomer is more than 52%, more than 53%, more than 54%, more than 55%, more than 56%, more than 57%, more than 58%, more than 59%, more than 60%, more than 61%, more than 62%, more than 63%, more than 64%, more than 65%, more than 66%, more than 67%, more than 68% or more than 69% by mole, based on the total number of moles of monomers in the composition.

In some embodiments, the proportion of the hydroxyl group-containing monomer is from about 2% to about 10%, from about 2.5% to about 10%, from about 3% to about 10%, from about 3.2% to about 10%, from about 3.4% to about 10%, from about 3.6% to about 10%, from about 3.8% to about 10%, from about 4% to about 10%, from about 4% to about 9.5%, from about 4% to about 9%, from about 4% to about 8.5%, from about 4% to about 8%, from about 4% to about 7.5%, from about 4% to about 7%, from about 4.2% to about 9%, from about 4.4% to about 9%, from about 4.6% to about 9%, from about 4.8% to about 9% or from about 5% to about 9% by mole, based on the total number of moles of monomers in the composition.

In some embodiments, the proportion of the hydroxyl group-containing monomer is less than 10%, less than 9.5%, less than 9%, less than 8.5%, less than 8%, less than 7.5%, less than 7%, less than 6.5%, less than 6%, less than 5.5%, less than 5%, less than 4.5%, less than 4%, less than 3.5%, less than 3% or less than 2.5% by mole, based on the total number of moles of monomers in the composition. In some embodiments, the proportion of the hydroxyl group-containing monomer is more than 2%, more than 2.5%, more than 3%, more than 3.5%, more than 4%, more than 4.5%, more than 5%, more than 5.5%, more than 6%, more than 6.5%, more than 7%, more than 7.5%, more than 8%, more than 8.5%, more than 9% or more than 9.5% by mole, based on the total number of moles of monomers in the composition.

In some embodiments, the proportion of the anionic reactive emulsifier is from about 0.02% to about 2.5%, from about 0.02% to about 2.4%, from about 0.02% to about 2.3%, from about 0.02% to about 2.2%, from about 0.02% to about 2.1%, from about 0.02% to about 2%, from about 0.02% to about 1.9%, from about 0.02% to about 1.8%, from about 0.02% to about 1.7%, from about 0.02% to about 1.6%, from about 0.02% to about 1.5%, from about 0.02% to about 1.4%, from about 0.02% to about 1.3%, from about 0.02% to about 1.2%, from about 0.02% to about 1.1%, from about 0.02% to about 1%, from about 0.03% to about 1%, from about 0.04% to about 1%, from about 0.05% to about 1% or from 0.06% to about 1.2% by mole, based on the total number of moles of monomers in the composition.

In some embodiments, the proportion of the anionic reactive emulsifier is less than 2.5%, less than 2.4%, less than 2.3%, less than 2.2%, less than 2.1%, less than 2%, less than 1.9%, less than 1.8%, less than 1.7%, less than 1.6%, less than 1.5%, less than 1.4%, less than 1.3%, less than 1.2%, less than 1.1%, less than 1%, less than 0.9%, less than 0.8%, less than 0.7%, less than 0.6% or less than 0.5% by mole, based on the total number of moles of monomers in the composition. In some embodiments, the proportion of the anionic reactive emulsifier is more than 0.02%, more than 0.04%, more than 0.1%, more than 0.2%, more than 0.3%, more than 0.4%, more than 0.5%, more than 0.6%, more than 0.7%, more than 0.8%, more than 0.9%, more than 1%, more than 1.1%, more than 1.2%, more than 1.3%, more than 1.4%, more than 1.5%, more than 1.6%, more than 1.7%, more than 1.8%, more than 1.9%, more than 2%, more than 2.1%, more than 2.2%, more than 2.3% or more than 2.4% by mole, based on the total number of moles of monomers in the composition.

In some embodiments, the proportion of the polyoxyalkylene-based anionic reactive emulsifier is from about 0.02% to about 0.5%, from about 0.02% to about 0.48%, from about 0.02% to about 0.46%, from about 0.02% to about 0.44%, from about 0.02% to about 0.42%, from about 0.02% to about 0.4%, from about 0.02% to about 0.38%, from about 0.02% to about 0.36%, from about 0.02% to about 0.34%, from about 0.02% to about 0.32%, from about 0.02% to about 0.3%, from about 0.02% to about 0.29%, from about 0.02% to about 0.28%, from about 0.02% to about 0.27%, from about 0.02% to about 0.26%, from about 0.02% to about 0.25%, from about 0.02% to about 0.24%, from about 0.02% to about 0.23%, from about 0.02% to about 0.22%, from about 0.02% to about 0.21%, from about 0.02% to about 0.2%, from about 0.02% to about 0.19%, from about 0.02% to about 0.18%, from about 0.02% to about 0.17%, from about 0.02% to about 0.16%, from about 0.02% to about 0.15%, from about 0.03% to about 0.15%, from about 0.04% to about 0.15%, from about 0.03% to about 0.25% or from about 0.03% to about 0.2% by mole, based on the total number of moles of monomers in the composition.

In some embodiments, the proportion of the polyoxyalkylene-based anionic reactive emulsifier is less than 0.5%, less than 0.45%, less than 0.4%, less than 0.35%, less than 0.3%, less than 0.28%, less than 0.26%, less than 0.24%, less than 0.22%, less than 0.2%, less than 0.18%, less than 0.16%, less than 0.14%, less than 0.12%, less than 0.1%, less than 0.08%, less than 0.06% or less than 0.04% by mole, based on the total number of moles of monomers in the composition. In some embodiments, the proportion of the polyoxyalkylene-based anionic reactive emulsifier is more than 0.02%, more than 0.04%, more than 0.06%, more than 0.08%, more than 0.1%, more than 0.12%, more than 0.14%, more than 0.16%, more than 0.18%, more than 0.2%, more than 0.22%, more than 0.24%, more than 0.26%, more than 0.28%, more than 0.3%, more than 0.35%, more than 0.4% or more than 0.45% by mole, based on the total number of moles of monomers in the composition.

In some embodiments, the proportion of the non-polyoxyalkylene-based anionic reactive emulsifier is from about 0.25% to about 2.5%, from about 0.25% to about 2.45%, from about 0.25% to about 2.4%, from about 0.25% to about 2.35%, from about 0.25% to about 2.3%, from about 0.25% to about 2.25%, from about 0.25% to about 2.2%, from about 0.25% to about 2.15%, from about 0.25% to about 2.1%, from about 0.25% to about 2.05%, from about 0.25% to about 2%, from about 0.25% to about 1.95%, from about 0.25% to about 1.9%, from about 0.25% to about 1.85%, from about 0.25% to about 1.8%, from about 0.25% to about 1.75%, from about 0.25% to about 1.7%, from about 0.25% to about 1.65%, from about 0.25% to about 1.6%, from about 0.3% to about 1.6%, from about 0.35% to about 1.6%, from about 0.4% to about 1.6%, from about 0.45% to about 1.6%, from about 0.5% to about 2% or from about 0.5% to about 1.75% by mole, based on the total number of moles of monomers in the composition.

In some embodiments, the proportion of the non-polyoxyalkylene-based anionic reactive emulsifier is less than 2.5%, less than 2.4%, less than 2.3%, less than 2.2%, less than 2.1%, less than 2%, less than 1.9%, less than 1.8%, less than 1.7%, less than 1.6%, less than 1.5%, less than 1.4%, less than 1.3%, less than 1.2%, less than 1.1%, less than 1%, less than 0.9%, less than 0.8%, less than 0.7%, less than 0.6%, less than 0.5% or less than 0.4% by mole, based on the total number of moles of monomers in the composition. In some embodiments, the proportion of the non-polyoxyalkylene-based anionic reactive emulsifier is more than 0.25%, more than 0.3%, more than 0.4%, more than 0.5%, more than 0.6%, more than 0.7%, more than 0.8%, more than 0.9%, more than 1%, more than 1.1%, more than 1.2%, more than 1.3%, more than 1.4%, more than 1.5%, more than 1.6%, more than 1.7%, more than 1.8%, more than 1.9%, more than 2%, more than 2.1%, more than 2.2%, more than 2.3% or more than 2.4% by mole, based on the total number of moles of monomers in the composition.

In some embodiments, a seed emulsion is formed by adding a proportion of the pre-emulsifying solution into a dispersion medium in step 104.

In some embodiments, the temperature of the dispersion medium is elevated to from about 30° C. to about 70° C., from about 30° C. to about 65° C., from about 30° C. to about 60° C., from about 30° C. to about 55° C. or from about 30° C. to about 50° C., before the addition of a proportion of the pre-emulsifying solution into the dispersion medium to form the seed emulsion. In some embodiments, the temperature of the dispersion medium is elevated to less than 70° C., less than 65° C., less than 60° C., less than 55° C., less than 50° C., less than 45° C., less than 40° C. or less than 35° C., before the addition of a proportion of the pre-emulsifying solution into the dispersion medium to form the seed emulsion. In some embodiments, the temperature of the dispersion medium is elevated to more than 30° C., more than 35° C., more than 40° C., more than 45° C., more than 50° C., more than 55° C., more than 60° C. or more than 65° C., before the addition of a proportion of the pre-emulsifying solution into the dispersion medium to form the seed emulsion.

In some embodiments, the proportion of the pre-emulsifying solution added to form the seed emulsion is from about 1% to about 15%, from about 1% to about 14%, from about 1% to about 13%, from about 1% to about 12%, from about 1% to about 11%, from about 1% to about 10%, from about 1% to about 9%, from about 1% to about 8%, from about 1% to about 7%, from about 1% to about 6% or from about 1% to about 5% by weight, based on the total weight of the pre-emulsifying solution. In some embodiments, the proportion of the pre- emulsifying solution added to form the seed emulsion is less than 15%, less than 14%, less than 13%, less than 12%, less than 11%, less than 10%, less than 9%, less than 8%, less than 7%, less than 6%, less than 5%, less than 4%, less than 3% or less than 2% by weight, based on the total weight of the pre-emulsifying solution. In some embodiments, the proportion of the pre-emulsifying solution added to form the seed emulsion is more than 1%, more than 2%, more than 3%, more than 4%, more than 5%, more than 6%, more than 7%, more than 8%, more than 9%, more than 10%, more than 11%, more than 12%, more than 13% or more than 14% by weight, based on the total weight of the pre-emulsifying solution.

In some embodiments, the seed emulsion is stirred at a speed of from about 50 rpm to about 500 rpm, from about 50 rpm to about 450 rpm, from about 50 rpm to about 400 rpm, from about 50 rpm to about 350 rpm, from about 50 rpm to about 300 rpm, from about 100 rpm to about 300 rpm, from about 120 rpm to about 280 rpm or from about 140 rpm to about 260 rpm. In some embodiments, the seed emulsion is stirred at speed of less than 500 rpm, less than 450 rpm, less than 400 rpm, less than 350 rpm, less than 300 rpm, less than 250 rpm, less than 200 rpm, less than 150 rpm or less than 100 rpm. In some embodiments, the seed emulsion is stirred at a speed of more than 50 rpm, more than 100 rpm, more than 150 rpm, more than 200 rpm, more than 250 rpm, more than 300 rpm, more than 350 rpm, more than 400 rpm or more than 450 rpm.

In some embodiments, the seed emulsion is stirred for a time period of from about 10 minutes to about 60 minutes, from about 15 minutes to about 60 minutes, from about 20 minutes to about 60 minutes, from about 20 minutes to about 55 minutes, from about 20 minutes to about 50 minutes, from about 20 minutes to about 45 minutes, from about 20 minutes to about 40 minutes, from about 20 minutes to about 35 minutes or from about 25 minutes to about 35 minutes. In some embodiments, the seed emulsion is stirred for a time period of less than 60 minutes, less than 55 minutes, less than 50 minutes, less than 45 minutes, less than 40 minutes, less than 35 minutes, less than 30 minutes, less than 25 minutes, less than 20 minutes or less than 15 minutes. In some embodiments, the seed emulsion is stirred for a time period of more than 10 minutes, more than 15 minutes, more than 20 minutes, more than 25 minutes, more than 30 minutes, more than 35 minutes, more than 40 minutes, more than 45 minutes, more than 50 minutes or more than 55 minutes.

In some embodiments, the temperature of the seed emulsion is elevated to from about 60° C. to about 80° C., from about 62° C. to about 80° C., from about 64° C. to about 80° C., from about 66° C. to about 80° C., from about 66° C. to about 78° C., from about 68° C. to about 78° C. or from about 68° C. to about 76° C. In some embodiments, the temperature of the seed emulsion is elevated to less than 80° C., less than 78° C., less than 74° C., less than 72° C., less than 70° C., less than 68° C., less than 66° C., less than 64° C. or less than 62° C. In some embodiments, the temperature of the seed emulsion is elevated to more than 60° C., more than 62° C., more than 64° C., more than 66° C., more than 68° C., more than 70° C., more than 72° C., more than 74° C., more than 76° C. or more than 78° C.

In some embodiments, an initiator solution is prepared by dissolving the initiator in water. In some embodiments, a first suspension is formed by adding a proportion of the initiator solution into the seed emulsion dropwise in step 105.

In some embodiments, the proportion of the initiator solution added to the seed emulsion is from about 5% to about 40%, from about 5% to about 38%, from about 5% to about 36%, from about 5% to about 34%, from about 5% to about 32%, from about 5% to about 30%, from about 7% to about 30%, from about 10% to about 30%, from about 12% to about 30%, from about 12% to about 28%, from about 14% to about 28%, from about 14% to about 26%, from about 16% to about 26% or from about 16% to about 24% by weight, based on the total weight of the initiator solution. In some embodiments, the proportion of the initiator solution added to the seed emulsion is less than 40%, less than 38%, less than 36%, less than 34%, less than 32%, less than 30%, less than 28%, less than 26%, less than 24%, less than 22%, less than 20%, less than 18%, less than 16%, less than 14%, less than 12%, less than 10% or less than 8% by weight, based on the total weight of the initiator solution. In some embodiments, the proportion of the initiator solution added to the seed emulsion is more than 5%, more than 7%, more than 10%, more than 12%, more than 14%, more than 16%, more than 18%, more than 20%, more than 22%, more than 24%, more than 26%, more than 28%, more than 30%, more than 32%, more than 34%, more than 36% or more than 38% by weight, based on the total weight of the initiator solution.

In some embodiments, the initiator solution is added dropwise to the seed emulsion for a time period of from about 1 minute to about 15 minutes, from about 1 minute to about 14 minutes, from about 1 minute to about 13 minutes, from about 1 minute to about 12 minutes, from about 1 minute to about 11 minutes, from about 1 minute to about 10 minutes, from about 2 minutes to about 10 minutes, from about 2 minutes to about 9 minutes, from about 3 minutes to about 9 minutes or from about 3 minutes to about 8 minutes. In some embodiments, the initiator solution is added dropwise to the seed emulsion for a time period of less than 15 minutes, less than 14 minutes, less than 13 minutes, less than 12 minutes, less than 11 minutes, less than 10 minutes, less than 9 minutes, less than 8 minutes, less than 7 minutes, less than 6 minutes, less than 5 minutes, less than 4 minutes, less than 3 minutes or less than 2 minutes. In some embodiments, the initiator solution is added dropwise to the seed emulsion for a time period of more than 1 minute, more than 2 minutes, more than 3 minutes, more than 4 minutes, more than 5 minutes, more than 6 minutes, more than 7 minutes, more than 8 minutes, more than 9 minutes, more than 10 minutes, more than 11 minutes, more than 12 minutes, more than 13 minutes or more than 14 minutes.

Polymerization occurred in the present invention follows the radical mechanism, wherein an initiator acts to generate free radicals, which in turn lead to polymer chains propagation. The free radicals used herein can be produced using thermal decomposition or redox reactions. The free radical initiator(s) disclosed herein is/are water-soluble.

The water-soluble free radical initiator decomposes thermally in the aqueous phase to give radicals which can initiate the polymerization. In some embodiments, the water-soluble initiator may be selected from the group consisting of persulfate-based initiators such as ammonium persulfate, sodium persulfate, potassium persulfate and the like; azo-based initiators such as azobis (isobutyl-amidine hydrochloride) (AIBA), 2,2'-azobis(2-methylpropionamidine) dihydrochloride, 2,2'-azobis(2-amidinopropane) dihydrochloride (AAPH), 2,2'-azobis[2-(2-imidazolin-2-yl)propane]dihydrochloride, bis[2-(4'-sulfophenyl)alkyl]-2,2'-azodiisobutyrate ammonium salts, 2,2'-azobis(N-2'-methylpropanoyl-2-amino-alkyl-1)-sulfonate and the like; peroxide-based initiators such as hydrogen peroxide, t-butyl hydroperoxide, succinic acid peroxide and the like and combinations thereof.

In some embodiments, the water-soluble free radical initiator can be used together with a reducing agent to establish a redox initiator system. This allows generation of free radicals through an oxidation-reduction reaction at relatively low temperatures and promotes an enhancement in polymerization rate.

In some embodiments, the reducing agent can be selected from the group consisting of sodium bisulfite, sodium metabisulfite, sodium sulfite, sodium thiosulfate, thiourea dioxide, ferrous sulfate, ferrous chloride, ascorbic acid, citric acid, tartaric acid, erythorbic acid, glucose and metal salt of formaldehyde sulfoxylate, Bruggolite FF6M combinations thereof.

In some embodiments, the proportion of water-soluble free radical initiator is about 0.05% to about 0.5%, from about 0.06% to about 0.5%, from about 0.07% to about 0.5%, from about 0.08% to about 0.5%, from about 0.09% to about 0.5%, from about 0.1% to about 0.5%, from about 0.1% to about 0.48%, from about 0.1% to about 0.46%, from about 0.1% to about 0.44%, from about 0.1% to about 0.42%, from about 0.1% to about 0.4%, from about 0.1% to about 0.38%, from about 0.1% to about 0.36%, from about 0.1% to about 0.34%, from about 0.1% to about 0.32%, from about 0.1% to about 0.3%, from about 0.1% to about 0.29%, from about 0.1% to about 0.28%, from about 0.1% to about 0.27%, from about 0.1% to about 0.26%, from about 0.1% to about 0.25%, from about 0.11% to about 0.25%, from about 0.12% to about 0.25%, from about 0.13% to about 0.25%, from about 0.14% to about 0.25% or from about 0.15% to about 0.25% by weight, based on the total weight of monomers added in the preparation of the binder composition. When the proportion of the water-soluble free radical initiator out of the total weight of monomers added in the preparation of the binder composition is within the above range, a higher monomer conversion rate could be achieved and the binder composition could exhibit a better overall binding performance.

In some embodiments, the proportion of water-soluble free radical initiator is less than 0.5%, less than 0.4%, less than 0.38%, less than 0.36%, less than 0.34%, less than 0.32%, less than 0.3%, less than 0.28%, less than 0.26%, less than 0.24%, less than 0.22%, less than 0.2%, less than 0.19%, less than 0.18%, less than 0.17%, less than 0.16%, less than 0.15%, less than 0.14%, less than 0.13%, less than 0.12%, less than 0.11%, less than 0.1% or less than 0.08% by weight, based on the total weight of monomers added in the preparation of the binder composition. In some embodiments, the proportion of water-soluble free radical initiator is more than 0.05%, more than 0.07%, more than 0.1%, more than 0.12%, more than 0.15%, more than 0.18%, more than 0.2%, more than 0.22%, more than 0.25%, more than 0.27%, more than 0.3%, more than 0.32%, more than 0.35%, more than 0.37%, more than 0.4%, more than 0.42%, more than 0.45% or more than 0.47% by weight, based on the total weight of monomers added in the preparation of the binder composition.

In some embodiments, the proportion of reducing agent is from about 0.01% to about 0.2%, from about 0.01% to about 0.19%, from about 0.01% to about 0.18%, from about 0.01% to about 0.17%, from about 0.01% to about 0.16%, from about 0.01% to about 0.15%, from about 0.01% to about 0.14%, from about 0.01% to about 0.13%, from about 0.01% to about 0.12%, from about 0.01% to about 0.11%, from about 0.01% to about 0.1%, from about 0.02% to about 0.1%, from about 0.03% to about 0.1%, from about 0.04% to about 0.1%, from about 0.05% to about 0.1% by weight, based on the total weight of monomers added in the preparation of the binder composition.

In some embodiments, the proportion of reducing agent is less than 0.2%, less than 0.19%, less than 0.18%, less than 0.17%, less than 0.16%, less than 0.15%, less than 0.14%, less than 0.13%, less than 0.12%, less than 0.11%, less than 0.1%, less than 0.09%, less than 0.08%, less than 0.07%, less than 0.06%, less than 0.05% or less than 0.04% by weight, based on the total weight of monomers added in the preparation of the binder composition. In some embodiments, the proportion of reducing agent is more than 0.01%, more than 0.02%, more than 0.03%, more than 0.04%, more than 0.05%, more than 0.06%, more than 0.07%, more than 0.08%, more than 0.09%, more than 0.1%, more than 0.11%, more than 0.12%, more than 0.13%, more than 0.14%, more than 0.15% or more than 0.16% by weight, based on the total weight of monomers added in the preparation of the binder composition.

In some embodiments, when a redox initiator system is selected as the initiator, the molar ratio of the water-soluble free radical initiator to the reducing agent is from about 0.2 to about 10, from about 0.2 to about 9, from about 0.2 to about 8, from about 0.2 to about 7, from about 0.2 to about 6, from about 0.2 to about 5, from about 0.3 to about 5, from about 0.4 to about 5, from about 0.5 to about 5, from about 0.6 to about 5, from about 0.7 to about 5, from about 0.8 to about 5, from about 0.9 to about 5, from about 1 to about 5, from about 0.5 to about 4.5, from about 0.5 to about 4, from about 0.6 to about 3.5, from about 0.6 to about 3, from about 0.8 to about 3 or from about 0.2 to about 1. In some embodiments, when a redox initiator system is selected as the initiator, the molar ratio of the water-soluble free radical initiator to the reducing agent is less than 10, less than 9, less than 8, less than 7, less than 6, less than 5, less than 4.8, less than 4.6, less than 4.4, less than 4.2, less than 4, less than 3.8, less than 3.6, less than 3.4, less than 3.2, less than 3, less than 2.8, less than 2.6, less than 2.4, less than 2.2, less than 2, less than 1.8, less than 1.6, less than 1.4, less than 1.2, less than 1, less than 0.8, less than 0.6 or less than 0.4. In some embodiments, when a redox initiator system is selected as the initiator, the molar ratio of the water-soluble free radical initiator to the reducing agent is more than 0.2, more than 0.4, more than 0.6, more than 0.8, more than 1, more than 1.2, more than 1.4, more than 1.6, more than 1.8, more than 2, more than 2.2, more than 2.4, more than 2.6, more than 2.8, more than 3, more than 3.2, more than 3.4, more than 3.6, more than 3.8, more than 4, more than 4.2, more than 4.4, more than 4.6, more than 4.8, more than 5, more than 6, more than 7, more than 8 or more than 9.

The polymerization temperature is dependent on the type of initiator applied. In some embodiments, the reaction temperature of the polymerization is from about 50° C. to about 90° C., from about 50° C. to about 85° C., from about 50° C. to about 80° C., from about 50° C. to about 75° C., from about 50° C. to about 70° C., from about 55° C. to about 75° C., from about 55° C. to about 80° C., from about 55° C. to about 85° C., from about 60° C. to about 80° C., from about 60° C. to about 75° C., from about 60° C. to about 70° C. or from about 55° C. to about 70° C. When the reaction temperature of the polymerization is within the above range, a higher reaction stability could be achieved and the binder composition could exhibit a better overall binding performance. In some embodiments, the reaction temperature of the polymerization is less than 90° C., less than 85° C., less than 80° C., less than 75° C., less than 70° C., less than 65° C., less than 60° C. or less than 55° C. In some embodiments, the reaction temperature of the polymerization is more than 50° C., more than 55° C., more than 60° C., more than 65° C., more than 70° C., more than 75° C., more than 80° C. or more than 85° C.

In some embodiments, the stirring speed of the mixer during polymerization is from about 100 rpm to about 1000 rpm, from about 100 rpm to about 950 rpm, from about 100 rpm to about 900 rpm, from about 100 rpm to about 850 rpm, from about 100 rpm to about 800 rpm, from about 100 rpm to about 750 rpm, from about 100 rpm to about 700 rpm, from about 100 rpm to about 650 rpm, from about 100 rpm to about 600 rpm, from about 100 rpm to about 550 rpm, from about 100 rpm to about 500 rpm, from about 150 rpm to about 500 rpm, from about 200 rpm to about 500 rpm, from about 250 rpm to about 500 rpm, from about 250 rpm to about 450 rpm, from about 300 rpm to about 450 rpm or from about 300 rpm to about 400 rpm. In some embodiments, the stirring speed of the mixer during polymerization is less than 1000 rpm, less than 950 rpm, less than 900 rpm, less than 850 rpm, less than 800 rpm, less than 750 rpm, less than 700 rpm, less than 650 rpm, less than 600 rpm, less than 550 rpm, less than 500 rpm, less than 450 rpm, less than 400 rpm, less than 350 rpm, less than 300 rpm, less than 250 rpm, less than 200 rpm or less than 150 rpm. In some embodiments, the stirring speed of the mixer during polymerization is more than 100 rpm, more than 150 rpm, more than 200 rpm, more than 250 rpm, more than 300 rpm, more than 350 rpm, more than 400 rpm, more than 450 rpm, more than 500 rpm, more than 550 rpm, more than 600 rpm, more than 650 rpm, more than 700 rpm, more than 750 rpm, more than 800 rpm, more than 850 rpm, more than 900 rpm or more than 950 rpm.

In some embodiments, the first suspension is stirred for a time period of from about 10 minutes to about 60 minutes, from about 15 minutes to about 60 minutes, from about 20 minutes to about 60 minutes, from about 20 minutes to about 55 minutes, from about 20 minutes to about 50 minutes, from about 20 minutes to about 45 minutes or from about 20 minutes to about 40 minutes. In some embodiments, the first suspension is stirred for a time period of less than 60 minutes, less than 55 minutes, less than 50 minutes, less than 45 minutes, less than 40 minutes, less than 35 minutes, less than 30 minutes, less than 25 minutes, less than 20 minutes or less than 15 minutes. In some embodiments, the first suspension is stirred for a time period of more than 10 minutes, more than 15 minutes, more than 20 minutes, more than 25 minutes, more than 30 minutes, more than 35 minutes, more than 40 minutes, more than 45 minutes, more than 50 minutes or more than 55 minutes.

In some embodiments, a second suspension is formed by simultaneously adding the remaining of the pre-emulsifying solution and the initiator solution dropwise into the first suspension in step 106.

In some embodiments, the remaining of the pre-emulsifying solution is added dropwise to the first suspension for a time period of from about 2 hours to about 6 hours, from about 2.5 hours to about 6 hours, from about 2.5 hours to about 5.5 hours, from about 3 hours to about 5.5 hours, from about 3 hours to about 5 hours, from about 3.5 hours to about 5 hours or from about 3.5 hours to about 4.5 hours. In some embodiments, the remaining of the pre-emulsifying solution is added dropwise to the first suspension for a time period of less than 6 hours, less than 5.5 hours, less than 5 hours, less than 4.5 hours, less than 4 hours, less than 3.5 hours, less than 3 hours or less than 2.5 hours. In some embodiments, the remaining of the pre-emulsifying solution is added dropwise to the first suspension for a time period of more than 2 hours, more than 2.5 hours, more than 3 hours, more than 3.5 hours, more than 4 hours, more than 4.5 hours, more than 5 hours or more than 5.5 hours.

In some embodiments, the remaining of the initiator solution is added dropwise to the first suspension for a time period of from about 2 hours to about 7 hours, from about 2.5 hours to about 7 hours, from about 3 hours to about 7 hours, from about 3 hours to about 6.5 hours, from about 3 hours to about 6 hours, from about 3.5 hours to about 6 hours or from about 3.5 hours to about 5.5 hours. In some embodiments, the remaining of the initiator solution is added dropwise to the first suspension for a time period of less than 7 hours, less than 6.5 hours, less than 6 hours, less than 5.5 hours, less than 5 hours, less than 4.5 hours, less than 4 hours, less than 3.5 hours, less than 3 hours or less than 2.5 hours. In some embodiments, the remaining of the initiator solution is added dropwise to the first suspension for a time period of more than 2 hours, more than 2.5 hours, more than 3 hours, more than 3.5 hours, more than 4 hours, more than 4.5 hours, more than 5 hours, more than 5.5 hours, more than 6 hours or more than 6.5 hours.

In some embodiments, a self-crosslinking monomer solution is prepared by adding the self-crosslinking monomer in water. In certain embodiments, a reaction mixture is formed by adding a self-crosslinking monomer solution dropwise into the second suspension immediately after the addition of the remaining pre-emulsifying solution and initiator solution in step 106.

Crosslinking involves attaching two or more polymer chains by means of covalent or ionic bonds. Crosslinking monomer(s) can be added to the binder composition to enable this process. Incorporation of crosslinking monomer upsurges the crosslinking density of the polymers in the binder composition. Increase in crosslinking density of the polymer in the binder composition offers excellent barrier properties which ultimately enhances water resistance, mar resistance, chemical resistance and hardness of the electrode layer produced therefrom. Crosslinking can be introduced via an external crosslinker or by means of a self-crosslinking monomer that inserts crosslinking groups or systems on the main polymer chain.

In some embodiments, a self-crosslinking polymer may be applied to the binder composition in the present invention to improve on or modify its mechanical properties. When the binder composition is dried to form a film, self-crosslinking takes place between two mutual functional groups of polymer chains and subsequently polymer is crosslinked into a three-dimensional network structure. This crosslinking reaction is triggered either by water evaporation, change in pH or by curing at a higher temperature at which polymerization takes place.

In some embodiments, the self-crosslinking monomer may be selected from the group consisting of N-hydroxyethyl acrylamide (HEAA), N-methylol acrylamide, N-methylol methacrylamide, N-(isobutoxy-methyl) acrylamide (IBMA), acetoacetoxy ethyl methacrylate, trimethoxysilylpropyl methacrylate (TSPMA), adipic acid dihydrazide (ADH), diacetone acrylamide (DAAM), divinylbenzene (DVB), vinyltrimethoxysilane (VTMS), vinyltriethoxysilane (VTES), vinyltriisopropoxysilane (VTPS), methacryloxypropyltrimethoxy silane (MATS), acryloxypropyltrimethoxysilane, allyltrimethoxysilane, isopropoxy vinylsilane, tris(2-methoxyethoxy)vinylsilane, a salt or complex of phosphate, propionate, sulfate, nitrate, acetate, tartrate, ammonia, oxide, carbonate, acetylacetonate and combinations thereof.

In some embodiments, the self-crosslinking monomer solution is added dropwise to the second suspension for a time period of from about 5 minutes to about 40 minutes, from about 10 minutes to about 40 minutes, from about 10 minutes to about 35 minutes, from about 10 minutes to about 30 minutes, from about 15 minutes to about 30 minutes or from about 15 minutes to about 25 minutes. In some embodiments, the self-crosslinking monomer solution is added dropwise to the second suspension for a time period of less than 40 minutes, less than 35 minutes, less than 30 minutes, less than 25 minutes, less than 20 minutes, less than 15 minutes or less than 10 minutes. In some embodiments, the self-crosslinking monomer solution is added dropwise to the second suspension for a time period of more than 5 minutes, more than 10 minutes, more than 15 minutes, more than 20 minutes, more than 25 minutes, more than 30 minutes or more than 35 minutes.

In some embodiments, the reaction time of the polymerization after the addition of the self-crosslinking monomer solution is from about 8 hours to about 24 hours, from about 9 hours to about 24 hours, from about 10 hours to about 24 hours, from about 11 hours to about 24 hours, from about 12 hours to about 24 hours, from about 13 hours to about 24 hours, from about 14 hours to about 24 hours, from about 15 hours to about 24 hours, from about 16 hours to about 24 hours, from about 16 hours to about 23 hours, from about 16 hours to about 22 hours, from about 16 hours to about 21 hours, from about 16 hours to about 20 hours, from about 12 hours to about 20 hours, from about 18 hours to about 22 hours, from about 16 hours to about 24 hours or from about 14 hours to about 20 hours.

In some embodiments, the reaction time of the polymerization after the addition of the self-crosslinking monomer solution is less than 24 hours, less than 23 hours, less than 22 hours, less than 21 hours, less than 20 hours, less than 19 hours, less than 18 hours, less than 17 hours, less than 16 hours, less than 15 hours, less than 14 hours, less than 13 hours, less than 12 hours, less than 11 hours, less than 10 hours or less than 9 hours. In some embodiments, the reaction time of the polymerization after the addition of the self-crosslinking monomer solution is more than 8 hours, more than 9 hours, more than 10 hours, more than 11 hours, more than 12 hours, more than 13 hours, more than 14 hours, more than 15 hours, more than 16 hours, more than 17 hours, more than 18 hours, more than 19 hours, more than 20 hours, more than 21 hours, more than 22 hours or more than 23 hours.

In some embodiments, the reaction mixture is stirred for a time period of from about 8 hours to about 25 hours, from about 8 hours to about 24 hours, from about 8 hours to about 23 hours, from about 8 hours to about 22 hours, from about 8 hours to about 21 hours, from about 8 hours to about 20 hours, from about 8 hours to about 19 hours, from about 8 hours to about 18 hours, from about 8 hours to about 17 hours, from about 8 hours to about 16 hours, from about 8 hours to about 15 hours, from about 9 hours to about 15 hours, from about 10 hours to about 15 hours, from about 10 hours to about 14 hours, from about 10 hours to about 13 hours or from about 10 hours to about 12 hours during the addition of self-crosslinking monomer solution and as polymerization takes place. In some embodiments, the reaction mixture is stirred for a time period of less than 25 hours, less than 23 hours, less than 20 hours, less than 18 hours, less than 16 hours, less than 14 hours, less than 12 hours or less than 10 hours during the addition of self-crosslinking monomer solution and as polymerization takes place. In some embodiments, the reaction mixture is stirred for a time period of more than 8 hours, more than 10 hours, more than 12 hours, more than 14 hours, more than 16 hours, more than 18 hours, more than 20 hours, more than 22 hours or more than 24 hours during the addition of self-crosslinking monomer solution and as polymerization takes place.

In other embodiments, a self-crosslinking monomer solution is not added into the second suspension to form a reaction mixture. In this case, the reaction time of the polymerization after the addition of the remaining of the pre-emulsifying solution and the initiator solution is from about 8 hours to about 24 hours, from about 9 hours to about 24 hours, from about 10 hours to about 24 hours, from about 11 hours to about 24 hours, from about 12 hours to about 24 hours, from about 13 hours to about 24 hours, from about 14 hours to about 24 hours, from about 15 hours to about 24 hours, from about 16 hours to about 24 hours, from about 16 hours to about 23 hours, from about 16 hours to about 22 hours, from about 16 hours to about 21 hours, from about 16 hours to about 20 hours, from about 12 hours to about 20 hours, from about 18 hours to about 22 hours, from about 16 hours to about 24 hours or from about 14 hours to about 20 hours. In some embodiments, the reaction time of the polymerization after the addition of the remaining of the pre-emulsifying solution and the initiator solution is less than 24 hours, less than 23 hours, less than 22 hours, less than 21 hours, less than 20 hours, less than 19 hours, less than 18 hours, less than 17 hours, less than 16 hours, less than 15 hours, less than 14 hours, less than 13 hours, less than 12 hours, less than 11 hours, less than 10 hours or less than 9 hours. In some embodiments, the reaction time of the polymerization after the addition of the remaining of the pre-emulsifying solution and the initiator solution is more than 8 hours, more than 9 hours, more than 10 hours, more than 11 hours, more than 12 hours, more than 13 hours, more than 14 hours, more than 15 hours, more than 16 hours, more than 17 hours, more than 18 hours, more than 19 hours, more than 20 hours, more than 21 hours, more than 22 hours or more than 23 hours.

In some embodiments, the second suspension is stirred for a time period of from about 10 hours to about 30 hours, from about 11 hours to about 30 hours, from about 12 hours to about 30 hours, from about 13 hours to about 30 hours, from about 14 hours to about 30 hours, from about 15 hours to about 30 hours, from about 15 hours to about 29 hours, from about 15 hours to about 28 hours, from about 15 hours to about 27 hours, from about 15 hours to about 26 hours, from about 15 hours to about 25 hours, from about 16 hours to about 25 hours, from about 16 hours to about 24 hours, from about 17 hours to about 24 hours, from about 17 hours to about 23 hours, from about 18 hours to about 23 hours, from about 18 hours to about 22 hours during the addition of the remaining of the pre-emulsifying solution and the initiator solution and as polymerization takes place.

In some embodiments, the second suspension is stirred for a time period of less than 30 hours, less than 29 hours, less than 28 hours, less than 27 hours, less than 26 hours, less than 25 hours, less than 24 hours, less than 23 hours, less than 22 hours, less than 21 hours, less than 20 hours, less than 19 hours, less than 18 hours, less than 17 hours, less than 16 hours, less than 15 hours, less than 14 hours, less than 13 hours, less than 12 hours, less than 11 hours, less than 10 hours or less than 9 hours during the addition of the remaining of the pre-emulsifying solution and the initiator solution and as polymerization takes place. In some embodiments, the second suspension is stirred for a time period of more than 10 hours, more than 11 hours, more than 12 hours, more than 13 hours, more than 14 hours, more than 15 hours, more than 16 hours, more than 17 hours, more than 18 hours, more than 19 hours, more than 20 hours, more than 21 hours, more than 22 hours, more than 23 hours, more than 24 hours, more than 25 hours, more than 26 hours, more than 27 hours, more than 28 hours or more than 29 hours during the addition of the remaining of the pre-emulsifying solution and the initiator solution and as polymerization takes place.

In some embodiments, a neutralizing solution is prepared by dissolving the neutralizing agent in water. In some embodiments, a third suspension is formed by adding the neutralizing solution into the second suspension in step 107. The above-mentioned neutralizing agent in step 102 may be selected. In some embodiments, the neutralizing agent applied in step 102 may correspond to the neutralizing agent used in step 107. In some embodiments, the neutralizing agents applied in steps 102 and 107 may not be the same.

In some embodiments, the temperature of the second suspension is lowered to from about 20° C. to about 40° C., from about 22° C. to about 40° C., from about 24° C. to about 40° C., from about 24° C. to about 38° C., from about 24° C. to about 36° C., from about 26° C. to about 36° C. or from about 26° C. to about 34° C., prior to adding a neutralizing solution to form a third suspension. In some embodiments, the temperature of the second suspension is lowered to less than 40° C., less than 38° C., less than 36° C., less than 34° C., less than 32° C., less than 30° C., less than 28° C., less than 26° C., less than 24° C. or less than 22° C., prior to adding a neutralizing solution to form a third suspension. In some embodiments, the temperature of the second suspension is lowered to more than 20° C., more than 22° C., more than 24° C., more than 26° C., more than 28° C., more than 30° C., more than 32° C., more than 34° C., more than 36° C. or more than 38° C., prior to adding a neutralizing solution to form a third suspension.

In other embodiments, a third suspension is formed by adding a neutralizing solution into the reaction mixture. In some embodiments, the temperature of the reaction mixture is lowered to from about 20° C. to about 40° C., from about 22° C. to about 40° C., from about 24° C. to about 40° C., from about 24° C. to about 38° C., from about 24° C. to about 36° C., from about 26° C. to about 36° C. or from about 26° C. to about 34° C., prior to adding a neutralizing solution to form a third suspension. In some embodiments, the temperature of the reaction mixture is lowered to less than 40° C., less than 38° C., less than 36° C., less than 34° C., less than 32° C., less than 30° C., less than 28° C., less than 26° C., less than 24° C. or less than 22° C., prior to adding a neutralizing solution to form a third suspension. In some embodiments, the temperature of the reaction mixture is lowered to more than 20° C., more than 22° C., more than 24° C., more than 26° C., more than 28° C., more than 30° C., more than 32° C., more than 34° C., more than 36° C. or more than 38° C., prior to adding a neutralizing solution to form a third suspension.

In some embodiments, the total proportion of the neutralising agent added is from about 2% to about 15%, from about 2% to about 14.5%, from about 2% to about 14%, from about 2% to about 13.8%, from about 2% to about 13.6%, from about 2% to about 13.4%, from about 2% to about 13.2%, from about 2% to about 13%, from about 2% to about 12.9%, from about 2% to about 12.8%, from about 2% to about 12.7%, from about 2% to about 12.6%, from about 2% to about 12.5%, from about 2% to about 12.4%, from about 2% to about 12.3%, from about 2% to about 12.2%, from about 2% to about 12.1%, from about 2% to about 12%, from about 2.2% to about 12%, from about 2.4% to about 12%, from about 2.6% to about 12%, from about 2.8% to about 12%, from about 3% to about 12%, from about 3.5% to about 11.5% or from about 3% to about 11.8% by mole, based on the total number of moles of monomeric units in the copolymer in the binder composition.

In some embodiments, the total proportion of the neutralising agent is less than 15%, less than 14%, less than 13%, less than 12%, less than 11%, less than 10%, less than 9%, less than 8%, less than 7%, less than 6%, less than 5% or less than 4% by mole, based on the total number of moles of monomeric units in the copolymer in the binder composition. In some embodiments, the total proportion of the neutralising agent is more than 2%, more than 3%, more than 4%, more than 5%, more than 6%, more than 7%, more than 8%, more than 9%, more than 10%, more than 11%, more than 12%, more than 13% or more than 14% by mole, based on the total number of moles of monomeric units in the copolymer in the binder composition.

In some embodiments, the third suspension is stirred for a time period of from about 2 hours to about 4 hours, from about 2.25 hours to about 4 hours, from about 2.5 hours to about 4 hours, from about 2.5 hours to about 3.75 hours, from about 2.5 hours to about 3.5 hours, from about 2.75 hours to about 3.5 hours, from about 2.75 hours to about 3.25 hours, from about 2.5 hours to about 3 hours, from about 2 hours to about 3 hours, from about 3 hours to about 3.5 hours or from about 3 hours to about 4 hours. In some embodiments, the third suspension is stirred for a time period of less than 4 hours, less than 3.75 hours, less than 3.5 hours, less than 3.25 hours, less than 3 hours, less than 2.75 hours, less than 2.5 hours or less than 2.25 hours. In some embodiments, the third suspension is stirred for a time period of more than 2 hours, more than 2.25 hours, more than 2.5 hours, more than 2.75 hours, more than 3 hours, more than 3.25 hours, more than 3.5 hours or more than 3.75 hours.

In some embodiments, a binder composition is formed by filtering the third suspension in step 108.

Additions of neutralizing agents in steps 102 and 107 aims to neutralize the carboxylic acid group-containing monomer added in step 103 in order to produce a binder composition that is slightly alkaline in nature. Exposing binder composition to acidic conditions is undesirable as this may disrupt the dispersion of the binder composition.

In some embodiments, structural unit (a) derived from a carboxylic acid group-containing monomer comprises a carboxylic salt group. In some embodiments, a carboxylic salt group is a salt of a carboxylic acid group. In some embodiments, structural unit (a) derived from a carboxylic acid group-containing monomer comprises a combination of a carboxylic salt group and a carboxylic acid group. In some embodiments, structural unit (a) comprises an alkali metal carboxylic salt group. Examples of an alkali metal forming the alkali metal carboxylic salt include lithium, sodium and potassium. In some embodiments, structural unit (a) comprises an ammonium carboxylic salt group.

In some embodiments, the molar ratio of the carboxylic acid group to the carboxylic salt group in the copolymer is from about 0 to about 0.2, from about 0 to about 0.19, from about 0 to about 0.18, from about 0 to about 0.17, from about 0 to about 0.16, from about 0 to about 0.15, from about 0 to about 0.14, from about 0 to about 0.13, from about 0 to about 0.12, from about 0 to about 0.11, from about 0 to about 0.1, from about 0 to about 0.095, from about 0 to about 0.09, from about 0 to about 0.085, from about 0 to about 0.08, from about 0 to about 0.075, from about 0 to about 0.07, from about 0 to about 0.065, from about 0 to about 0.06, from about 0 to about 0.055, from about 0 to about 0.05, from about 0 to about 0.045, from about 0 to about 0.04, from about 0 to about 0.035, from about 0 to about 0.03, from about 0.01 to about 0.07 or from about 0.01 to about 0.05.

In some embodiments, the molar ratio of the carboxylic acid group to the carboxylic salt group in the copolymer is less than 0.2, less than 0.18, less than 0.16, less than 0.14, less than 0.12, less than 0.1, less than 0.09, less than 0.08, less than 0.07, less than 0.06, less than 0.05, less than 0.04, less than 0.03 or less than 0.02. In some embodiments, the molar ratio of the carboxylic acid group to the carboxylic salt group in the copolymer is more than 0, more than 0.01, more than 0.02, more than 0.03, more than 0.04, more than 0.05, more than 0.06, more than 0.07, more than 0.08, more than 0.09, more than 0.1, more than 0.12, more than 0.14, more than 0.16 or more than 0.18.

In some embodiments, the proportion of structural unit (a) in the copolymer is from about 2% to about 13%, from about 2% to about 12.75%, from about 2% to about 12.5%, from about 2% to about 12.25%, from about 2% to about 12%, from about 2.25% to about 12%, from about 2.5% to about 12%, from about 2.75% to about 12%, from about 3% to about 12%, from about 3.25% to about 12%, from about 3.5% to about 12%, from about 3.75% to about 12%, from about 4% to about 12%, from about 4.25% to about 12%, from about 4.5% to about 12%, from about 4.75% to about 12%, from about 5% to about 12%, from about 5.25% to about 12%, from about 5.5% to about 12%, from about 5.75% to about 12%, from about 6% to about 12%, from about 4% to about 11.5%, from about 4% to about 11% or from about 5% to about 11% by mole, based on the total number of moles of monomeric units in the copolymer in the binder composition.

In some embodiments, the proportion of structural unit (a) in the copolymer is less than 13%, less than 12.5%, less than 12%, less than 11.5%, less than 11%, less than 10.5%, less than 10%, less than 9.5%, less than 9%, less than 8.5%, less than 8%, less than 7.5%, less than 7%, less than 6.5%, less than 6%, less than 5.5%, less than 5%, less than 4.5%, less than 4%, less than 3.5% or less than 3% by mole, based on the total number of moles of monomeric units in the copolymer in the binder composition. In some embodiments, the proportion of structural unit (a) in the copolymer is more than 2%, more than 2.5%, more than 3%, more than 3.5%, more than 4%, more than 4.5%, more than 5%, more than 5.5%, more than 6%, more than 6.5%, more than 7%, more than 7.5%, more than 8%, more than 8.5%, more than 9%, more than 9.5%, more than 10%, more than 10.5%, more than 11%, more than 11.5%, more than 12% or more than 12.5% by mole, based on the total number of moles of monomeric units in the copolymer in the binder composition.

In some embodiments, the proportion of structural unit (b) in the copolymer is from about 20% to about 37%, from about 20.5% to about 37%, from about 21% to about 37%, from about 21.5% to about 37%, from about 22% to about 37%, from about 22.5% to about 37%, from about 23% to about 37%, from about 23.5% to about 37%, from about 24% to about 37%, from about 24.5% to about 37%, from about 25% to about 37%, from about 25.5% to about 37%, from about 26% to about 37%, from about 26.5% to about 37%, from about 27% to about 37%, from about 27.5% to about 37%, from about 28% to about 37%, from about 29% to about 37%, from about 29% to about 36%, from about 29.5% to about 36%, from about 30% to about 36%, from about 25% to about 35% or from about 28% to about 37% by mole, based on the total number of moles of monomeric units in the copolymer in the binder composition.

In some embodiments, the proportion of structural unit (b) in the copolymer is less than 37%, less than 36%, less than 35%, less than 34%, less than 33%, less than 32%, less than 31%, less than 30%, less than 29%, less than 28%, less than 27%, less than 26%, less than 25%, less than 24%, less than 23%, less than 22% or less than 21% by mole, based on the total number of moles of monomeric units in the copolymer in the binder composition. In some embodiments, the proportion of structural unit (b) in the copolymer is more than 20%, more than 21%, more than 22%, more than 23%, more than 24%, more than 25%, more than 26%, more than 27%, more than 28%, more than 29%, more than 30%, more than 31%, more than 32%, more than 33%, more than 34%, more than 35% or more than 36% by mole, based on the total number of moles of monomeric units in the copolymer in the binder composition.

In some embodiments, the proportion of structural unit (c) in the copolymer is 52% to about 70%, from about 52.5% to about 70%, from about 53% to about 70%, from about 53.5% to about 70%, from about 54% to about 70%, from about 54.5% to about 70%, from about 55% to about 70%, from about 55% to about 69%, from about 55% to about 68%, from about 55% to about 67%, from about 55% to about 66%, from about 55% to about 65%, from about 55.5% to about 65%, from about 56% to about 65%, from about 56.5% to about 65%, from about 57% to about 65%, from about 57.5% to about 65%, from about 58% to about 65%, from about 58% to about 64% or from about 58% to about 70% by mole, based on the total number of moles of monomeric units in the copolymer in the binder composition.

In some embodiments, the proportion of structural unit (c) in the copolymer is less than 70%, less than 69%, less than 68%, less than 67%, less than 66%, less than 65%, less than 64%, less than 63%, less than 62%, less than 61%, less than 60%, less than 59%, less than 58%, less than 57%, less than 56%, less than 55%, less than 54% or less than 53% by mole, based on the total number of moles of monomeric units in the copolymer in the binder composition. In some embodiments, the proportion of structural unit (c) in the copolymer is more than 52%, more than 53%, more than 54%, more than 55%, more than 56%, more than 57%, more than 58%, more than 59%, more than 60%, more than 61%, more than 62%, more than 63%, more than 64%, more than 65%, more than 66%, more than 67%, more than 68% or more than 69% by mole, based on the total number of moles of monomeric units in the copolymer in the binder composition.

In some embodiments, the proportion of structural unit (d) in the copolymer is from about 2% to about 10%, from about 2.5% to about 10%, from about 3% to about 10%, from about 3.2% to about 10%, from about 3.4% to about 10%, from about 3.6% to about 10%, from about 3.8% to about 10%, from about 4% to about 10%, from about 4% to about 9.5%, from about 4% to about 9%, from about 4% to about 8.5%, from about 4% to about 8%, from about 4% to about 7.5%, from about 4% to about 7%, from about 4.2% to about 9%, from about 4.4% to about 9%, from about 4.6% to about 9%, from about 4.8% to about 9% or from about 5% to about 9% by mole, based on the total number of moles of monomeric units in the copolymer in the binder composition.

In some embodiments, the proportion of structural unit (d) in the copolymer is less than 10%, less than 9.5%, less than 9%, less than 8.5%, less than 8%, less than 7.5%, less than 7%, less than 6.5%, less than 6%, less than 5.5%, less than 5%, less than 4.5%, less than 4%, less than 3.5%, less than 3% or less than 2.5% by mole, based on the total number of moles of monomeric units in the copolymer in the binder composition. In some embodiments, the proportion of structural unit (d) in the copolymer is more than 2%, more than 2.5%, more than 3%, more than 3.5%, more than 4%, more than 4.5%, more than 5%, more than 5.5%, more than 6%, more than 6.5%, more than 7%, more than 7.5%, more than 8%, more than 8.5%, more than 9% or more than 9.5% by mole, based on the total number of moles of monomeric units in the copolymer in the binder composition.

In some embodiments, the proportion of the anionic reactive emulsifier is from about 0.02% to about 3%, from about 0.02% to about 2.9%, from about 0.02% to about 2.8%, from about 0.02% to about 2.7%, from about 0.02% to about 2.6%, from about 0.02% to about 2.5%, from about 0.02% to about 2.4%, from about 0.02% to about 2.3%, from about 0.02% to about 2.2%, from about 0.02% to about 2.1%, from about 0.02% to about 2%, from about 0.02% to about 1.9%, from about 0.02% to about 1.8%, from about 0.02% to about 1.7%, from about 0.02% to about 1.6%, from about 0.02% to about 1.5%, from about 0.02% to about 1.4%, from about 0.02% to about 1.3%, from about 0.02% to about 1.2%, from about 0.02% to about 1.1%, from about 0.02% to about 1%, from about 0.03% to about 1%, from about 0.04% to about 1%, from about 0.05% to about 1%, from about 0.06% to about 1.6% or from about 0.07% to about 2.4% by mole, based on the total number of moles of monomeric units in the copolymer in the binder composition.

In some embodiments, the proportion of the anionic reactive emulsifier is less than 3%, less than 2.9%, less than 2.8%, less than 2.7%, less than 2.6%, less than 2.5%, less than 2.4%, less than 2.3%, less than 2.2%, less than 2.1%, less than 2%, less than 1.9%, less than 1.8%, less than 1.7%, less than 1.6%, less than 1.5%, less than 1.4%, less than 1.3%, less than 1.2%, less than 1.1%, less than 1%, less than 0.9%, less than 0.8%, less than 0.7%, less than 0.6%, less than 0.5% or less than 0.4% by mole, based on the total number of moles of monomeric units in the copolymer in the binder composition. In some embodiments, the proportion of the anionic reactive emulsifier is more than 0.02%, more than 0.04%, more than 0.06%, more than 0.08%, more than 0.1%, more than 0.2%, more than 0.3%, more than 0.4%, more than 0.5%, more than 0.6%, more than 0.7%, more than 0.8%, more than 0.9%, more than 1%, more than 1.1%, more than 1.2%, more than 1.3%, more than 1.4%, more than 1.5%, more than 1.6%, more than 1.7%, more than 1.8%, more than 1.9%, more than 2%, more than 2.1%, more than 2.2%, more than 2.3%, more than 2.4%, more than 2.5%, more than 2.6%, more than 2.7% or more than 2.8% by mole, based on the total number of moles of monomeric units in the copolymer in the binder composition.

In some embodiments, the molar ratio of the anionic reactive emulsifier to the structural unit (c) in the copolymer is from about 0.01% to about 4%, from about 0.01% to about 3.9%, from about 0.01% to about 3.8%, from about 0.01% to about 3.7%, from about 0.01% to about 3.6%, from about 0.01% to about 3.5%, from about 0.01% to about 3.4%, from about 0.01% to about 3.3%, from about 0.01% to about 3.2%, from about 0.01% to about 3.1%, from about 0.01% to about 3%, from about 0.01% to about 2.9%, from about 0.01% to about 2.8%, from about 0.01% to about 2.7%, from about 0.01% to about 2.6%, from about 0.01% to about 2.5%, from about 0.01% to about 2.4%, from about 0.01% to about 2.3%, from about 0.01% to about 2.2%, from about 0.01% to about 2.1%, from about 0.01% to about 2%, from about 0.01% to about 1.9%, from about 0.01% to about 1.8%, from about 0.01% to about 1.7%, from about 0.01% to about 1.6%, from about 0.01% to about 1.5%, from about 0.01% to about 1.4%, from about 0.01% to about 1.3%, from about 0.01% to about 1.2%, from about 0.01% to about 1.1%, from about 0.01% to about 1%, from about 0.02% to about 1%, from about 0.03% to about 1%, from about 0.04% to about 1%, from about 0.05% to about 1%, from about 0.06% to about 1%, from about 0.02% to about 0.8%, from about 0.02% to about 0.7%, from about 0.02% to about 0.6%, from about 0.02% to about 1.5% or from about 0.02% to about 2.5%.

In some embodiments, the molar ratio of the anionic reactive emulsifier to the structural unit (c) in the copolymer is less than 4%, less than 3.8%, less than 3.6%, less than 3.4%, less than 3.2%, less than 3%, less than 2.8%, less than 2.6%, less than 2.4%, less than 2.2%, less than 2%, less than 1.9%, less than 1.8%, less than 1.7%, less than 1.6%, less than 1.5%, less than 1.4%, less than 1.3%, less than 1.2%, less than 1.1%, less than 1%, less than 0.9%, less than 0.8%, less than 0.7%, less than 0.6%, less than 0.5%, less than 0.4%, less than 0.3%, less than 0.2% or less than 0.1%. In some embodiments, the molar ratio of the anionic reactive emulsifier to the structural unit (c) in the copolymer is more than 0.01%, more than 0.02%, more than 0.03%, more than 0.04%, more than 0.05%, more than 0.06%, more than 0.07%, more than 0.08%, more than 0.09%, more than 0.1%, more than 0.2%, more than 0.4%, more than 0.6%, more than 0.8%, more than 1%, more than 1.2%, more than 1.4%, more than 1.6%, more than 1.8%, more than 2%, more than 2.2%, more than 2.4%, more than 2.6%, more than 2.8%, more than 3%, more than 3.2%, more than 3.4%, more than 3.6% or more than 3.8%.

In some embodiments, the proportion of the polyoxyalkylene-based anionic reactive emulsifier is from about 0.02% to about 0.5%, from about 0.02% to about 0.48%, from about 0.02% to about 0.46%, from about 0.02% to about 0.44%, from about 0.02% to about 0.42%, from about 0.02% to about 0.4%, from about 0.02% to about 0.38%, from about 0.02% to about 0.36%, from about 0.02% to about 0.34%, from about 0.02% to about 0.32%, from about 0.02% to about 0.3%, from about 0.02% to about 0.29%, from about 0.02% to about 0.28%, from about 0.02% to about 0.27%, from about 0.02% to about 0.26%, from about 0.02% to about 0.25%, from about 0.02% to about 0.24%, from about 0.02% to about 0.23%, from about 0.02% to about 0.22%, from about 0.02% to about 0.21%, from about 0.02% to about 0.2%, from about 0.02% to about 0.19%, from about 0.02% to about 0.18%, from about 0.02% to about 0.17%, from about 0.02% to about 0.16%, from about 0.02% to about 0.15%, from about 0.03% to about 0.15%, from about 0.04% to about 0.15%, from about 0.03% to about 0.25% or from about 0.03% to about 0.2% by mole, based on the total number of moles of monomeric units in the copolymer in the binder composition.

In some embodiments, the proportion of the polyoxyalkylene-based anionic reactive emulsifier is less than 0.5%, less than 0.45%, less than 0.4%, less than 0.35%, less than 0.3%, less than 0.28%, less than 0.26%, less than 0.24%, less than 0.22%, less than 0.2%, less than 0.18%, less than 0.16%, less than 0.14%, less than 0.12%, less than 0.1%, less than 0.08%, less than 0.06% or less than 0.04% by mole, based on the total number of moles of monomeric units in the copolymer in the binder composition. In some embodiments, the proportion of the polyoxyalkylene-based anionic reactive emulsifier is more than 0.02%, more than 0.04%, more than 0.06%, more than 0.08%, more than 0.1%, more than 0.12%, more than 0.14%, more than 0.16%, more than 0.18%, more than 0.2%, more than 0.22%, more than 0.24%, more than 0.26%, more than 0.28%, more than 0.3%, more than 0.35%, more than 0.4% or more than 0.45% by mole, based on the total number of moles of monomeric units in the copolymer in the binder composition.

In some embodiments, the proportion of the non-polyoxyalkylene-based anionic reactive emulsifier is from about 0.2% to about 2.5%, from about 0.2% to about 2.45%, from about 0.2% to about 2.4%, from about 0.2% to about 2.35%, from about 0.2% to about 2.3%, from about 0.2% to about 2.25%, from about 0.2% to about 2.2%, from about 0.2% to about 2.15%, from about 0.2% to about 2.1%, from about 0.2% to about 2.05%, from about 0.2% to about 2%, from about 0.2% to about 1.95%, from about 0.2% to about 1.9%, from about 0.2% to about 1.85%, from about 0.2% to about 1.8%, from about 0.2% to about 1.75%, from about 0.2% to about 1.7%, from about 0.2% to about 1.65%, from about 0.2% to about 1.6%, from about 0.25% to about 1.6%, from about 0.3% to about 1.6%, from about 0.35% to about 1.6%, from about 0.4% to about 1.6%, from about 0.5% to about 1.6%, from about 0.5% to about 2% or from about 0.5% to about 1.75% by mole, based on the total number of moles of monomeric units in the copolymer in the binder composition.

In some embodiments, the proportion of the non-polyoxyalkylene-based anionic reactive emulsifier is less than 2.5%, less than 2.4%, less than 2.3%, less than 2.2%, less than 2.1%, less than 2%, less than 1.9%, less than 1.8%, less than 1.7%, less than 1.6%, less than 1.5%, less than 1.4%, less than 1.3%, less than 1.2%, less than 1.1%, less than 1%, less than 0.9%, less than 0.8%, less than 0.7%, less than 0.6%, less than 0.5% or less than 0.4% by mole, based on the total number of moles of monomeric units in the copolymer in the binder composition. In some embodiments, the proportion of the non-polyoxyalkylene-based anionic reactive emulsifier is more than 0.2%, more than 0.3%, more than 0.4%, more than 0.5%, more than 0.6%, more than 0.7%, more than 0.8%, more than 0.9%, more than 1%, more than 1.1%, more than 1.2%, more than 1.3%, more than 1.4%, more than 1.5%, more than 1.6%, more than 1.7%, more than 1.8%, more than 1.9%, more than 2%, more than 2.1%, more than 2.2%, more than 2.3% or more than 2.4% by mole, based on the total number of moles of monomeric units in the copolymer in the binder composition.

In some embodiments, the molar ratio of the polyoxyalkylene-based anionic reactive emulsifier to the structural unit (c) in the copolymer is from about 0.05% to about 0.8%, from about 0.05% to about 0.75%, from about 0.05% to about 0.7%, from about 0.05% to about 0.65%, from about 0.05% to about 0.6%, from about 0.05% to about 0.55%, from about 0.05% to about 0.5%, from about 0.05% to about 0.45%, from about 0.05% to about 0.4%, from about 0.05% to about 0.38%, from about 0.05% to about 0.36%, from about 0.05% to about 0.34%, from about 0.05% to about 0.32%, from about 0.05% to about 0.3%, from about 0.05% to about 0.28%, from about 0.05% to about 0.26%, from about 0.05% to about 0.24%, from about 0.05% to about 0.22%, from about 0.05% to about 0.2%, from about 0.06% to about 0.2%, from about 0.07% to about 0.2%, from about 0.06% to about 0.25% or from about 0.07% to about 0.3%.

In some embodiments, the molar ratio of the polyoxyalkylene-based anionic reactive emulsifier to the structural unit (c) in the copolymer is less than 0.8%, less than 0.75%, less than 0.7%, less than 0.65%, less than 0.6%, less than 0.55%, less than 0.5%, less than 0.45%, less than 0.4%, less than 0.38%, less than 0.36%, less than 0.34%, less than 0.32%, less than 0.3%, less than 0.28%, less than 0.26%, less than 0.24%, less than 0.22%, less than 0.2%, less than 0.18%, less than 0.16%, less than 0.14%, less than 0.12%, less than 0.1%, less than 0.08% or less than 0.06%. In some embodiments, the molar ratio of the polyoxyalkylene-based anionic reactive emulsifier to the structural unit (c) in the copolymer is more than 0.05%, more than 0.07%, more than 0.1%, more than 0.12%, more than 0.14%, more than 0.16%, more than 0.18%, more than 0.2%, more than 0.22%, more than 0.24%, more than 0.26%, more than 0.28%, more than 0.3%, more than 0.35%, more than 0.4%, more than 0.45%, more than 0.5%, more than 0.55%, more than 0.6%, more than 0.65%, more than 0.7% or more than 0.75%.

In some embodiments, the molar ratio of the non-polyoxyalkylene-based anionic reactive emulsifier to the structural unit (c) in the copolymer is from about 0.4% to about 4%, from about 0.4% to about 3.95%, from about 0.4% to about 3.9%, from about 0.4% to about 3.85%, from about 0.4% to about 3.8%, from about 0.4% to about 3.75%, from about 0.4% to about 3.7%, from about 0.45% to about 3.7%, from about 0.5% to about 3.7%, from about 0.4% to about 3.6%, from about 0.4% to about 3.5%, from about 0.4% to about 3.4%, from about 0.4% to about 3.3%, from about 0.4% to about 3.2%, from about 0.4% to about 3.1%, from about 0.4% to about 3%, from about 0.4% to about 2.9%, from about 0.4% to about 2.8%, from about 0.4% to about 2.7%, from about 0.4% to about 2.6% or from about 0.4% to about 2.5%.

In some embodiments, the molar ratio of the non-polyoxyalkylene-based anionic reactive emulsifier to the structural unit (c) in the copolymer is less than 4%, less than 3.8%, less than 3.6%, less than 3.4%, less than 3.2%, less than 3%, less than 2.8%, less than 2.6%, less than 2.4%, less than 2.2%, less than 2%, less than 1.8%, less than 1.6%, less than 1.4%, less than 1.2%, less than 1%, less than 0.8% or less than 0.6%. In some embodiments, the molar ratio of the non-polyoxyalkylene-based anionic reactive emulsifier to the structural unit (c) in the copolymer is more than 0.4%, more than 0.6%, more than 0.8%, more than 1%, more than 1.2%, more than 1.4%, more than 1.6%, more than 1.8%, more than 2%, more than 2.2%, more than 2.4%, more than 2.6%, more than 2.8%, more than 3%, more than 3.2%, more than 3.4%, more than 3.6% or more than 3.8%.

In some embodiments, structural unit (a), structural unit (b) and structural unit (d) constitute as the hydrophilic portion of the copolymer. In some embodiments, structural unit (c) constitutes as the hydrophobic portion of the copolymer.

In some embodiments, the molar ratio of the sum of structural unit (a), structural unit (b) and structural unit (d) to structural unit (c) in the copolymer is from about 0.1 to about 1, from about 0.12 to about 1, from about 0.14 to about 1, from about 0.16 to about 1, from about 0.18 to about 1, from about 0.2 to about 1, from about 0.22 to about 1, from about 0.24 to about 1, from about 0.26 to about 1, from about 0.28 to about 1, from about 0.3 to about 1, from about 0.32 to about 1, from about 0.34 to about 1, from about 0.36 to about 1, from about 0.38 to about 1, from about 0.4 to about 1, from about 0.4 to about 0.98, from about 0.4 to about 0.96, from about 0.4 to about 0.94, from about 0.4 to about 0.92, from about 0.4 to about 0.9, from about 0.4 to about 0.88, from about 0.4 to about 0.86, from about 0.4 to about 0.84, from about 0.4 to about 0.82, from about 0.4 to about 0.8, from about 0.3 to about 0.8 or from about 0.3 to about 0.9.

In some embodiments, the molar ratio of the sum of structural unit (a), structural unit (b) and structural unit (d) to structural unit (c) in the copolymer is less than 1, less than 0.9, less than 0.8, less than 0.7, less than 0.6, less than 0.5, less than 0.4, less than 0.3 or less than 0.2. In some embodiments, the molar ratio of the sum of structural unit (a), structural unit (b) and structural unit (d) to structural unit (c) in the copolymer is more than 0.1, more than 0.2, more than 0.3, more than 0.4, more than 0.5, more than 0.6, more than 0.7, more than 0.8 or more than 0.9.

Addition of ethylenically unsaturated ester monomer that does not contain one or more hydroxyl groups in the preparation of the binder composition disclosed herein is found to result in a deterioration in electrochemical performance. Any ester monomer that has one or more ethylenically unsaturated bond and does not contain any hydroxyl groups may be used as the non-hydroxyl group-containing ethylenically unsaturated ester monomer. In some embodiments, the binder composition is free of structural unit derived from a non-hydroxyl group-containing ethylenically unsaturated ester monomer.

Examples of non-hydroxyl group-containing ethylenically unsaturated ester monomer include $C_1$ to $C_{20}$ alkyl acrylates such as methyl acrylate, ethyl acrylate, n-propyl acrylate, isopropyl acrylate, n-butyl acrylate, sec-butyl acrylate, tert-butyl acrylate, pentyl acrylate, hexyl acrylate, heptyl acrylate, octyl acrylate, 3,3,5-trimethylhexyl acrylate, 2-ethylhexyl acrylate, nonyl acrylate, decyl acrylate, lauryl acrylate, n-tetradecyl acrylate, octadecyl acrylate, stearyl acrylate, isobornyl acrylate, etc.; cyclo alkyl acrylates such as cyclohexyl acrylate, 3,3,5-trimethylcyclohexylacrylate, 2-methylcyclohexyl acrylate, 4-cyclohexylcyclohexyl acrylate, etc.; allyl acrylates such as 2-methylallyl acrylate, 2-butenyl acrylate, 3,7-dimethyl-2,6-octadienyl acrylate, etc.; aryl acrylates such as benzyl acrylate, phenyl acrylate, etc.; nitro alkyl acrylates such as 2-nitroethyl acrylate, 2-nitropropyl acrylate, 2-nitrobutyl acrylate, 2-methyl-2-nitropropyl acrylate, 2,2-dinitropropyl acrylate, etc.; amino alkyl acrylates such as 2-(dimethylamino)ethyl acrylate, 2-(diethylamino)ethyl acrylate, 2-(dibutylamino)ethyl acrylate, 2-N-morpholinoethyl acrylate, etc.; halogenated alkyl acrylates such as 2-bromoethyl acrylate, 2-chloroethyl acrylate, 3-bromopropyl acrylate, 2,3-dibromopropyl acrylate, 1-bromoisopropyl acrylate, 3-chloropropyl acrylate, 1,3-dichloroisopropyl acrylate, perfluorooctyl acrylate, etc.; ether acrylates such as methoxymethyl acrylate, ethoxymethyl acrylate, 2-methoxyethyl acrylate, 2-ethoxyethyl acrylate, 2-isopropoxyethyl acrylate, 2-butoxyethyl acrylate, 2-(2-ethylhexoxy)ethyl acrylate, 2-phenoxyethyl acrylate, 2-benzyloxyethyl acrylate, 2-(2-methoxyethoxy)ethyl acrylate, 2-(2-ethoxyethoxy)-ethyl acrylate, 2-(2-phenoxyethoxy)ethyl acrylate, etc.; glycol diacrylates such as ethylene glycol diacrylate, propylene glycol diacrylate, 1,3-propanediol diacrylate, 1,4-butanediol diacrylate, diethylene glycol diacrylate, triethylene glycol diacrylate, dipropylene glycol diacrylate, 2,5-hexanediol diacrylate, 2,2-diethyl-1,3-propanediol diacrylate, etc.; $C_1$ to $C_{20}$ alkyl methacrylates such as methyl methacrylate, ethyl methacrylate, n-propyl methacrylate, isopropyl methacrylate, n-butyl methacrylate, sec-butyl methacrylate, tert-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, isobornyl methacrylate, etc.; cyclo alkyl methacrylates such as cyclohexyl methacrylate, 1-methylcyclohexyl methacrylate, 3,3,5-trimethylcyclohexyl methacrylate, etc.; allyl methacrylates such as 2-methylallyl methacrylate, 2-methyl-2-butenyl methacrylate, oleyl methacrylate, etc.; aryl methacrylates such as phenyl methacrylate, benzyl methacrylate, etc.; nitro alkyl methacrylates such as 2-nitroethyl methacrylate, 2-methyl-2-nitropropyl methacrylate, 2-nitrobutyl methacrylate, 2,2-dinitropropyl methacrylate, etc.; amino alkyl methacrylates such as 2-(dimethylamino)ethyl methacrylate, 2-(diethylamino)ethyl methacrylate, 3-(dimethylamino)propyl methacrylate, tert-butylaminoethyl methacrylate, 2-(dibutylamino)ethyl methacrylate, 2-N-morpholinoethyl methacrylate, etc.; halogenated alkyl methacrylates such as chloromethyl methacrylate, 2-chloroethyl methacrylate, 3-chloropropyl methacrylate, 4-bromophenyl methacrylate, 2-bromoethyl methacrylate, 2,3-dibromopropyl methacrylate, 1,1,1,3,3,3-hexafluoroisopropyl methacrylate, 2,2,2-trifluoroethyl methacrylate, perfluorooctyl methacrylate, 2-iodoethyl methacrylate, etc.; ether methacrylates such as methoxymethyl methacrylate, ethoxymethyl methacrylate, 2-(2-methoxyethoxy)ethyl methacrylate, benzyloxymethyl methacrylate, 1-ethoxyethyl methacrylate, etc.; epoxy alkyl methacrylates such as 2,3-epoxybutyl methacrylate, etc,; cyano alkyl methacrylates such as cyanomethyl methacrylate, 2-cyanoethyl methacrylate, 4-thiocyanatobutyl methacrylate, etc.; and glycol dimethacrylates such as 1,2-propanediol dimethacrylate, 1,3-butanediol dimethacrylate, 1,4-butanediol dimethacrylate, 1,6-hexanediol dimethacrylate, etc.

In some embodiments, the binder composition is free of structural unit derived from a conjugated diene group-containing monomer. Examples of conjugated diene group-containing monomer include aliphatic conjugated diene monomers such as 1,3-butadiene, 2-methyl-1,3-butadiene, 2,3-dimethyl-1,3-butadiene, 2-chloro-1,3-butadiene, substituted linear conjugated pentadienes, and substituted side chain conjugated hexadienes.

In some embodiments, the binder composition is free of structural unit derived from an aromatic vinyl group-containing monomer. Examples of aromatic vinyl group-containing monomer include styrene, α-methylstyrene, vinyltoluene, and divinylbenzene.

In some embodiments, the pH of the binder composition is from about 7 to about 9, from about 7 to about 8.9, from about 7 to about 8.8, from about 7 to about 8.7, from about 7 to about 8.6, from about 7 to about 8.5, from about 7 to about 8.4, from about 7 to about 8.3, from about 7 to about 8.2, from about 7 to about 8.1, from about 7 to about 8, from about 7.1 to about 9, from about 7.2 to about 9, from about 7.3 to about 9, from about 7.4 to about 9, from about 7.5 to about 9, from about 7.6 to about 9, from about 7.7 to about 9, from about 7.8 to about 9, from about 7.9 to about 9 or from about 8 to about 9. In certain embodiments, the pH of the binder composition is less than 9, less than 8.9, less than 8.8, less than 8.7, less than 8.6, less than 8.5, less than 8.4, less than 8.3, less than 8.2, less than 8.1, less than 8, less than 7.9, less than 7.8, less than 7.7, less than 7.6, less than 7.5, less than 7.4, less than 7.3 or less than 7.2. In certain embodiments, the pH of the binder composition is more than 7, more than 7.1, more than 7.2, more than 7.3, more than 7.4, more than 7.5, more than 7.6, more than 7.7, more than 7.8, more than 7.9, more than 8, more than 8.1, more than 8.2, more than 8.3, more than 8.4, more than 8.5, more than 8.6, more than 8.7 or more than 8.8.

In some embodiments, the viscosity of the binder composition is from about 10,000 mPa·s to about 35,000 mPa·s, from about 10,000 mPa·s to about 34,000 mPa·s, from about 10,000 mPa·s to about 33,000 mPa·s, from about 10,000 mPa·s to about 32,000 mPa·s, from about 10,000 mPa·s to about 31,000 mPa·s, from about 10,000 mPa·s to about 30,000 mPa·s, from about 10,000 mPa·s to about 29,000 mPa·s, from about 10,000 mPa·s to about 28,000 mPa·s, from about 10,000 mPa·s to about 27,000 mPa·s, from about 10,000 mPa·s to about 26,000 mPa·s, from about 10,000 mPa·s to about 25,000 mPa·s, from about 10,000 mPa·s to about 24,000 mPa·s, from about 10,000 mPa·s to about 23,000 mPa·s, from about 10,000 mPa·s to about 22,000 mPa·s, from about 10,000 mPa·s to about 21,000 mPa·s, from about 10,000 mPa·s to about 20,000 mPa·s, from about 12,500 mPa·s to about 22,500 mPa·s, from about 15,000 mPa·s to about 25,000 mPa·s, from about 17,500 mPa·s to about 27,500 mPa·s, from about 20,000 mPa·s to about 30,000 mPa·s, from about 22,500 mPa·s to about 32,500 mPa·s or from about 25,000 mPa·s to about 35,000 mPa·s.

In some embodiments, the viscosity of the binder composition is less than 35,000 mPa·s, less than 34,000 mPa·s, less than 33,000 mPa·s, less than 32,000 mPa·s, less than 31,000 mPa·s, less than 30,000 mPa·s, less than 29,000 mPa·s, less than 28,000 mPa·s, less than 27,000 mPa·s, less than 26,000 mPa·s, less than 25,000 mPa·s, less than 24,000 mPa·s, less than 23,000 mPa·s, less than 22,000 mPa·s, less than 21,000 mPa·s, less than 20,000 mPa·s, less than 19,000 mPa·s, less than 18,000 mPa·s, less than 17,000 mPa·s, less than 16,000 mPa·s, less than 15,000 mPa·s, less than 14,000 mPa·s, less than 13,000 mPa·s, less than 12,000 mPa·s or less than 11,000 mPa·s. In some embodiments, the viscosity of the binder composition is more than 10,000 mPa·s, more than 11,000 mPa·s, more than 12,000 mPa·s, more than 13,000 mPa·s, more than 14,000 mPa·s, more than 15,000 mPa·s, more than 16,000 mPa·s, more than 17,000 mPa·s, more than 18,000 mPa·s, more than 19,000 mPa·s, more than 20,000 mPa·s, more than 21,000 mPa·s, more than 22,000 mPa·s, more than 23,000 mPa·s, more than 24,000 mPa·s, more than 25,000 mPa·s, more than 26,000 mPa·s, more than 27,000 mPa·s, more than 28,000 mPa·s or more than 29,000 mPa·s.

In some embodiments, the solid content of the binder composition is from about 12% to about 18%, from about 12.2% to about 18%, from about 12.4% to about 18%, from about 12.6% to about 18%, from about 12.8% to about 18%, from about 13% to about 18%, from about 13% to about 17.8%, from about 13% to about 17.6%, from about 13% to about 17.4%, from about 13% to about 17.2%, from about 13% to about 17%, from about 13.1% to about 17%, from about 13.2% to about 17%, from about 13.3% to about 17%, from about 13.4% to about 17%, from about 13.5% to about 17%, from about 13.6% to about 17%, from about 13.7% to about 17%, from about 13.8% to about 17%, from about 13.9% to about 17%, from about 14% to about 16.9%, from about 14% to about 16.8%, from about 14% to about 16.7%, from about 14% to about 16.6%, from about 14% to about 16.5%, from about 14% to about 16.4%, from about 14% to about 16.3%, from about 14% to about 16.2%, from about 14% to about 16.1%, from about 14% to about 16% by weight, based on the total weight of the binder composition.

In some embodiments, the solid content of the binder composition is less than 18%, less than 17.8%, less than 17.6%, less than 17.4%, less than 17.2%, less than 17%, less than 16.8%, less than 16.6%, less than 16.4%, less than 16.2%, less than 16%, less than 15.8%, less than 15.6%, less than 15.4%, less than 15.2%, less than 15%, less than 14.8%, less than 14.6%, less than 14.4%, less than 14.2%, less than 14%, less than 13.8%, less than 13.6%, less than 13.4%, less than 13.2%, less than 13%, less than 12.8%, less than 12.6%, less than 12.4% or less than 12.2% by weight, based on the total weight of the binder composition. In some embodiments, the solid content of the binder composition is more than 12%, more than 12.2%, more than 12.4%, more than 12.6%, more than 12.8%, more than 13%, more than 13.2%, more than 13.4%, more than 13.6%, more than 13.8%, more than 14%, more than 14.2%, more than 14.4%, more than 14.6%, more than 14.8%, more than 15%, more than 15.2%, more than 15.4%, more than 15.6%, more than 15.8%, more than 16%, more than 16.2%, more than 16.4%, more than 16.6%, more than 16.8%, more than 17%, more than 17.2%, more than 17.4%, more than 17.6% or more than 17.8% by weight, based on the total weight of the binder composition.

In some embodiments, the weight average molecular weight of the binder composition is from about 150,000 g/mol to about 300,000 g/mol, from about 155,000 g/mol to about 300,000 g/mol, from about 160,000 g/mol to about 300,000 g/mol, from about 165,000 g/mol to about 300,000 g/mol, from about 170,000 g/mol to about 300,000 g/mol, from about 175,000 g/mol to about 300,000 g/mol, from about 180,000 g/mol to about 300,000 g/mol, from about 185,000 g/mol to about 300,000 g/mol, from about 190,000 g/mol to about 300,000 g/mol, from about 195,000 g/mol to about 300,000 g/mol, from about 200,000 g/mol to about 300,000 g/mol, from about 200,000 g/mol to about 295,000 g/mol, from about 200,000 g/mol to about 290,000 g/mol, from about 200,000 g/mol to about 285,000 g/mol, from about 200,000 g/mol to about 280,000 g/mol, from about 205,000 g/mol to about 280,000 g/mol, from about 210,000 g/mol to about 280,000 g/mol, from about 215,000 g/mol to about 280,000 g/mol, from about 220,000 g/mol to about 280,000 g/mol, from about 220,000 g/mol to about 275,000 g/mol, from about 220,000 g/mol to about 270,000 g/mol, from about 225,000 g/mol to about 270,000 g/mol or from about 230,000 g/mol to about 270,000 g/mol. When the weight average molecular weight of the binder composition is not more than the upper limit set forth above, a smooth binder composition layer can be obtained because coatability of the binder composition is ensured, and adhesive strength of the binder composition can be improved. On the other hand, when the weight average molecular weight of the binder composition is not less than the lower limit set forth above, binding capability of the binder composition can be ensured, and adhesive strength of the binder composition and secondary battery cycle characteristics can be improved.

In some embodiments, the weight average molecular weight of the binder composition is less than 300,000 g/mol, less than 290,000 g/mol, less than 280,000 g/mol, less than 270,000 g/mol, less than 260,000 g/mol, less than 250,000 g/mol, less than 240,000 g/mol, less than 230,000 g/mol, less than 220,000 g/mol, less than 210,000 g/mol, less than 200,000 g/mol, less than 190,000 g/mol, less than 180,000 g/mol, less than 170,000 g/mol or less than 160,000 g/mol. In some embodiments, the weight average molecular weight of the binder composition is more than 150,000 g/mol, more than 155,000 g/mol, more than 160,000 g/mol, more than 165,000 g/mol, more than 170,000 g/mol, more than 175,000 g/mol, more than 180,000 g/mol, more than 185,000 g/mol, more than 190,000 g/mol, more than 195,000 g/mol, more than 200,000 g/mol, more than 210,000 g/mol, more than 220,000 g/mol, more than 230,000 g/mol, more than 240,000 g/mol, more than 250,000 g/mol, more than 260, 000 g/mol, more than 270,000 g/mol, more than 280,000 g/mol or more than 290,000 g/mol.

In some embodiments, the number average molecular weight of the binder composition is from about 20,000 g/mol to about 150,000 g/mol, from about 25,000 g/mol to about 150,000 g/mol, from about 30,000 g/mol to about 150,000 g/mol, from about 35,000 g/mol to about 150,000 g/mol, from about 40,000 g/mol to about 150,000 g/mol, from about 45,000 g/mol to about 150,000 g/mol, from about 50,000 g/mol to about 150,000 g/mol, from about 55,000 g/mol to about 150,000 g/mol, from about 60,000 g/mol to about 150,000 g/mol, from about 60,000 g/mol to about 145,000 g/mol, from about 60,000 g/mol to about 140,000 g/mol, from about 60,000 g/mol to about 135,000 g/mol, from about 60,000 g/mol to about 130,000 g/mol, from about 60,000 g/mol to about 125,000 g/mol, from about 60,000 g/mol to about 120,000 g/mol, from about 65,000 g/mol to about 120,000 g/mol or from about 70,000 g/mol to about 120,000 g/mol.

In some embodiments, the number average molecular weight of the binder composition is less than 150,000 g/mol, less than 145,000 g/mol, less than 140,000 g/mol, less than 135,000 g/mol, less than 130,000 g/mol, less than 125,000 g/mol, less than 120,000 g/mol, less than 115,000 g/mol, less than 110,000 g/mol, less than 105,000 g/mol, less than 100,000 g/mol, less than 95,000 g/mol, less than 90,000 g/mol, less than 85,000 g/mol, less than 80,000 g/mol, less than 75,000 g/mol, less than 70,000 g/mol, less than 65,000 g/mol, less than 60,000 g/mol, less than 55,000 g/mol, less than 50,000 g/mol, less than 45,000 g/mol, less than 40,000 g/mol, less than 35,000 g/mol, less than 30,000 g/mol or less than 25,000 g/mol. In some embodiments, the number average molecular weight of the binder composition is more than 20,000 g/mol, more than 25,000 g/mol, more than 30,000 g/mol, more than 35,000 g/mol, more than 40,000 g/mol, more than 45,000 g/mol, more than 50,000 g/mol, more than 55,000 g/mol, more than 60,000 g/mol, more than 65,000 g/mol, more than 70,000 g/mol, more than 75,000 g/mol, more than 80,000 g/mol, more than 85,000 g/mol, more than 90,000 g/mol, more than 95,000 g/mol, more than 100,000 g/mol, more than 105,000 g/mol, more than 110, 000 g/mol, more than 115,000 g/mol, more than 120,000 g/mol, more than 125,000 g/mol, more than 130,000 g/mol, more than 135,000 g/mol, more than 140,000 g/mol or more than 145,000 g/mol.

In some embodiments, the polydispersity index (PDI) of the binder composition is from about 1 to about 5, from about 1 to about 4.8, from about 1 to about 4.6, from about 1 to about 4.4, from about 1 to about 4.2, from about 1 to about 4, from about 1 to about 3.8, from about 1 to about 3.6, from about 1 to about 3.4, from about 1 to about 3.2, from about 1 to about 3, from about 1.1 to about 3, from about 1.2 to about 3, from about 1.3 to about 3, from about 1.4 to about 3, from about 1.5 to about 3, from about 1.6 to about 3, from about 1.6 to about 2.8, from about 1.6 to about 2.6, from about 1.8 to about 2.6 or from about 1.8 to about 2.8. Stability of the binder composition can be further improved when the polydispersity index of the binder composition is within the range set forth above.

In some embodiments, the polydispersity index of the binder composition is less than 5, less than 4.8, less than 4.6, less than 4.4, less than 4.2, less than 4, less than 3.8, less than 3.6, less than 3.4, less than 3.2, less than 3, less than 2.8, less than 2.6, less than 2.4, less than 2.2, less than 2, less than 1.8, less than 1.6, less than 1.4 or less than 1.2. In some embodiments, the polydispersity index of the binder composition is more than 1, more than 1.2, more than 1.4, more than 1.6, more than 1.8, more than 2, more than 2.2, more than 2.4, more than 2.6, more than 2.8, more than 3, more than 3.2, more than 3.4, more than 3.6, more than 3.8, more than 4, more than 4.2, more than 4.4, more than 4.6 or more than 4.8.

In some embodiments, the average particle diameter of the binder composition is from about 10 μm to about 100 μm, from about 10 μm to about 95 μm, from about 10 μm to about 90 μm, from about 10 μm to about 85 μm, from about 10 μm to about 80 μm, from about 10 μm to about 75 μm, from about 10 μm to about 70 μm, from about 10 μm to about 65 μm, from about 10 μm to about 60 μm, from about 10 μm to about 55 μm, from about 10 μm to about 50 μm, from about 10 μm to about 48 μm, from about 10 μm to about 46 μm, from about 10 μm to about 44 μm, from about 10 μm to about 42 μm, from about 10 μm to about 40 μm, from about 12 μm to about 40 μm, from about 14 μm to about 40 μm, from about 16 μm to about 40 μm, from about 18 μm to about 40 μm, from about 20 μm to about 40 μm, from about 25 μm to about 35 μm, from about 15 μm to about 45 μm, from about 20 μm to about 35 μm or from about 25 μm to about 45 μm.

In some embodiments, the average particle diameter of the binder composition is less than 100 μm, less than 95 μm, less than 90 μm, less than 85 μm, less than 80 μm, less than 75 μm, less than 70 μm, less than 65 μm, less than 60 μm, less than 55 μm, less than 50 μm, less than 48 μm, less than 46 μm, less than 44 μm, less than 42 μm, less than 40 μm, less than 38 μm, less than 36 μm, less than 34 μm, less than 32 μm, less than 30 μm, less than 28 μm, less than 26 μm, less than 24 μm, less than 22 μm, less than 20 μm, less than 18 μm, less than 16 μm, less than 14 μm or less than 12 μm. In some embodiments, the average particle diameter of the binder composition is more than 10 μm, more than 12 μm, more than 14 μm, more than 16 μm, more than 18 μm, more than 20 μm, more than 22 μm, more than 24 μm, more than 26 μm, more than 28 μm, more than 30 μm, more than 32 μm, more than 34 μm, more than 36 μm, more than 38 μm, more than 40 μm, more than 42 μm, more than 44 μm, more than 46 μm, more than 48 μm, more than 50 μm, more than 55 μm, more than 60 μm, more than 65 μm, more than 70 μm, more than 75 μm, more than 80 μm, more than 85 μm, more than 90 μm or more than 95 μm.

In some embodiments, the D50 of the binder composition is from about 1 μm to about 250 μm, from about 1 μm to about 240 μm, from about 1 μm to about 230 μm, from about 1 μm to about 220 μm, from about 1 μm to about 210 μm, from about 1 μm to about 200 μm, from about 1 μm to about 190 μm, from about 1 μm to about 180 μm, from about 1 μm to about 170 μm, from about 1 μm to about 160 μm, from about 1 μm to about 150 μm, from about 1 μm to about 140 μm, from about 1 μm to about 130 μm, from about 1 μm to about 120 μm, from about 1 μm to about 110 μm, from about 1 μm to about 100 μm, from about 1 μm to about 90 μm, from about 1 μm to about 80 μm, from about 1 μm to about 70 μm, from about 1 μm to about 60 μm, from about 1 μm to about 50 μm, from about 2 μm to about 50 μm, from about 4 μm to about 50 μm, from about 6 μm to about 50 μm, from about 8 μm to about 50 μm or from about 10 μm to about 50 μm.

In some embodiments, the D50 of the binder composition is less than 250 μm, less than 225 μm, less than 200 μm, less than 175 μm, less than 150 μm, less than 125 μm, less than 100 μm, less than 75 μm, less than 50 μm, less than 45 μm, less than 40 μm, less than 35 μm, less than 30 μm, less than 25 μm, less than 20 μm, less than 15 μm, less than 10 μm or less than 5 μm. In some embodiments, the D50 of the binder composition is more than 1 μm, more than 5 μm, more than 10 μm, more than 15 μm, more than 20 μm, more than 25 μm, more than 30 μm, more than 35 μm, more than 40 μm, more than 45 μm, more than 50 μm, more than 75 μm, more than 100 μm, more than 125 μm, more than 150 μm, more than 175 μm, more than 200 μm or more than 225 μm.

In some embodiments, the D10 of the binder composition is from about 0.1 μm to about 20 μm, from about 0.5 μm to about 20 μm, from about 1 μm to about 20 μm, from about 2 μm to about 20 μm, from about 3 μm to about 20 μm, from about 4 μm to about 20 μm, from about 5 μm to about 20 μm, from about 5 μm to about 19 μm, from about 5 μm to about 18 μm, from about 5 μm to about 17 μm, from about 5 μm to about 16 μm, from about 5 μm to about 15 μm, from about 6 μm to about 15 μm, from about 7 μm to about 15 μm, from about 5 μm to about 14 μm, from about 5 μm to about 13 μm, from about 7 μm to about 14 μm or from about 6 μm to about 13 μm.

In some embodiments, the D10 of the binder composition is less than 20 μm, less than 19 μm, less than 18 μm, less than 17 μm, less than 16 μm, less than 15 μm, less than 14 μm, less than 13 μm, less than 12 μm, less than 11 μm, less than 10 μm, less than 9 μm, less than 8 μm, less than 7 μm, less than 6 μm, less than 5 μm, less than 4 μm, less than 3 μm, less than 2 μm, less than 1 μm or less than 0.5 μm. In some embodiments, the D10 of the binder composition is more than 0.1 μm, more than 0.5 μm, more than 1 μm, more than 2 μm, more than 3 μm, more than 4 μm, more than 5 μm, more than 6 μm, more than 7 μm, more than 8 μm, more than 9 μm, more than 10 μm, more than 11 μm, more than 12 μm, more than 13 μm, more than 14 μm, more than 15 μm, more than 16 μm, more than 17 μm, more than 18 μm or more than 19 μm.

In some embodiments, the D90 of the binder composition is from about 10 μm to about 450 μm, from about 10 μm to about 425 μm, from about 10 μm to about 400 μm, from about 10 μm to about 375 μm, from about 10 μm to about 350 μm, from about 10 μm to about 325 μm, from about 10 μm to about 300 μm, from about 10 μm to about 275 μm, from about 10 μm to about 250 μm, from about 10 μm to about 225 μm, from about 10 μm to about 200 μm, from about 20 μm to about 200 μm, from about 30 μm to about 200 μm, from about 40 μm to about 200 μm, from about 50 μm to about 200 μm, from about 60 μm to about 200 μm, from about 70 μm to about 200 μm, from about 80 μm to about 200 μm, from about 90 μm to about 200 μm, from about 100 μm to about 200 μm, from about 100 μm to about 190 μm, from about 100 μm to about 180 μm, from about 110 μm to about 180 μm, from about 120 μm to about 180 μm, from about 120 μm to about 170 μm, from about 120 μm to about 160 μm, from about 130 μm to about 160 μm or from about 140 μm to about 160 μm.

In some embodiments, the D90 of the binder composition is less than 450 μm, less than 425 μm, less than 400 μm, less than 375 μm, less than 350 μm, less than 325 μm, less than 300 μm, less than 275 μm, less than 250 μm, less than 225 μm, less than 200 μm, less than 180 μm, less than 160 μm, less than 140 μm, less than 120 μm, less than 100 μm, less than 80 μm, less than 60 μm, less than 40 μm or less than 20 μm. In some embodiments, the D90 of the binder composition is more than 10 μm, more than 20 μm, more than 40 μm, more than 60 μm, more than 80 μm, more than 100 μm, more than 125 μm, more than 150 μm, more than 175 μm, more than 200 μm, more than 225 μm, more than 250 μm, more than 275 μm, more than 300 μm, more than 325 μm, more than 350 μm, more than 375 μm, more than 400 μm or more than 425 μm.

In certain embodiments, each of the third suspension and the binder composition is independently free of a self-crosslinking monomer.

The binder composition of the present invention exhibits strong adhesion to the current collector. It is important for the binder composition to have good adhesive strength to the current collector as it promotes the binding force of the electrode layer to the current collector in the making of battery electrode, prevents separation and enhances the mechanical stability of the electrode. In some embodiments, the adhesive strength between the binder composition and the current collector is from about 4 N/cm to about 6 N/cm, from about 4 N/cm to about 5.9 N/cm, from about 4 N/cm to about 5.8 N/cm, from about 4 N/cm to about 5.7 N/cm, from about 4 N/cm to about 5.6 N/cm, from about 4 N/cm to about 5.5 N/cm, from about 4 N/cm to about 5.4 N/cm, from about 4 N/cm to about 5.3 N/cm, from about 4 N/cm to about 5.2 N/cm, from about 4 N/cm to about 5.1 N/cm, from about 4 N/cm to about 5 N/cm, from about 4 N/cm to about 4.9 N/cm, from about 4 N/cm to about 4.8 N/cm, from about 4 N/cm to about 4.7 N/cm, from about 4 N/cm to about 4.6 N/cm, from about 4 N/cm to about 4.5 N/cm, from about 4.1 N/cm to about 6 N/cm, from about 4.2 N/cm to about 6 N/cm, from about 4.3 N/cm to about 6 N/cm, from about 4.4 N/cm to about 6 N/cm, from about 4.5 N/cm to about 6 N/cm, from about 4.6 N/cm to about 6 N/cm, from about 4.7 N/cm to about 6 N/cm, from about 4.8 N/cm to about 6 N/cm, from about 4.9 N/cm to about 6 N/cm, from about 5 N/cm to about 6 N/cm, from about 4.5 N/cm to about 5.5 N/cm, from about 4.7 N/cm to about 5.2 N/cm.

In some embodiments, the adhesive strength between the binder composition and the current collector is less than 6 N/cm, less than 5.9 N/cm, less than 5.8 N/cm, less than 5.7 N/cm, less than 5.6 N/cm, less than 5.5 N/cm, less than 5.4 N/cm, less than 5.3 N/cm, less than 5.2 N/cm, less than 5.1 N/cm, less than 5 N/cm, less than 4.9 N/cm, less than 4.8 N/cm, less than 4.7 N/cm, less than 4.6 N/cm, less than 4.5 N/cm, less than 4.4 N/cm, less than 4.3 N/cm, less than 4.2 N/cm or less than 4.1 N/cm. In some embodiments, the adhesive strength between the binder composition and the current collector is more than 4 N/cm, more than 4.1 N/cm, more than 4.2 N/cm, more than 4.3 N/cm, more than 4.4 N/cm, more than 4.5 N/cm, more than 4.6 N/cm, more than 4.7 N/cm, more than 4.8 N/cm, more than 4.9 N/cm, more than 5 N/cm, more than 5.1 N/cm, more than 5.2 N/cm, more than 5.3 N/cm, more than 5.4 N/cm, more than 5.5 N/cm, more than 5.6 N/cm, more than 5.7 N/cm, more than 5.8 N/cm or more than 5.9 N/cm.

In another aspect, provided herein is an electrode for a secondary battery, comprising an electrode active material, a current collector and the binder composition prepared by the method described above. In other embodiments, the electrode further comprises a conductive agent.

In some embodiments, the electrode active material is a cathode active material, wherein the cathode active material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $Li_2MnO_3$, $LiFeO_2$, $LiFePO_4$, and combinations thereof, wherein each x is independently from 0.2 to 0.9; each y is independently from 0.1 to 0.45; and each z is independently from 0 to 0.2. In certain embodiments, the cathode active material is selected from the group consisting of $LiCoO_2$, $LiNiO_2$, $LiNi_xMn_yO_2$, $Li_{1+z}Ni_xMn_yCo_{1-x-y}O_2$ (NMC), $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.4 to 0.6; each y is independently from 0.2 to 0.4; and each z is independently from 0 to 0.1. In other embodiments, the cathode active material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$. In further embodiments, the cathode active material is not $LiNi_xMn_yO_2$, $Li_{1+z}Ni_xMn_yCo_{1-x-y}O_2$, or $LiNi_xCo_yAl_zO_2$, wherein each x is independently from 0.2 to 0.9; each y is independently from 0.1 to 0.45; and each z is independently from 0 to 0.2. In certain embodiments, the cathode active material is $Li_{1+x}Ni_aMn_bCo_cAl_{(1-a-b-c)}O_2$; wherein $-0.2≤x≤0.2$, $0≤a<1$, $0≤b<1$, $0≤c<1$, and $a+b+c≤1$. In some embodiments, the cathode active material has the general formula $Li_{1+x}Ni_aMn_bCo_cAl_{(1-a-b-c)}O_2$, with $0.33≤a≤0.92$, $0.33≤a≤0.9$, $0.33≤a≤0.8$, $0.5≤a≤0.92$, $0.5≤a≤0.9$, $0.5≤a≤0.8$, $0.6≤a≤0.92$, or $0.6≤a≤0.9$; $0≤b≤0.5$, $0≤b≤0.3$, $0.1≤b≤0.5$, $0.1≤b≤0.4$, $0.1≤b≤0.3$, $0.1≤b≤0.2$, or $0.2≤b≤0.5$; $0≤c≤0.5$, $0≤c≤0.3$, $0.1≤c≤0.5$, $0.1≤c≤0.4$, $0.1≤c≤0.3$, $0.1≤c≤0.2$, or $0.2≤c≤0.5$.

In certain embodiments, the cathode active material is doped with a dopant selected from the group consisting of Fe, Ni, Mn, Al, Mg, Zn, Ti, La, Ce, Sn, Zr, Ru, Si, Ge, and combinations thereof. In some embodiments, the dopant is not Fe, Ni, Mn, Mg, Zn, Ti, La, Ce, Ru, Si, or Ge. In certain embodiments, the dopant is not Al, Sn, or Zr.

In some embodiments, the cathode active material is $LiNi_{0.33}Mn_{0.33}Co_{0.33}O_2$ (NMC333), $LiNi_{0.4}Mn_{0.4}Co_{0.2}O_2$, $LiNi_{0.5}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.8}Mn_{0.1}Co_{0.1}O_2$ (NMC811), $LiNi_{0.92}Mn_{0.04}Co_{0.04}O_2$, $LiNi_{0.8}Co_{0.15}Al_{0.05}O_2$ (NCA), $LiNiO_2$ (LNO), and combinations thereof.

In other embodiments, the cathode active material is not $LiCoO_2$, $LiNiO_2$, $LiMnO_2$, $LiMn_2O_4$, or $Li_2MnO_3$. In further embodiments, the cathode active material is not $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMn_2$ $O_2$, $LiMn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2≤x≤0.2$, $0≤a<1$, $0≤b<1$, $0≤c<1$, and $a+b+c≤1$. In other embodiments, the core and the shell each independently comprise two or more lithium transition metal oxides. In some embodiments, one of the core or shell comprises only one lithium transition metal oxide, while the other comprises two or more lithium transition metal oxides. The lithium transition metal oxide or oxides in the core and the shell may be the same, or they may be different or partially different. In some embodiments, the two or more lithium transition metal oxides are uniformly distributed over the core. In certain embodiments, the two or more lithium transition metal oxides are not uniformly distributed over the core. In some embodiments, the cathode active material is not a core-shell composite.

In some embodiments, each of the lithium transition metal oxides in the core and the shell is independently doped with a dopant selected from the group consisting of Fe, Ni, Mn, Al, Mg, Zn, Ti, La, Ce, Sn, Zr, Ru, Si, Ge, and combinations thereof. In certain embodiments, the core and the shell each independently comprise two or more doped lithium transition metal oxides. In some embodiments, the two or more doped lithium transition metal oxides are uniformly distributed over the core and/or the shell. In certain embodiments, the two or more doped lithium transition metal oxides are not uniformly distributed over the core and/or the shell.

In some embodiments, the cathode active material comprises or is a core-shell composite comprising a core comprising a lithium transition metal oxide and a shell comprising a transition metal oxide. In certain embodiments, the lithium transition metal oxide is selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2≤x≤0.2$, $0≤a<1$, $0≤b<1$, $0≤c<1$, and $a+b+c≤1$. In some embodiments, the transition metal oxide is selected from the group consisting of $Fe_2O_3$, $MnO_2$, $Al_2O_3$, MgO, ZnO, $TiO_2$, $La_2O_3$, $CeO_2$, $SnO_2$, $ZrO_2$, $RuO_2$, and combinations thereof. In certain embodiments, the shell comprises a lithium transition metal oxide and a transition metal oxide.

In some embodiments, the diameter of the core is from about 1 μm to about 15 μm, from about 3 μm to about 15 μm, from about 3 μm to about 10 μm, from about 5 μm to about 10 μm, from about 5 μm to about 45 μm, from about 5 μm to about 35 μm, from about 5 μm to about 25 μm, from about 10 μm to about 45 μm, from about 10 μm to about 40 μm, or from about 10 μm to about 35 μm, from about 10 μm to about 25 μm, from about 15 μm to about 45 μm, from about 15 μm to about 30 μm, from about 15 μm to about 25 μm, from about 20 μm to about 35 μm, or from about 20 μm to about 30 μm. In certain embodiments, the thickness of the shell is from about 1 μm to about 45 μm, from about 1 μm to about 35 μm, from about 1 μm to about 25 μm, from about 1 μm to about 15 μm, from about 1 μm to about 10 μm, from about 1 μm to about 5 μm, from about 3 μm to about 15 μm, from about 3 μm to about 10 inn, from about 5 μm to about 10 μm, from about 10 μm to about 35 μm, from about 10 μm to about 20 μm, from about 15 μm to about 30 μm, from about 15 μm to about 25 μm, or from about 20 μm to about 35 μm. In certain embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 95:5, 90:10, 80:20, 70:30, 60:40, 50:50, 40:60, or 30:70.

The current collector acts to collect electrons generated by electrochemical reactions of the cathode active material or to supply electrons required for the electrochemical reactions. In some embodiments, the current collector can be in the form of a foil, sheet or film. In certain embodiments, the current collector is stainless steel, titanium, nickel, aluminum, copper, or alloys thereof or electrically-conductive resin. In certain embodiments, the current collector has a two-layered structure comprising an outer layer and an inner layer, wherein the outer layer comprises a conductive material and the inner layer comprises an insulating material or another conductive material; for example, aluminum mounted with a conductive resin layer or a polymeric insulating material coated with an aluminum film. In some embodiments, the current collector has a three-layered structure comprising an outer layer, a middle layer and an inner layer, wherein the outer and inner layers comprise a conductive material and the middle layer comprises an insulating material or another conductive material; for example, a plastic substrate coated with a metal film on both sides. In certain embodiments, each of the outer layer, middle layer and inner layer is independently stainless steel, titanium, nickel, aluminum, copper, or alloys thereof or electrically-conductive resin. In some embodiments, the insulating material is a polymeric material selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly (vinyl ester), polyvinyl chloride, polyether, polyphenylene oxide, cellulose polymer and combinations thereof. In certain embodiments, the current collector has more than three layers. In some embodiments, the current collector is coated with a protective coating. In certain embodiments, the protective coating comprises a carbon-containing material. In some embodiments, the current collector is not coated with a protective coating.

The thickness of the current collector affects the volume it occupies within the battery, the amount of the electrode active material needed, and hence the capacity in the battery. In some embodiments, the current collector has a thickness from about 5 μm to about 30 μm. In certain embodiments, the current collector has a thickness from about 5 μm to about 20 μm, from about 5 μm to about 15 μm, from about 10 μm to about 30 μm, from about 10 μm to about 25 μm, or from about 10 μm to about 20 μm.

In some embodiments, the current collector has a thickness of less than 30 μm, less than 28 μm, less than 26 μm, less than 24 μm, less than 22 μm, less than 20 μm, less than 18 μm, less than 16 μm, less than 14 μm, less than 12 μm, less than 10 μm, less than 8 μm or less than 6 μm. In some embodiments, the current collector has a thickness of more than 5 μm, more than 7 μm, more than 10 μm, more than 12 μm, more than 14 μm, more than 16 μm, more than 18 μm, more than 20 μm, more than 22 μm, more than 24 μm, more than 26 μm or more than 28 μm.

The conductive agent is for enhancing the electrically-conducting property of an electrode. Any suitable material can act as the conductive agent. In some embodiments, the conductive agent is a carbonaceous material. Some non-limiting examples include carbon, carbon black, graphite, expanded graphite, graphene, graphene nanoplatelets, carbon fibers, carbon nano-fibers, graphitized carbon flake, carbon tubes, activated carbon, Super P, 0-dimensional KS6, 1-dimensional vapor grown carbon fibers (VGCF), mesoporous carbon and combinations thereof.

In addition, the cathode prepared using the binder composition in the present invention exhibits strong adhesion of the electrode layer to the current collector. It is important for the electrode layer to have good peeling strength to the current collector as this prevents delamination or separation of the electrode, which would greatly influence the mechanical stability of the electrodes and the cyclability of the battery. Therefore, the electrodes should have sufficient peeling strength to withstand the rigors of battery manufacture.

In some embodiments, the peeling strength between the current collector and the electrode layer is in the range from about 1.0 N/cm to about 8.0 N/cm, from about 1.0 N/cm to about 6.0 N/cm, from about 1.0 N/cm to about 5.0 N/cm, from about 1.0 N/cm to about 4.0 N/cm, from about 1.0 N/cm to about 3.0 N/cm, from about 1.0 N/cm to about 2.5 N/cm, from about 1.0 N/cm to about 2.0 N/cm, from about 1.2 N/cm to about 3.0 N/cm, from about 1.2 N/cm to about 2.5 N/cm, from about 1.2 N/cm to about 2.0 N/cm, from about 1.5 N/cm to about 3.0 N/cm, from about 1.5 N/cm to about 2.5 N/cm, from about 1.5 N/cm to about 2.0 N/cm from about 1.8 N/cm to about 3.0 N/cm, from about 1.8 N/cm to about 2.5 N/cm, from about 2.0 N/cm to about 6.0 N/cm, from about 2.0 N/cm to about 5.0 N/cm, from about 2.0 N/cm to about 3.0 N/cm, from about 2.0 N/cm to about 2.5 N/cm, from about 2.2 N/cm to about 3.0 N/cm, from about 2.5 N/cm to about 3.0 N/cm, from about 3.0 N/cm to about 8.0 N/cm, from about 3.0 N/cm to about 6.0 N/cm, or from about 4.0 N/cm to about 6.0 N/cm. In some embodiments, the peeling strength between the current collector and the electrode layer is 1.0 N/cm or more, 1.2 N/cm or more, 1.5 N/cm or more, 2.0 N/cm or more, 2.2 N/cm or more, 2.5 N/cm or more, 3.0 N/cm or more, 3.5 N/cm or more, 4.5 N/cm or more, 5.0 N/cm or more, 5.5 N/cm or more, 6.0 N/cm or more, 6.5 N/cm or more, 7.0 N/cm or more or 7.5 N/cm or more. In some embodiments, the peeling strength between the current collector and the electrode layer is less than 8.0 N/cm, less than 7.5 N/cm, less than 7.0 N/cm, less than 6.5 N/cm, less than 6.0 N/cm, less than 5.5 N/cm, less than 5.0 N/cm, less than 4.5 N/cm, less than 4.0 N/cm, less than 3.5 N/cm, less than 3.0 N/cm, less than 2.8 N/cm, less than 2.5 N/cm, less than 2.2 N/cm, less than 2.0 N/cm, less than 1.8 N/cm, or less than 1.5 N/cm.

The extent of swelling of the binder composition from an uptake of electrolyte in the secondary battery provides insight into the crystallinity of the binder composition and how the binder composition interacts with the electrolyte. On one hand, a binder composition of high crystallinity exhibits low swelling behavior that can act as barriers for solvent ingress, provides shorter ion transport pathways, thus reduces internal resistance and more importantly alter the mechanical properties of the swollen polymer, which are critical to stable battery performance. On the other hand, a binder composition of low crystallinity has a higher amount of amorphous regions where higher amounts of electrolyte can penetrate into the binder composition to ensure good ion transport. A semi-crystalline binder composition disclosed herein benefits from both influence factors and therefore demonstrates exceptional electrochemical performance.

In some embodiments, the electrolyte swelling of the binder composition is from about 5% to about 8%, from about 5% to about 7.9%, from about 5% to about 7.8%, from about 5% to about 7.7%, from about 5% to about 7.6%, from about 5% to about 7.5%, from about 5% to about 7.4%, from about 5% to about 7.3%, from about 5% to about 7.2%, from about 5% to about 7.1%, from about 5% to about 7%, from about 5% to about 6.9%, from about 5% to about 6.8%, from about 5% to about 6.7%, from about 5% to about 6.6%, from about 5% to about 6.5%, from about 5% to about 6.4%, from about 5% to about 6.3%, from about 5% to about 6.2%, from about 5% to about 6.1%, from about 5% to about 6%, from about 5.5% to about 6.5%, from about 6% to about 7%, from about 6.5% to about 7.5%, from about 6% to about 8%, from about 6.1% to about 8%, from about 6.2% to about 8%, from about 6.3% to about 8%, from about 6.4% to about 8%, from about 6.5% to about 8%, from about 6.6% to about 8%, from about 6.7% to about 8%, from about 6.8% to about 8%, from about 6.9% to about 8% or from about 7% to about 8%.

In some embodiments, the electrolyte swelling of the binder composition is less than 8%, less than 7.9%, less than 7.8%, less than 7.7%, less than 7.6%, less than 7.5%, less than 7.4%, less than 7.3%, less than 7.2%, less than 7.1%, less than 7%, less than 6.9%, less than 6.8%, less than 6.7%, less than 6.6%, less than 6.5%, less than 6.4%, less than 6.3%, less than 6.2%, less than 6.1%, less than 6%, less than 5.9%, less than 5.8%, less than 5.7%, less than 5.6%, less than 5.5%, less than 5.4%, less than 5.3%, less than 5.2% or less than 5.1%. In some embodiments, the electrolyte swelling of the binder composition is more than 5%, more than 5.1%, more than 5.2%, more than 5.3%, more than 5.4%, more than 5.5%, more than 5.6%, more than 5.7%, more than 5.8%, more than 5.9%, more than 6%, more than 6.1%, more than 6.2%, more than 6.3%, more than 6.4%, more than 6.5%, more than 6.6%, more than 6.7%, more than 6.8%, more than 6.9%, more than 7%, more than 7.1%, more than 7.2%, more than 7.3%, more than 7.4%, more than 7.5%, more than 7.6%, more than 7.7%, more than 7.8% or more than 7.9%.

The method disclosed herein has the advantage that aqueous solvents can be used in the manufacturing process, which can save on processing time and equipment, as well as improve safety by eliminating the need to handle or recycle hazardous organic solvents. In addition, costs are reduced by simplifying the overall process. Therefore, this method is especially suited for industrial processes because of its low cost and ease of handling.

As described above, the water-based binder composition disclosed in the present invention exhibits improved adhesion capability. Batteries comprising the binder composition disclosed herein achieve exceptional electrochemical performance such as high cycle stability and capacity.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The pH values of the binder composition were measured by an electrode-type pH meter (ION 2700, Eutech Instruments).

The viscosity of the binder composition was measured at 25° C. using a rotational viscosity meter (NDJ-5S, Shanghai JT Electronic Technology Co. Ltd., China).

The adhesive strengths of the dried binder composition layers were measured by a tensile testing machine (DZ-106A, obtained from Dongguan Zonhow Test Equipment Co. Ltd., China). This test measures the average force required to peel a binder composition layer from the current collector at 180° angle in Newtons. The mean roughness depth ($R_z$) of the current collector is 2 μm. The binder composition was coated on the current collector and dried to obtain a binder composition layer of thickness 10 μm to 12 μm. The coated current collector was then placed in an environment of constant temperature of 25° C. and humidity of 50% to 60% for 30 minutes. A strip of adhesion tape (3M; US; model no. 810) with a width of 18 mm and a length of 20 mm was attached onto the surface of the binder composition layer. The binder composition strip was clipped onto the testing machine and the tape was folded back on itself at 180 degrees, and placed in a moveable jaw and pulled at room temperature and a peel rate of 300 mm per minute. The maximum stripping force measured was taken as the adhesive strength. Measurements were repeated three times to find the average value.

The electrolyte swelling of the binder composition measures the extent of mass change of binder composition before and after electrolyte soaking. Test samples of dried binder composition strips with a length of 50 mm to 60 mm and a width of 1 mm were prepared. The dried binder composition strips were further dried at 80° C. for 1 to 2 hours to completely remove the moisture in the strips. The weights of the dried binder composition strips were measured and the strips were placed in a sealed container with electrolyte after cooling. The binder composition strips were soaked in the electrolyte at 25° C. for 3 days. After removing the binder composition strips from the electrolyte-containing container, the electrolyte on the surface of the strips were absorbed with oil-absorbing papers. The weights of the soaked binder composition strips were measured. The electrolyte swelling is the ratio of the weight change of the strip after electrolyte soaking to the weight of the strip before electrolyte soaking. Measurements were repeated three times to find the average value.

The solid content of the binder composition measures the extent of mass change of binder composition before and after drying. Approximately 1 g of a binder composition was weighed in a weighing bottle and dried at 110±5° C. and −0.09 MPa for more than 5 hours by a vacuum dryer. The binder composition was cooled in a desiccator for about 15 minutes and then measured in terms of mass. The difference in mass of the binder composition before and after the drying was determined, and the solid content (%) of the binder composition was calculated according to the following formula:

$$\text{Solid content (\%)} = \frac{\text{Mass of binder composition after drying}}{\text{Mass of binder composition before drying}} \times 100\%$$

Example 1

A) Preparation of Pre-Emulsifying Solution 0.17 g of anionic reactive emulsifier (SR-10; obtained from Adeka Co., Ltd., Japan) was added into a 500 mL round-bottom flask containing 25 g of distilled water. The mixture was stirred at 200 rpm for 30 mins to obtain a first emulsion.

0.40 g of lithium hydroxide was dissolved in 20 g of DI water. Thereafter, 20.4 g of lithium hydroxide solution was added into the first emulsion. The mixture was further stirred at 200 rpm for 30 mins to obtain a second emulsion.

Further, 2.58 g of methacrylic acid (MAA) and 3.22 g of 2-hydroxyethyl acrylate (HEA) were added into the second emulsion. The mixture was further stirred at 1000 rpm for 15 mins to obtain a third emulsion. 10.30 g of acrylamide (AM) and 16.10 g of acrylonitrile (AN) were added into the third emulsion. Finally, the pre-emulsifying solution was obtained by stirring the mixture at 1200 rpm for 40 mins.

B) Preparation of Binder Composition 100 g of distilled water was added into a 500 mL round-bottom flask and heated up to 40° C. 2.33 g of the pre-emulsifying solution was added into the distilled water. The seed emulsion was obtained by stirring the mixture at 200 rpm for 30 mins. The seed emulsion was further heated to 72° C.

0.11 g of water-soluble free radical initiator (ammonium persulfate, APS; 55% solid content; obtained from Aladdin Industries Corporation, China) was dissolved in 5 g of DI water to form an APS solution and 0.04 g of reducing agent (sodium bisulfite; 55% solid content; obtained from Tianjin Damao Chemical Reagent Factory, China) was dissolved in 5 g of DI water to form a sodium bisulfite solution. 1.01 g of sodium bisulfite solution was added into the seed emulsion and the mixture was stirred for 10 minutes. 1.02 g of APS solution was then added into the mixture dropwise in 5 mins to form a first suspension.

The first suspension was further stirred for 30 mins before addition of the remaining pre-emulsifying solution, APS solution and sodium bisulfite solution. 4.03 g of sodium bisulfite solution was added into the first suspension and stirred for 15 minutes. 75.44 g of the remaining pre-emulsifying solution and 4.09 g of APS solution were then added dropwise to form a second suspension. The pre-emulsifying solution and the APS solution were added simultaneously for 4 h and 4.5 h respectively. The second suspension was further stirred at 200 rpm for 20 h at 80° C.

After the complete reaction, 0.80 g of lithium hydroxide (dissolved in 20 g of DI water) was added into the second suspension to adjust pH to 7.49. The binder composition was furnished by filtration using 200 mesh filter paper. The solid content of the binder composition was 15.41 wt. %. The components of the binder composition of Example 1 and their respective proportions are shown in Table 1 below. The pH, solid content, viscosity, adhesive strength and electrolyte swelling of the binder composition of Example 1 were measured and are shown in Table 2 below.

C) Preparation of Positive Electrode

A first mixture was prepared by dispersing 0.9 g of conductive agent (SuperP; obtained from Timcal Ltd, Bodio, Switzerland) and 6 g of binder composition (15.41 wt. % solid content) in 7.4 g of deionized water while stirring with an overhead stirrer (R20, IKA). After the addition, the first mixture was further stirred for about 30 minutes at 25° C. at a speed of 1,200 rpm.

Thereafter, a second mixture was prepared by adding 28.2 g of NMC622 (obtained from Shandong Tianjiao New Energy Co.,Ltd, China) in the first mixture at 25° C. while stirring with an overhead stirrer. Then, the second mixture was degassed under a pressure of about 10 kPa for 1 hour. Then, the second mixture was further stirred for about 60 minutes at 25° C. at a speed of 1,200 rpm to form a homogenized slurry.

The homogenized slurry was coated onto one side of an aluminum foil having a thickness of 14 μm as a current collector using a doctor blade coater. The coated slurry film on the aluminum foil was dried at about 85° C. for 120 minutes by a hot air dryer (DHG 10H, Huyue Equipment Co., Ltd., China) to form a cathode electrode layer. The electrode was then pressed to decrease the thickness of the cathode electrode layer to 27 μm and the surface density was 5.2 $mg/cm^2$.

D) Preparation of Negative Electrode

A negative electrode slurry was prepared by mixing 90 wt. % of hard carbon (BTR New Energy Materials Inc., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent in deionized water. The solid content of the anode slurry was 50 wt. %. The slurry was coated onto one side of a copper foil having a thickness of 8 μm using a doctor blade coater. The coated film on the copper foil was dried at about 85° C. for 120 minutes by a hot air dryer to obtain a negative electrode. The electrode was then pressed to decrease the thickness of the coating to 18 μm.

E) Assembling of Coin Cell

CR2032 coin-type Li cells were assembled in an argon-filled glove box. The coated cathode and anode sheets were cut into disc-form positive and negative electrodes, which were then assembled into an electrode assembly by stacking the cathode and anode electrode plates alternatively and then packaged in a case made of stainless steel of the CR2032 type. The cathode and anode electrode plates were kept apart by separators. The separator was a ceramic coated microporous membrane made of nonwoven fabric (MPM, Japan), which had a thickness of about 25 μm. The electrode assembly was then dried in a box-type resistance oven under vacuum (DZF-6020, obtained from Shenzhen Kejing Star Technology Co. Ltd., China) at 105° C. for about 16 hours.

An electrolyte was then injected into the case holding the packed electrodes under a high-purity argon atmosphere with a moisture and oxygen content of less than 3 ppm respectively. The electrolyte was a solution of $LiPF_6$ (1 M) in a mixture of ethylene carbonate (EC), ethyl methyl carbonate (EMC) and dimethyl carbonate (DMC) at a volume ratio of 1:1:1. After electrolyte filling, the coin cell was vacuum sealed and then mechanically pressed using a punch tooling with a standard circular shape.

F) Electrochemical Measurements

The coin cells were analyzed in a constant current mode using a multi-channel battery tester (BTS-4008-5V10mA, obtained from Neware Electronics Co. Ltd, China). After 1 cycle at C/20 was completed, they were charged and discharged at a rate of C/2. The charging/discharging cycling tests of the cells were performed between 3.0 and 4.3 V at a current density of C/2 at 25° C. to obtain the discharge capacity. The electrochemical performance of the coin cell of Example 1 was measured and is shown in Table 2 below.

Example 2

A binder composition was prepared in the same manner as in Example 1, except that 3.24 g of MAA and 3.06 of HEA were added in the preparation of the third emulsion and 11.33 g of AM and 14.57 g of AN were added in the preparation of the pre-emulsifying solution.

Example 3

A binder composition was prepared in the same manner as in Example 1, except that 1.62 g of MAA and 3.06 g of HEA were added in the preparation of the third emulsion, 8.10 g of AM and 19.42 g of AN were added in the preparation of the pre-emulsifying solution and 0.20 g of lithium hydroxide (dissolved in 20 g of DI water) was added in the preparation of the third suspension.

Example 4

A binder composition was prepared in the same manner as in Example 1, except that 4.85 g of MAA and 3.06 g of HEA were added in the preparation of the third emulsion, 8.10 g of AM and 16.19 g of AN were added in the preparation of the pre-emulsifying solution and 0.85 g of lithium hydroxide (dissolved in 20 g of DI water) was added in the preparation of the third suspension.

Example 5

A binder composition was prepared in the same manner as in Example 1, except that 1.62 g of MAA and 1.63 g of HEA were added in the preparation of the third emulsion, 12.94 g of AM and 16.01 g of AN were added in the preparation of the pre-emulsifying solution and 0.20 g of lithium hydroxide (dissolved in 20 g of DI water) was added in the preparation of the third suspension.

Example 6

A binder composition was prepared in the same manner as in Example 1, except that 3.24 g of MAA and 4.85 g of HEA were added in the preparation of the third emulsion and 9.54 g of AM and 14.57 g of AN were added in the preparation of the pre-emulsifying solution.

Example 7

A binder composition was prepared in the same manner as in Example 1, except that 0.34 g of SR-10 was added in the preparation of the first emulsion.

Example 8

A binder composition was prepared in the same manner as in Example 1, except that 0.51 g of SR-10 was added in the preparation of the first emulsion.

Example 9

A binder composition was prepared in the same manner as in Example 1, except that 1.50 g of SR-10 was added in the preparation of the first emulsion.

Example 10

A binder composition was prepared in the same manner as in Example 1, except that 0.17 g of SR-10 was replaced with 1.29 g of sodium vinyl sulfonate, SVS (25 wt. % solid content) in the preparation of the first emulsion.

Example 11

A binder composition was prepared in the same manner as in Example 1, except that 0.17 g of SR-10 was replaced with 3.86 g of SVS (25 wt. % solid content) in the preparation of the first emulsion.

Example 12

A binder composition was prepared in the same manner as in Example 1, except that 0.17 g of SR-10 was replaced with 5.92 g of SVS (25 wt. % solid content) in the preparation of the first emulsion.

Example 13

A binder composition was prepared in the same manner as in Example 1, except that 0.17 g of SR-10 was replaced with 0.79 g of COPs-1 (41 wt. % solid content) in the preparation of the first emulsion.

Example 14

A binder composition was prepared in the same manner as in Example 1, except that 0.17 g of SR-10 was replaced with 2.36 g of COPs-1 (41 wt. % solid content) in the preparation of the first emulsion.

Example 15

A binder composition was prepared in the same manner as in Example 1, except that 0.86 g of lithium hydroxide (dissolved in 20 g of DI water) was added in the preparation of the third suspension to adjust pH to 8.26.

Example 16

A binder composition was prepared in the same manner as in Example 1, except that 0.98 g of lithium hydroxide (dissolved in 20 g of DI water) was added in the preparation of the third suspension to adjust pH to 8.85.

Preparation of Binder Composition of Examples 17-19

The binder compositions of Examples 17-19 were prepared in the same manner as in Example 1.

Comparative Example 1

A binder composition was prepared in the same manner as in Example 1, except that no anionic reactive emulsifier was added in the preparation of the first emulsion.

Comparative Example 2

A binder composition was prepared in the same manner as in Example 1, except that 0.02 g of SR-10 was added in the preparation of the first emulsion.

Comparative Example 3

A binder composition was prepared in the same manner as in Example 1, except that 2.50 g of SR-10 was added in the preparation of the first emulsion.

Comparative Example 4

A binder composition was prepared in the same manner as in Example 1, except that 4.85 g of MAA and 3.07 g of HEA were added in the preparation of the third emulsion, 11.33 g of AM and 12.95 g of AN were added in the preparation of the pre-emulsifying solution and 0.94 g of lithium hydroxide (dissolved in 20 g of DI water) was added in the preparation of the third suspension.

Comparative Example 5

A binder composition was prepared in the same manner as in Example 1, except that 1.94 g of MAA and 1.77 g of HEA were added in the preparation of the third emulsion, 8.10 g of AM and 20.39 g of AN were added in the preparation of the pre-emulsifying solution and 0.25 g of lithium hydroxide (dissolved in 20 g of DI water) was added in the preparation of the third suspension.

Comparative Example 6

A binder composition was prepared in the same manner as in Example 1, except that 0.10 g of lithium hydroxide (dissolved in 20 g of DI water) was added in the preparation of the second emulsion, 0.65 g of MAA and 4.68 g of HEA were added in the preparation of the third emulsion, 10.68 g of AM and 16.19 g of AN were added in the preparation of the pre- emulsifying solution and 0.10 g of lithium hydroxide (dissolved in 20 g of DI water) was added in the preparation of the third suspension.

Comparative Example 7

A binder composition was prepared in the same manner as in Example 1, except that 5.83 g of MAA and 3.06 g of HEA were added in the preparation of the third emulsion, 8.42 g of AM and 14.89 g of AN were added in the preparation of the pre-emulsifying solution and 1.06 g of lithium hydroxide (dissolved in 20 g of DI water) was added in the preparation of the third suspension.

Comparative Example 8

A binder composition was prepared in the same manner as in Example 1, except that 4.69 g of MAA and 3.24 g of HEA were added in the preparation of the third emulsion, 6.47 g of AM and 17.80 g of AN were added in the preparation of the pre-emulsifying solution and 0.84 g of lithium hydroxide (dissolved in 20 g of DI water) was added in the preparation of the third suspension.

Comparative Example 9

A binder composition was prepared in the same manner as in Example 1, except that 1.94 g of MAA and 1.77 g of HEA were added in the preparation of the third emulsion, 13.92 g of AM and 14.57 g of AN were added in the preparation of the pre-emulsifying solution and 0.26 g of lithium hydroxide (dissolved in 20 g of DI water) was added in the preparation of the third suspension.

Comparative Example 10

A binder composition was prepared in the same manner as in Example 1, except that 1.62 g of MAA and 6.48 g of HEA were added in the preparation of the third emulsion, 9.53 g of AM and 14.57 g of AN were added in the preparation of the pre-emulsifying solution and 0.18 g of lithium hydroxide (dissolved in 20 g of DI water) was added in the preparation of the third suspension.

Comparative Example 11

A binder composition was prepared in the same manner as in Example 1, except that 8.09 g of MAA and 0.65 g of HEA were added in the preparation of the third emulsion, 8.89 g of AM and 14.57 g of AN were added in the preparation of the pre-emulsifying solution and 1.87 g of lithium hydroxide (dissolved in 20 g of DI water) was added in the preparation of the third suspension.

Comparative Example 12

A binder composition was prepared in the same manner as in Example 1, except that 6.47 g of MAA and 0.65 g of HEA were added in the preparation of the third emulsion, 12.13 g of AM and 12.95 g of AN were added in the preparation of the pre-emulsifying solution and 1.34 g of lithium hydroxide (dissolved in 20 g of DI water) was added in the preparation of the third suspension.

Comparative Example 13

A binder composition was prepared in the same manner as in Example 1, except that 0.10 g of lithium hydroxide (dissolved in 20 g of DI water) was added in the preparation of the second emulsion, 0.65 g of MAA and 6.47 g of HEA were added in the preparation of the third emulsion, 2.59 g of AM and 22.49 g of AN were added in the preparation of the pre-emulsifying solution and 0.10 g of lithium hydroxide (dissolved in 20 g of DI water) was added in the preparation of the third suspension.

Comparative Example 14

A binder composition was prepared in the same manner as in Example 1, except that 3.24 g of MAA, 3.05 g of HEA and 1.62 g of methyl acrylate (MA) were added in the preparation of the third emulsion and 8.10 g of AM and 16.19 g of AN were added in the preparation of the pre-emulsifying solution.

Comparative Example 15

A binder composition was prepared in the same manner as in Example 1, except that 1.62 g of MAA, 1.62 g of HEA and 4.86 g of MA were added in the preparation of the third emulsion, 8.10 g of AM and 16.00 g of AN were added in the preparation of the pre-emulsifying solution and 0.15 g of lithium hydroxide (dissolved in 20 g of DI water) was added in the preparation of the third suspension.

Preparation of Binder Composition of Comparative Examples 16-18

The binder compositions of Comparative Examples 16-18 were prepared in the same manner as in Example 1, except that no anionic reactive emulsifier was added in the preparation of the first emulsion.

Preparation of Positive Electrode of Examples 2-16 and Comparative Examples 1-15

The positive electrodes of Examples 2-16 and Comparative Examples 1-15 were prepared in the same manner as in Example 1.

Preparation of Positive Electrode of Example 17 and Comparative Example 16

The positive electrodes of Example 17 and Comparative Example 16 were prepared in the same manner as in Example 1, except that the 28.2 g of NMC622 was replaced with NMC532 (obtained from Tianjin Bamo Technology Co., Ltd., China) of the same weight.

Preparation of Positive Electrode of Example 18 and Comparative Example 17

The positive electrodes of Example 18 and Comparative Example 17 were prepared in the same manner as in Example 1, except that the 28.2 g of NMC622 was replaced with $LiCoO_2$ (obtained from Tianjin Bamo Technology Co., Ltd., China) of the same weight.

Preparation of Positive Electrode of Example 19 and Comparative Example 18

The positive electrodes of Example 19 and Comparative Example 18 were prepared in the same manner as in Example 1, except that the 28.2 g of NMC622 was replaced with $LiFePO_4$ (obtained from Xiamen Tungsten Industry Co., Ltd., China) of the same weight.

Preparation of Negative Electrode of Examples 2-19 and Comparative Examples 1-18

The negative electrodes of Examples 2-19 and Comparative Examples 1-18 were prepared in the same manner as in Example 1.

Assembling of Coin Cells of Examples 2-19 and Comparative Examples 1-18

The coin cells of Examples 2-19 and Comparative Examples 1-18 were assembled in the same manner as in Example 1.

Electrochemical Measurements of Examples 2-19 and Comparative Examples 1-18

The electrochemical performance of the coin cells of Examples 2-19 and Comparative Examples 1-18 were measured in the same manner as in Example 1 and the test results are shown in Table 2 below.

TABLE 1

| | Copolymer | | | | | Anionic emulsifier | |
|---|---|---|---|---|---|---|---|
| | Proportion of the monomer in copolymer (wt %) | | | | | | Proportion in |
| | AN* | MAA* | AM* | HEA* | MA* | Type | copolymer (wt %) |
| Example 1 | 49.73 | 7.97 | 31.82 | 9.95 | 0.00 | SR-10 | 0.53 |
| Example 2 | 45.01 | 10.01 | 35.00 | 9.45 | 0.00 | SR-10 | 0.53 |
| Example 3 | 60.00 | 5.00 | 25.02 | 9.45 | 0.00 | SR-10 | 0.53 |
| Example 4 | 50.02 | 14.98 | 25.02 | 9.45 | 0.00 | SR-10 | 0.53 |
| Example 5 | 49.45 | 5.00 | 39.98 | 5.04 | 0.00 | SR-10 | 0.53 |
| Example 6 | 45.01 | 10.01 | 29.47 | 14.98 | 0.00 | SR-10 | 0.53 |
| Example 7 | 49.48 | 7.93 | 31.65 | 9.90 | 0.00 | SR-10 | 1.04 |
| Example 8 | 49.22 | 7.89 | 31.49 | 9.84 | 0.00 | SR-10 | 1.56 |
| Example 9 | 47.77 | 7.66 | 30.56 | 9.55 | 0.00 | SR-10 | 4.45 |
| Example 10 | 49.50 | 7.94 | 31.67 | 9.90 | 0.00 | SVS | 0.99 |
| Example 11 | 48.55 | 7.78 | 31.06 | 9.70 | 0.00 | SVS | 2.91 |
| Example 12 | 47.80 | 7.67 | 30.58 | 9.56 | 0.00 | SVS | 4.39 |
| Example 13 | 49.50 | 7.93 | 31.67 | 9.90 | 0.00 | COPs-1 | 1.00 |
| Example 14 | 48.54 | 7.78 | 31.05 | 9.71 | 0.00 | COPs-1 | 2.92 |
| Example 15 | 49.73 | 7.97 | 31.82 | 9.95 | 0.00 | SR-10 | 0.53 |
| Example 16 | 49.73 | 7.97 | 31.82 | 9.95 | 0.00 | SR-10 | 0.53 |
| Example 17 | 49.73 | 7.97 | 31.82 | 9.95 | 0.00 | SR-10 | 0.53 |
| Example 18 | 49.73 | 7.97 | 31.82 | 9.95 | 0.00 | SR-10 | 0.53 |
| Example 19 | 49.73 | 7.97 | 31.82 | 9.95 | 0.00 | SR-10 | 0.53 |
| Comparative Example 1 | 50.00 | 8.01 | 31.99 | 10.00 | 0.00 | — | — |
| Comparative Example 2 | 49.97 | 8.01 | 31.97 | 9.99 | 0.00 | SR-10 | 0.06 |
| Comparative Example 3 | 46.40 | 7.44 | 29.68 | 9.28 | 0.00 | SR-10 | 7.20 |
| Comparative Example 4 | 40.01 | 14.98 | 35.00 | 9.48 | 0.00 | SR-10 | 0.53 |
| Comparative Example 5 | 62.99 | 5.99 | 25.02 | 5.47 | 0.00 | SR-10 | 0.53 |
| Comparative Example 6 | 50.01 | 2.01 | 32.99 | 14.46 | 0.00 | SR-10 | 0.53 |
| Comparative Example 7 | 46.00 | 18.01 | 26.01 | 9.45 | 0.00 | SR-10 | 0.53 |
| Comparative Example 8 | 54.99 | 14.49 | 19.98 | 10.01 | 0.00 | SR-10 | 0.53 |
| Comparative Example 9 | 45.01 | 5.99 | 43.00 | 5.47 | 0.00 | SR-10 | 0.53 |
| Comparative Example 10 | 45.01 | 5.00 | 29.44 | 20.02 | 0.00 | SR-10 | 0.53 |
| Comparative Example 11 | 45.01 | 24.99 | 27.46 | 2.01 | 0.00 | SR-10 | 0.53 |
| Comparative Example 12 | 40.00 | 19.99 | 37.47 | 2.01 | 0.00 | SR-10 | 0.53 |
| Comparative Example 13 | 69.48 | 2.00 | 8.00 | 19.99 | 0.00 | SR-10 | 0.53 |
| Comparative Example 14 | 50.02 | 10.01 | 25.02 | 9.42 | 5.00 | SR-10 | 0.53 |
| Comparative Example 15 | 49.44 | 5.00 | 25.02 | 5.00 | 15.01 | SR-10 | 0.53 |
| Comparative Example 16 | 50.00 | 8.01 | 31.99 | 10.00 | 0.00 | — | — |
| Comparative Example 17 | 50.00 | 8.01 | 31.99 | 10.00 | 0.00 | — | — |
| Comparative Example 18 | 50.00 | 8.01 | 31.99 | 10.00 | 0.00 | — | — |

*AN refers to acrylonitrile, MAA refers to methacrylic acid, AM refers to acrylamide, HEA refers to 2-hydroxyethyl acrylate and MA refers to methyl acrylate.

TABLE 2

| | Physical properties of binder composition | | | | | 0.5 C Initial | Capacity retention | Capacity retention |
|---|---|---|---|---|---|---|---|---|
| | pH | Solid content (%) | Viscosity (mPa · s) | Electrolyte swelling (%) | Adhesive strength (N/cm) | discharging capacity (mAh/g) | after 50 cycles (%) | after 100 cycles (%) |
| Example 1 | 7.49 | 15.41 | 21,110 | 7.28 | 5.23 | 135 | 96.05 | 90.15 |
| Example 2 | 7.78 | 17.65 | 16,910 | 5.61 | 4.78 | 140 | 94.91 | 90.95 |
| Example 3 | 7.84 | 12.24 | 17,260 | 6.11 | 5.07 | 133 | 95.62 | 91.28 |
| Example 4 | 7.17 | 16.42 | 19,460 | 6.26 | 5.08 | 139 | 96.97 | 89.37 |
| Example 5 | 7.62 | 16.80 | 12,710 | 6.17 | 5.09 | 140 | 95.69 | 90.64 |
| Example 6 | 7.34 | 12.49 | 33,200 | 5.64 | 4.54 | 133 | 96.53 | 91.37 |

TABLE 2-continued

| | Physical properties of binder composition | | | | | 0.5 C Initial | Capacity retention | Capacity retention |
|---|---|---|---|---|---|---|---|---|
| | pH | Solid content (%) | Viscosity (mPa · s) | Electrolyte swelling (%) | Adhesive strength (N/cm) | discharging capacity (mAh/g) | after 50 cycles (%) | after 100 cycles (%) |
| Example 7 | 7.29 | 16.50 | 20,680 | 6.49 | 4.37 | 132 | 94.72 | 91.48 |
| Example 8 | 7.42 | 17.79 | 19,530 | 6.24 | 5.19 | 131 | 96.75 | 88.96 |
| Example 9 | 7.23 | 16.55 | 18,460 | 6.18 | 5.12 | 130 | 96.69 | 88.43 |
| Example 10 | 7.55 | 17.08 | 20,760 | 7.30 | 5.22 | 144 | 96.74 | 92.89 |
| Example 11 | 7.44 | 17.74 | 18,330 | 5.49 | 5.46 | 134 | 94.88 | 90.06 |
| Example 12 | 7.51 | 13.68 | 17,170 | 5.75 | 4.64 | 132 | 96.07 | 88.96 |
| Example 13 | 7.64 | 14.42 | 20,430 | 6.49 | 4.60 | 148 | 95.79 | 91.71 |
| Example 14 | 7.24 | 13.17 | 18,700 | 5.81 | 5.86 | 147 | 95.29 | 88.44 |
| Example 15 | 8.26 | 15.65 | 22,050 | 6.21 | 5.03 | 147 | 95.97 | 88.14 |
| Example 16 | 8.85 | 15.25 | 23,520 | 5.34 | 5.67 | 145 | 96.77 | 92.82 |
| Example 17 | 7.04 | 14.76 | 23,570 | 5.97 | 5.53 | 128 | 95.10 | 89.95 |
| Example 18 | 7.28 | 16.59 | 22,910 | 5.41 | 4.62 | 165 | 95.48 | 90.42 |
| Example 19 | 7.55 | 16.23 | 23,450 | 6.67 | 5.80 | 153 | 94.78 | 89.76 |
| Comparative Example 1 | 7.60 | 14.02 | 23,240 | 5.75 | 2.32 | 104 | 86.47 | 73.37 |
| Comparative Example 2 | 7.10 | 13.21 | 22,630 | 5.14 | 2.46 | 107 | 86.60 | 75.69 |
| Comparative Example 3 | 7.59 | 17.77 | 16,340 | 6.62 | 2.41 | 118 | 87.09 | 75.43 |
| Comparative Example 4 | 7.32 | 12.30 | 19,990 | 7.21 | 1.03 | 116 | 88.93 | 76.18 |
| Comparative Example 5 | 7.76 | 15.25 | 11,590 | 6.37 | 4.25 | 108 | 89.71 | 75.72 |
| Comparative Example 6 | 7.71 | 14.70 | 34,400 | 5.22 | 2.92 | 110 | 89.55 | 77.58 |
| Comparative Example 7 | 7.12 | 14.64 | 20,190 | 7.78 | 2.25 | 109 | 86.38 | 75.69 |
| Comparative Example 8 | 7.31 | 14.96 | 19,790 | 9.30 | 3.01 | 105 | 86.36 | 76.81 |
| Comparative Example 9 | 7.62 | 17.37 | 13,680 | 4.11 | 1.85 | 116 | 87.88 | 75.61 |
| Comparative Example 10 | 7.60 | 14.65 | 46,670 | 8.49 | 1.52 | 113 | 86.41 | 72.62 |
| Comparative Example 11 | 7.81 | 13.21 | 8,260 | 5.74 | 2.41 | 118 | 86.54 | 71.90 |
| Comparative Example 12 | 7.37 | 17.97 | 7,100 | 6.62 | 1.33 | 105 | 89.41 | 72.98 |
| Comparative Example 13 | 7.72 | 14.83 | 43,700 | 10.50 | 3.67 | 113 | 86.34 | 72.63 |
| Comparative Example 14 | 7.06 | 12.09 | 17,400 | 6.46 | 3.94 | 102 | 85.72 | 73.51 |
| Comparative Example 15 | 7.24 | 17.68 | 33,960 | 6.15 | 4.11 | 104 | 85.20 | 72.19 |
| Comparative Example 16 | 7.59 | 13.95 | 22,760 | 5.94 | 2.23 | 106 | 85.42 | 72.33 |
| Comparative Example 17 | 7.55 | 14.10 | 23,010 | 6.07 | 2.40 | 132 | 86.28 | 73.05 |
| Comparative Example 18 | 7.64 | 14.04 | 23,500 | 6.53 | 2.17 | 121 | 85.49 | 72.41 |

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A binder composition for a secondary battery electrode comprising a copolymer and a dispersion medium, wherein the copolymer comprises a structural unit (a) derived from a carboxylic acid group-containing monomer, a structural unit (b) derived from an amide group-containing monomer, a structural unit (c) derived from a nitrile group-containing monomer, a structural unit (d) derived from a hydroxyl group-containing monomer, and at least one anionic reactive emulsifier; wherein the proportion of structural unit (a) derived from a carboxylic acid group-containing monomer in the copolymer is from about 2% to about 13% by mole, the proportion of structural unit (b) derived from an amide group-containing monomer in the copolymer is from about 20% to about 37% by mole, the proportion of structural unit (c) derived from a nitrile group-containing monomer in the copolymer is from about 52% to less than 70% by mole, wherein the proportion of structural unit (d) derived from a hydroxyl group-containing monomer in the copolymer is from about 2% to about 10% by mole, based on the total number of moles of monomeric units in the copolymer in the binder composition; wherein the proportion of the anionic reactive emulsifier is from about 0.1% to about 5% by weight, based on the total weight of monomers added in the preparation of the binder composition; and wherein the binder composition is free of structural unit derived from a non-hydroxyl group-containing ethylenically unsaturated ester monomer.

2. The binder composition according to claim 1, wherein the carboxylic acid group-containing monomer is selected from the group consisting of acrylic acid, methacrylic acid, crotonic acid, 2-butyl crotonic acid, cinnamic acid, maleic acid, maleic anhydride, fumaric acid, itaconic acid, itaconic anhydride, tetraconic acid, 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid, methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate, maleic anhydride, methyl maleic anhydride, dimethyl maleic anhydride, acrylic anhydride, methacrylic anhydride, methacrolein, methacryloyl chloride, methacryloyl fluoride, methacryloyl bromide and combinations thereof.

3. The binder composition according to claim 1, wherein the amide group-containing monomer is selected from the group consisting of methacrylamide, N-methyl methacrylamide, N-ethyl methacrylamide, N-n-propyl methacrylamide, N-isopropyl methacrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl)methacrylamide, N-(ethoxymethyl) methacrylamide, N-(propoxymethyl)methacrylamide, N-(butoxymethyl)methacrylamide, N,N-dimethyl methacrylamide, N,N-dimethylaminopropyl methacrylamide, N,N-dimethylaminoethyl methacrylamide, N,N-dimethylol methacrylamide, diacetone methacrylamide, methacryloyl morpholine and combinations thereof.

4. The binder composition according to claim 1, wherein the nitrile group-containing monomer is selected from the group consisting of acrylonitrile, α-halogenoacrylonitrile, α-alkylacrylonitrile, α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)acrylonitrile, α-(chlorophenyl)acrylonitrile, α-(cyanophenyl) acrylonitrile, vinylidene cyanide and combinations thereof.

5. The binder composition according to claim 1, wherein the hydroxyl group-containing monomer is selected from the group consisting of 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, 2-hydroxybutyl acrylate, 4-hydroxybutyl acrylate, 2-hydroxybutyl methacrylate, 4-hydroxybutyl methacrylate, 5-hydroxypentyl acrylate, 5-hydroxypentyl methacrylate, 6-hydroxyhexyl acrylate, 6-hydroxyhexyl methacrylate, 1,4-cyclohexanedimethanol monoacrylate, 3-chloro-2-hydroxypropyl acrylate, 3-chloro-2-hydroxypropyl methacrylate, diethylene glycol monomethacrylate, diethylene glycol monoacrylate and combinations thereof.

6. The binder composition according to claim 1, wherein the dispersion medium is water.

7. The binder composition according to claim 6, wherein the dispersion medium further comprises a hydrophilic solvent selected from the group consisting of ethanol, isopropanol, n-propanol, tert-butanol, n-butanol, dimethylacetamide (DMAc), dimethylformamide (DMF), N-methylpyrrolidone (NMP), methyl ethyl ketone (MEK), ethyl acetate (EA), butyl acetate (BA) and combinations thereof.

8. The binder composition according to claim 1, wherein the anionic reactive emulsifier is selected from the group consisting of sodium 2-acrylamido-2-methyl-1-propanesulfonate (AMPS-Na), sodium hydroxypropane sulfonate, sodium dodecyl allyl sulfosuccinate, sodium 1-allyloxy-2 hydroxypropyl sulfonate (COPs-1), sodium vinyl sulfonate (SVS), sodium vinyl alkyl sulfonate, sodium styrene sulfonate, allyloxy fatty alcohol polyoxyethylene ether ammonium sulfate, allyloxy alkyl phenol polyoxyethylene ether ammonium sulfate, polyoxyethylene allyloxy nonylphenoxypropyl ether ammonium sulfate, alkyl allyl sulfosuccinate, methacrylic acid polyoxyalkylene sulfate ester salt, ethylene glycol methacrylate sulfate ester salt, polyoxyethylene alkyl propenyl phenyl ether sulfate ammonium salt, α-sulfo-ω-(1-(nonylphenoxy) methyl-2-(2-propenyloxy) ethoxy)-poly (oxy-1,2-ethanediyl) ammonium salt, polyoxyethylene-1-(allyloxymethyl) alkyl ether sulfate ammonium salt, polyoxyalkylene alkenyl ether ammonium sulfate, sodium allyloxy hydroxypropyl sulfonates, sodium methallyl sulfonates, sulfopropyl acrylate, vinyl sulfonate, vinyl phosphate, monosodium ethylsulfonate monododecyl maleate, allylsulfosuccinate derivatives and combinations thereof.

9. The binder composition according to claim 1, wherein the molar ratio of the anionic reactive emulsifier to the structural unit (c) in the copolymer is from about 0.01% to about 4%; and wherein the molar ratio of the sum of structural unit (a), structural unit (b) and structural unit (d) to structural unit (c) in the copolymer is from about 0.1 to about 1.

10. The binder composition according to claim 1, wherein the pH of the binder composition is from about 7 to about 9; and wherein the viscosity of the binder composition is from about 10,000 mPa·s to about 35,000 mPa·s.

11. The binder composition according to claim 1, wherein the electrolyte swelling of the binder composition is from about 5% to about 8%.

12. The binder composition according to claim 1, wherein the adhesive strength between the binder composition and a current collector is from about 4 N/cm to about 6 N/cm.

13. The binder composition according to claim 1, wherein the solid content of the binder composition is from about 12% to about 18% by weight, based on the total weight of the binder composition.

14. An electrode for a secondary battery, comprising an electrode active material, a conductive agent and the binder composition according to claim 1.

15. The electrode according to claim 14, wherein the peeling strength between a current collector and an electrode layer is in the range from about 1.0 N/cm to about 8.0 N/cm.

* * * * *